July 8, 1958    M. P. MATTHEW    2,842,310
TYPEWRITER CONTROLLED CALCULATORS
Filed Sept. 15, 1953    30 Sheets-Sheet 1
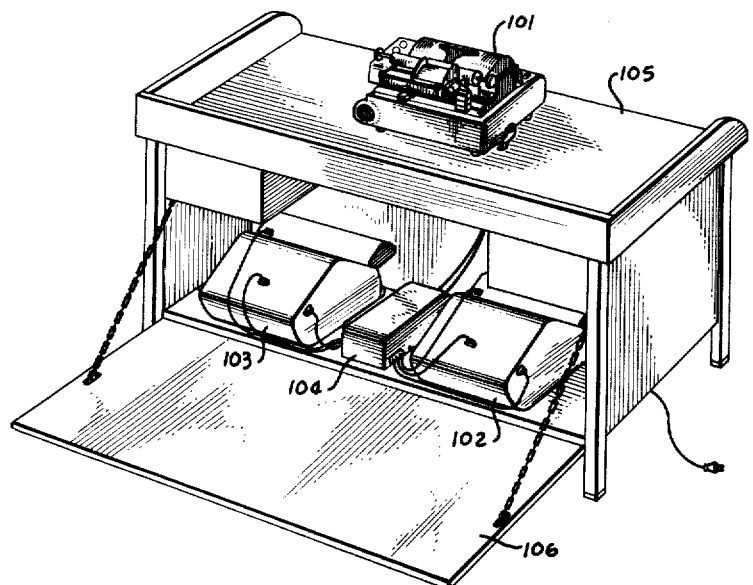
FIG_1
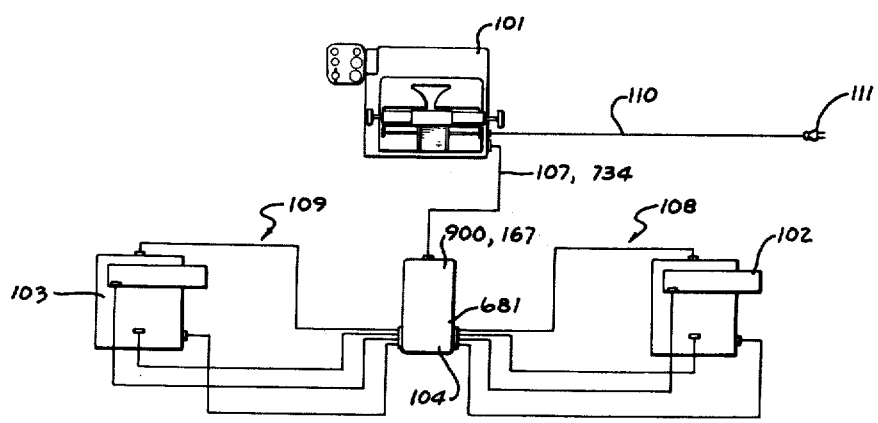
FIG_2

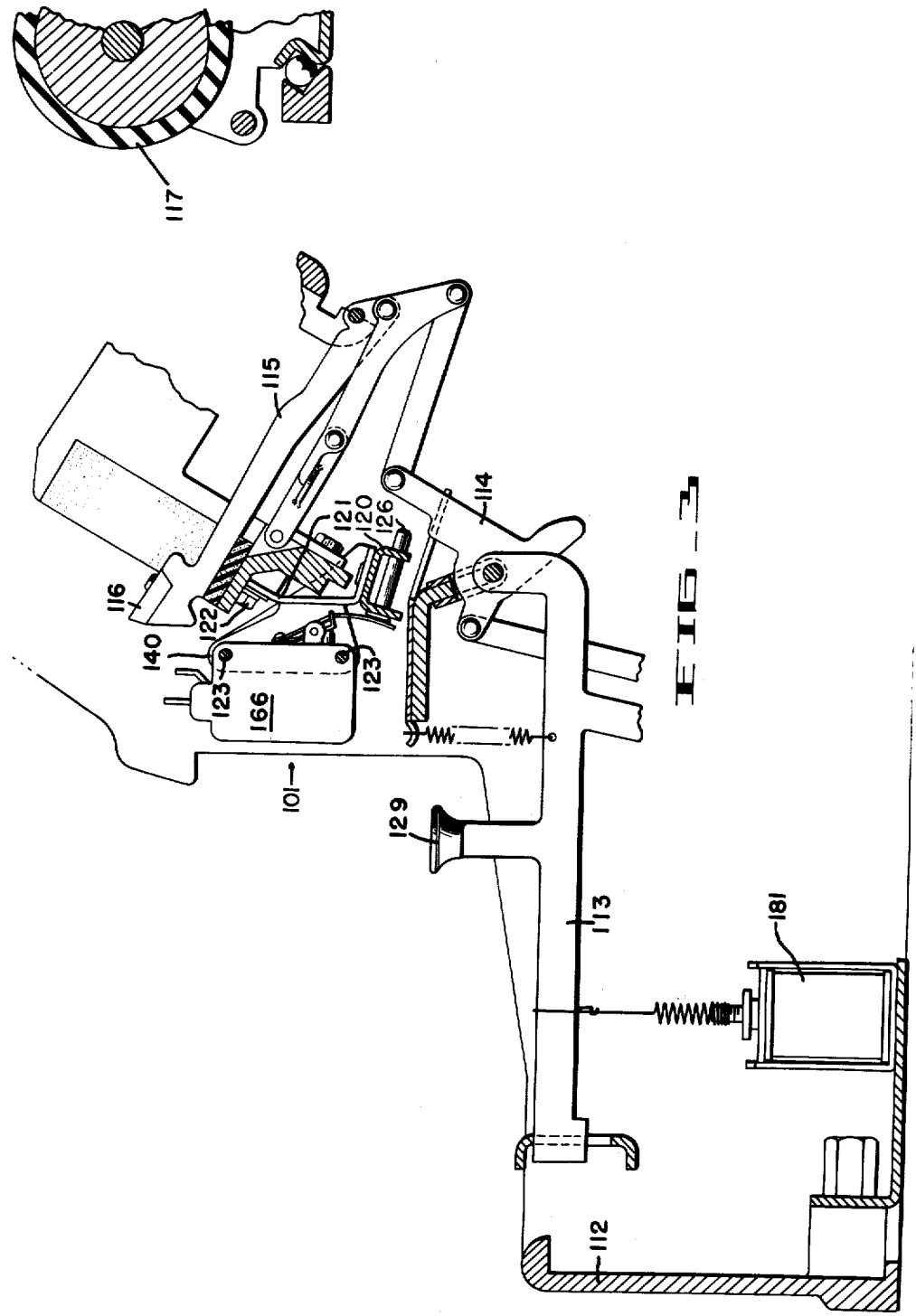

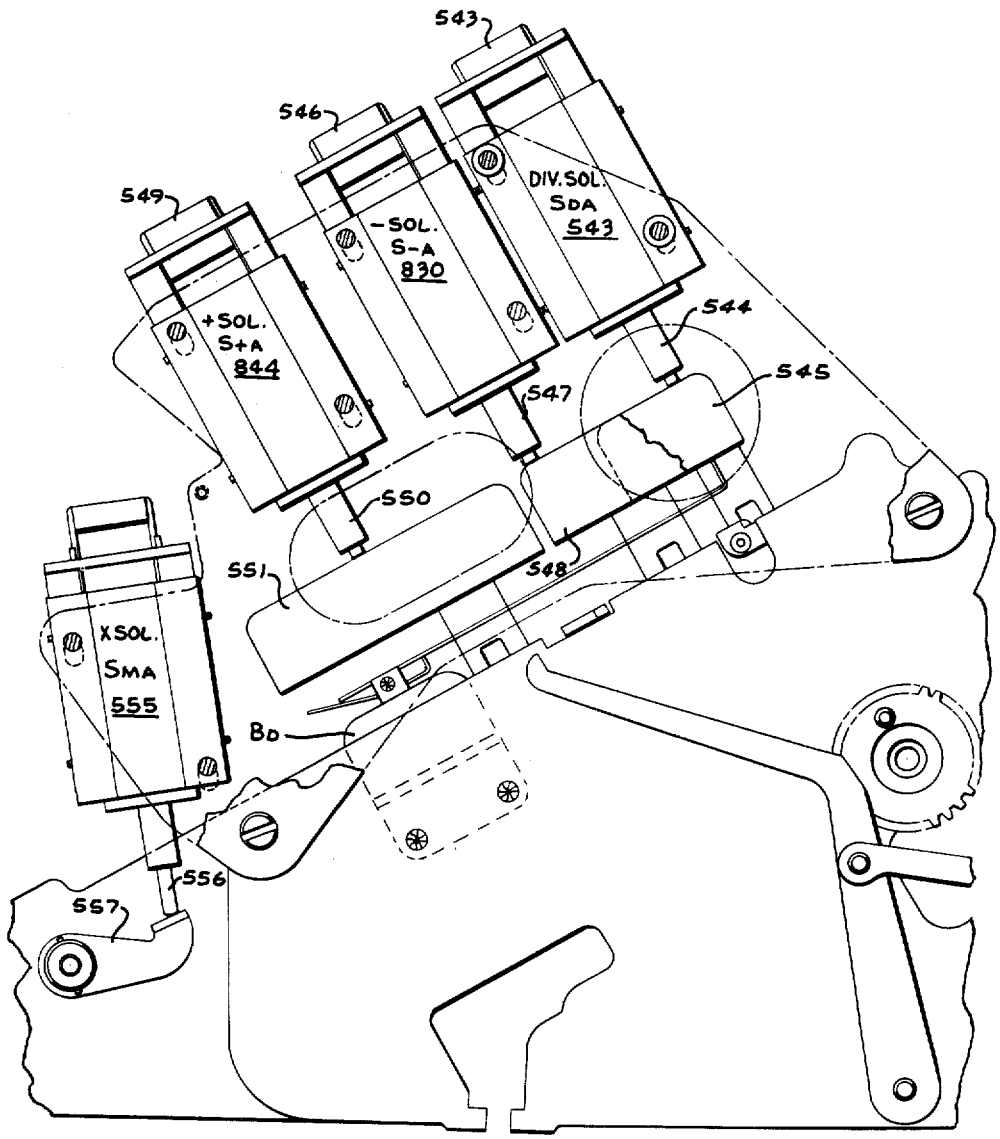
FIG_4

July 8, 1958   M. P. MATTHEW   2,842,310
TYPEWRITER CONTROLLED CALCULATORS
Filed Sept. 15, 1953   30 Sheets-Sheet 4
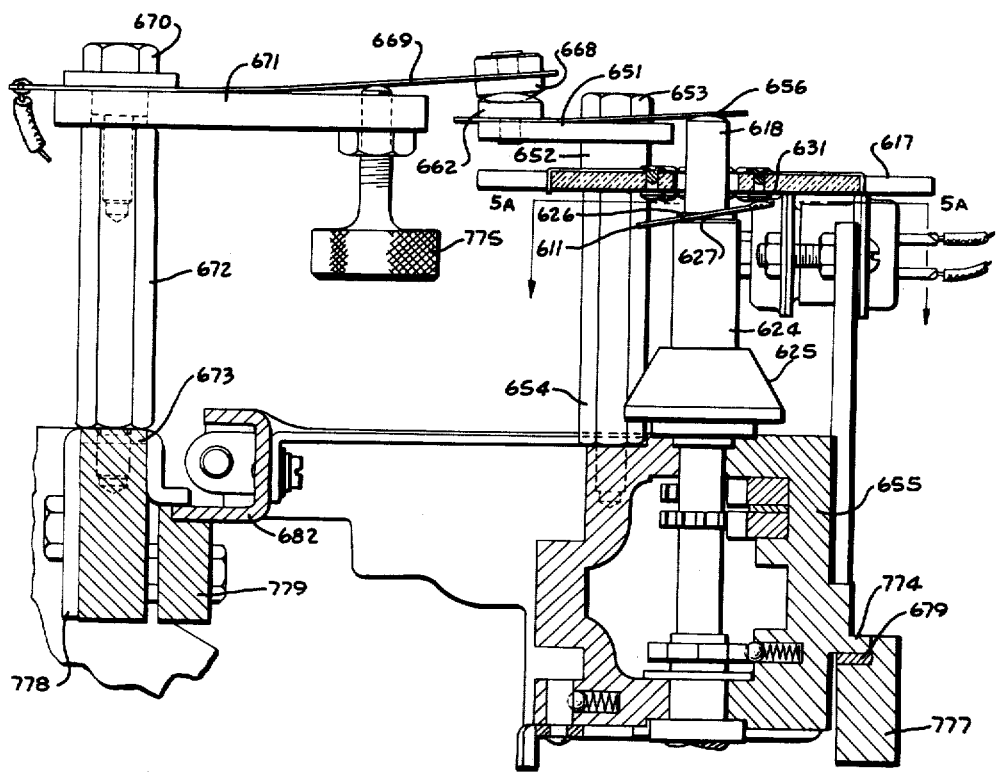
FIG_5
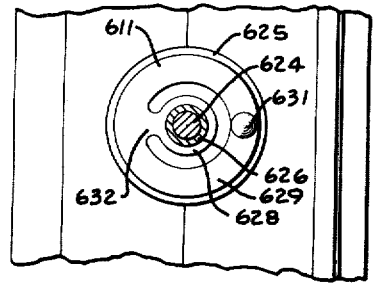
FIG_5A

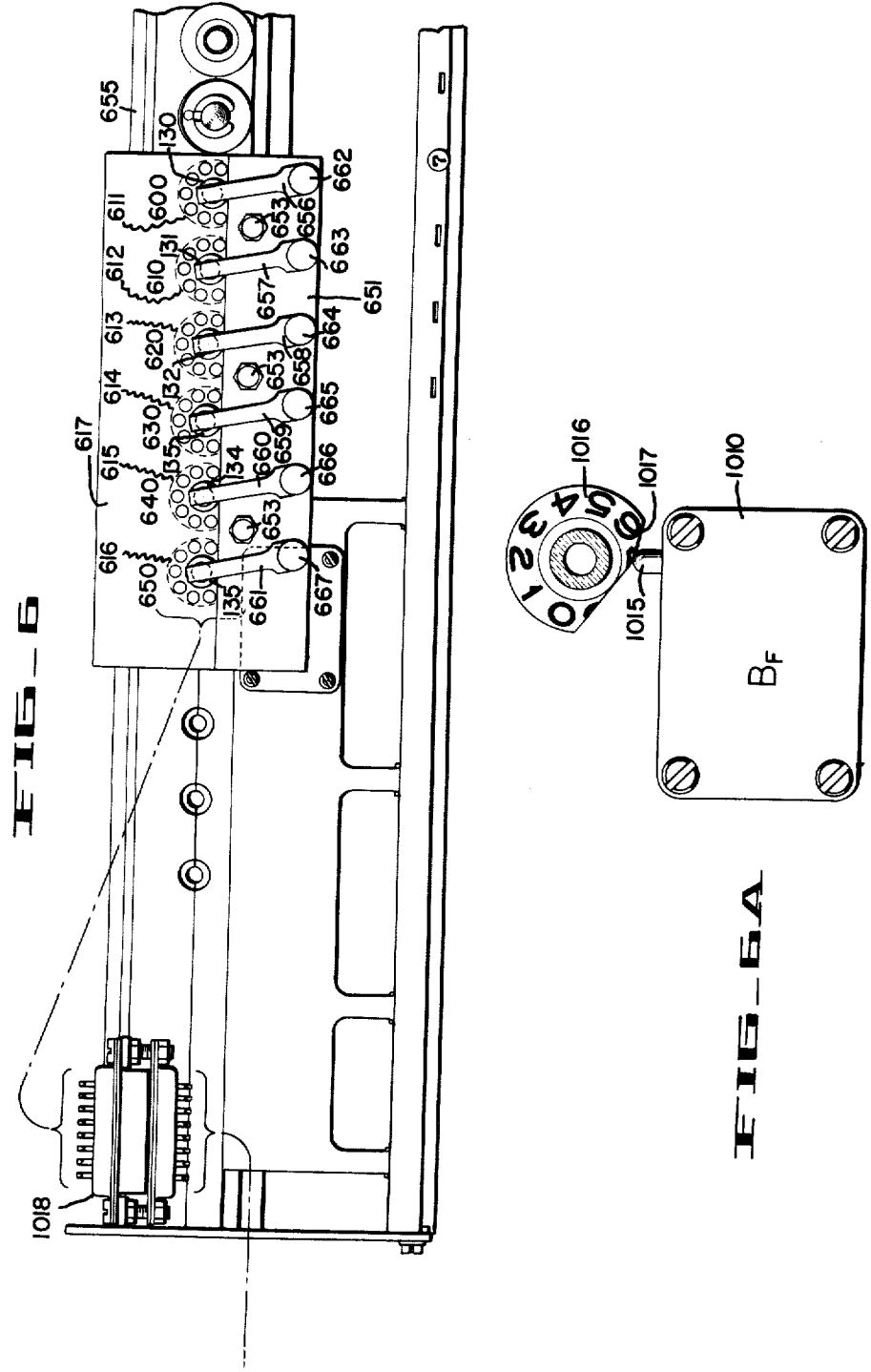

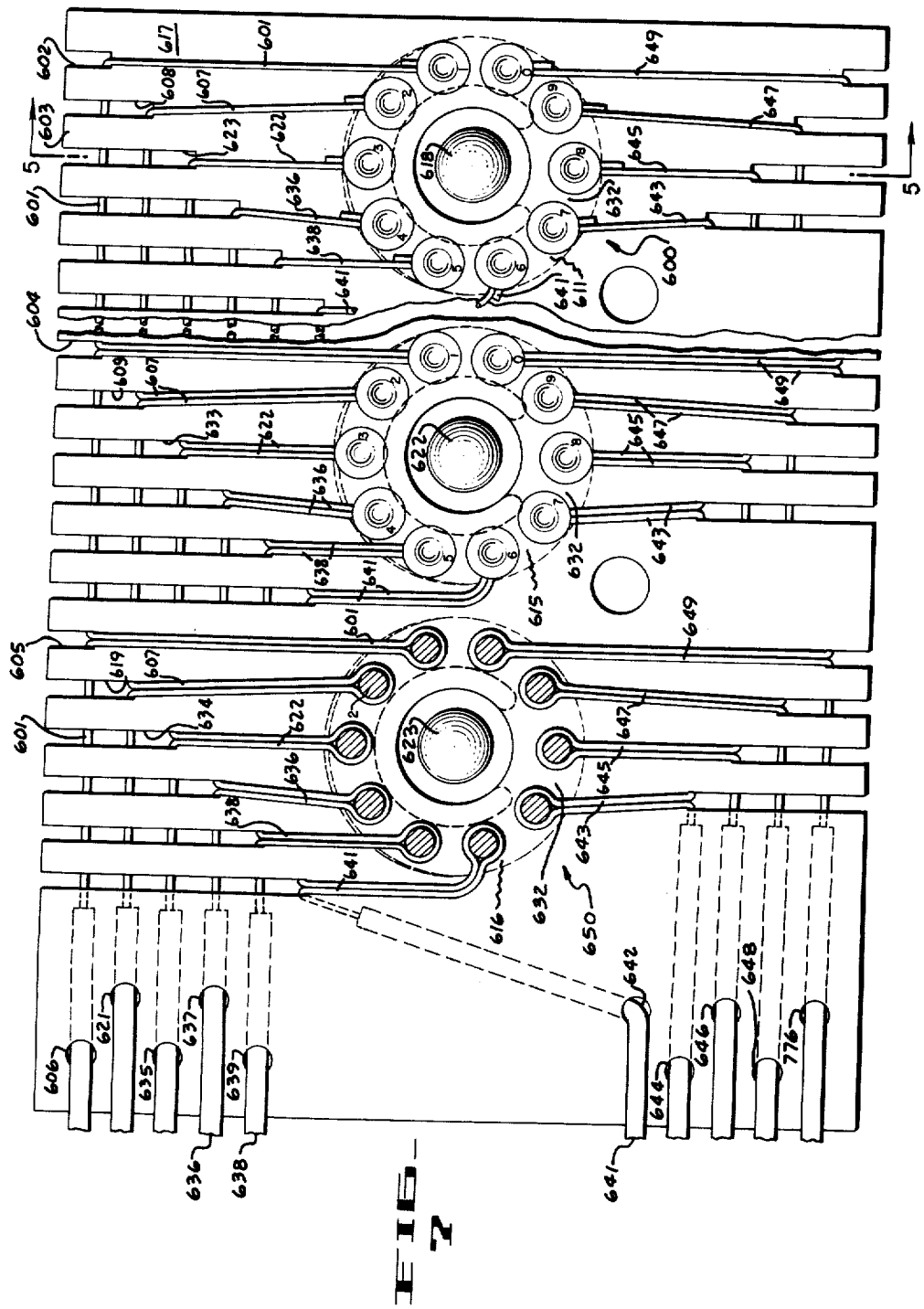

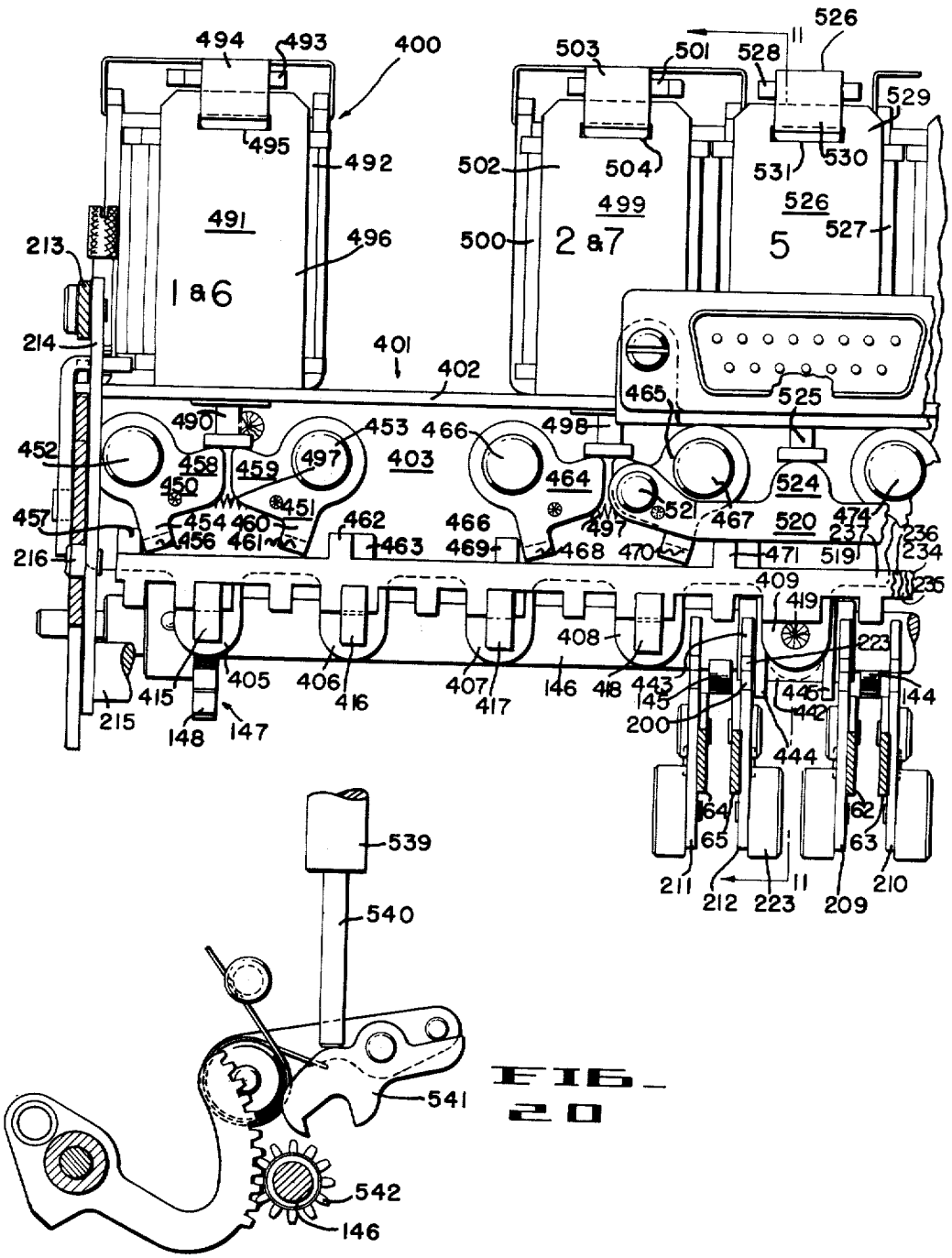

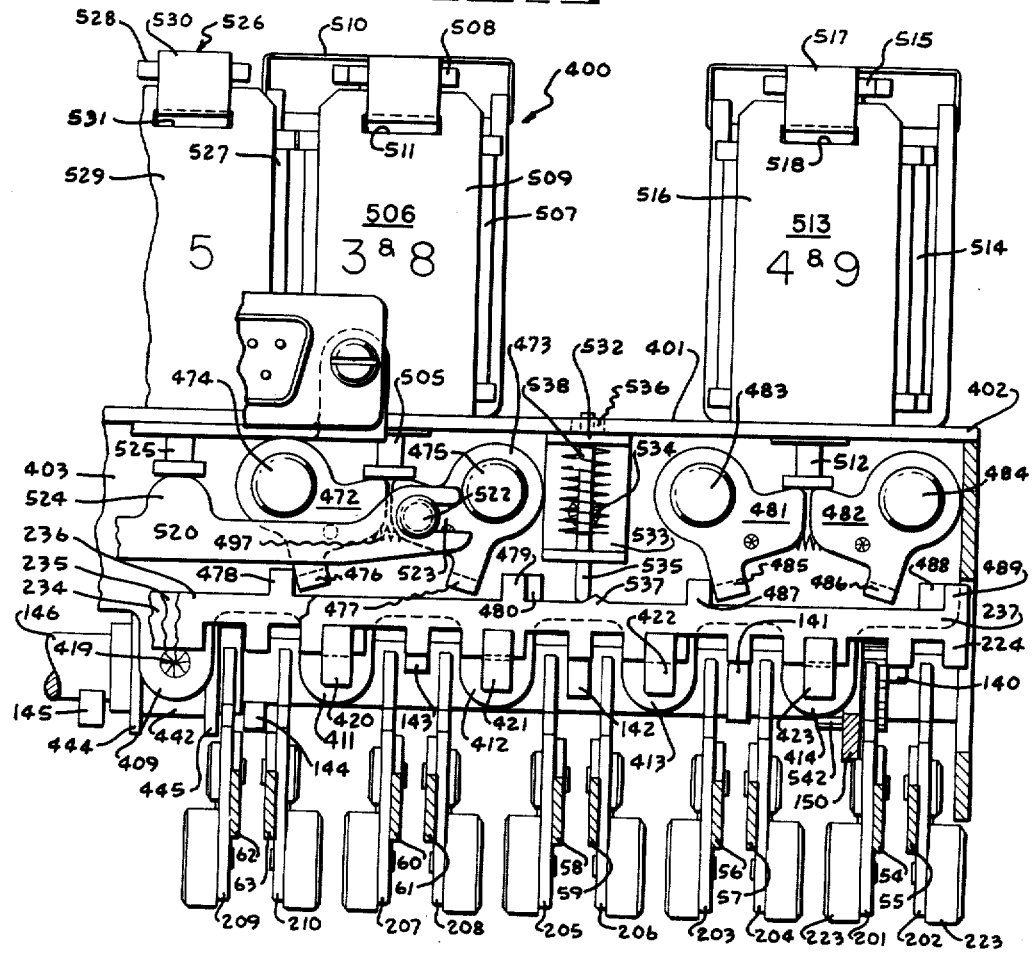
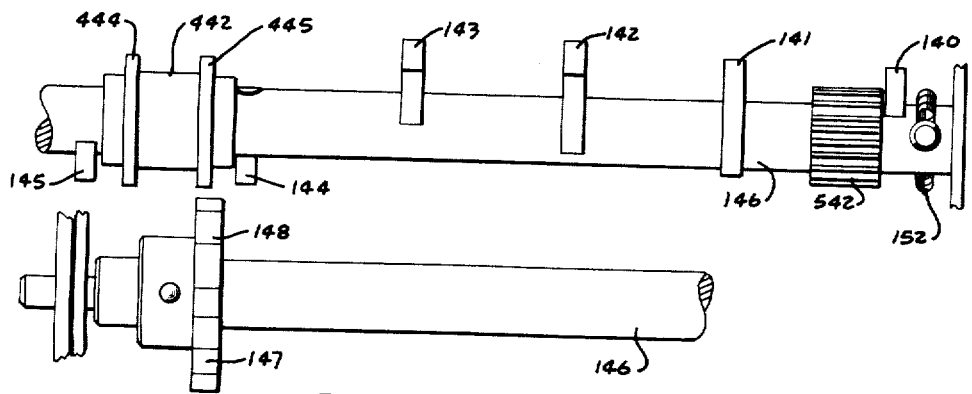

July 8, 1958　　　　　　M. P. MATTHEW　　　　　2,842,310
TYPEWRITER CONTROLLED CALCULATORS
Filed Sept. 15, 1953　　　　　　　　　　　　30 Sheets-Sheet 9
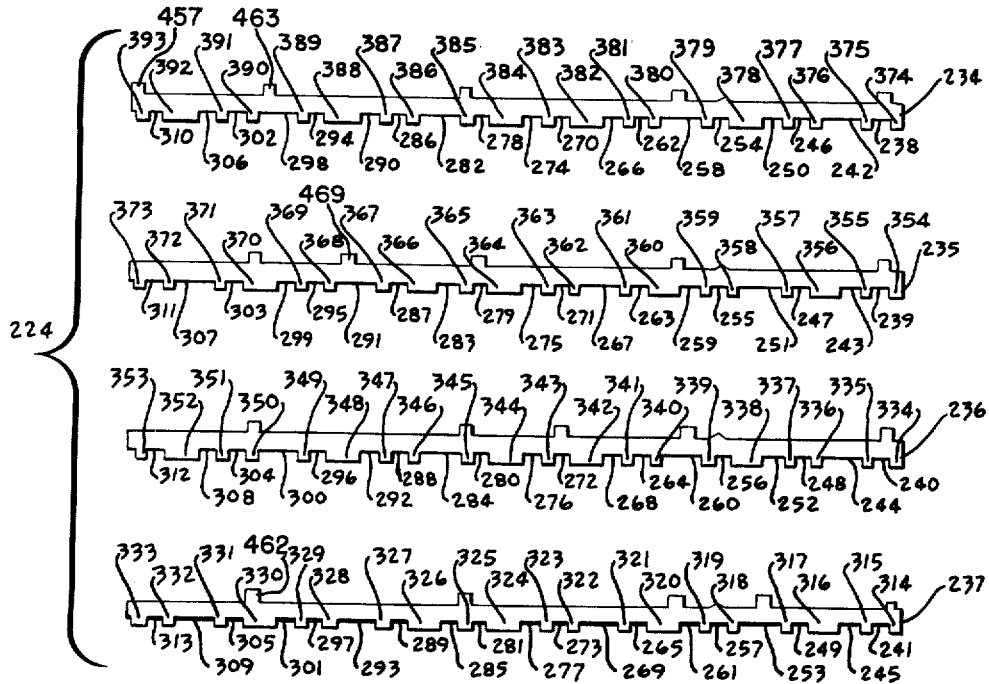
FIG_10
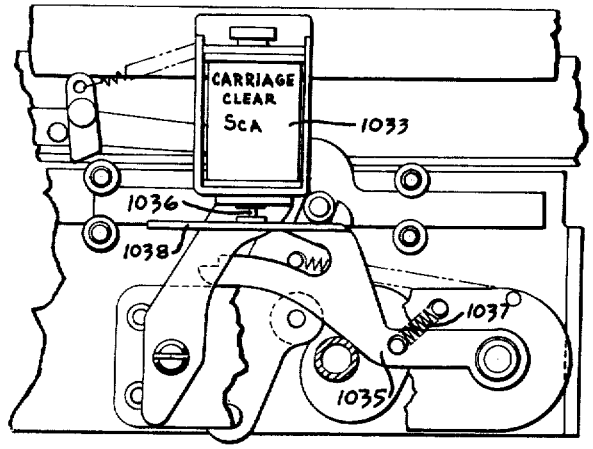
FIG_21

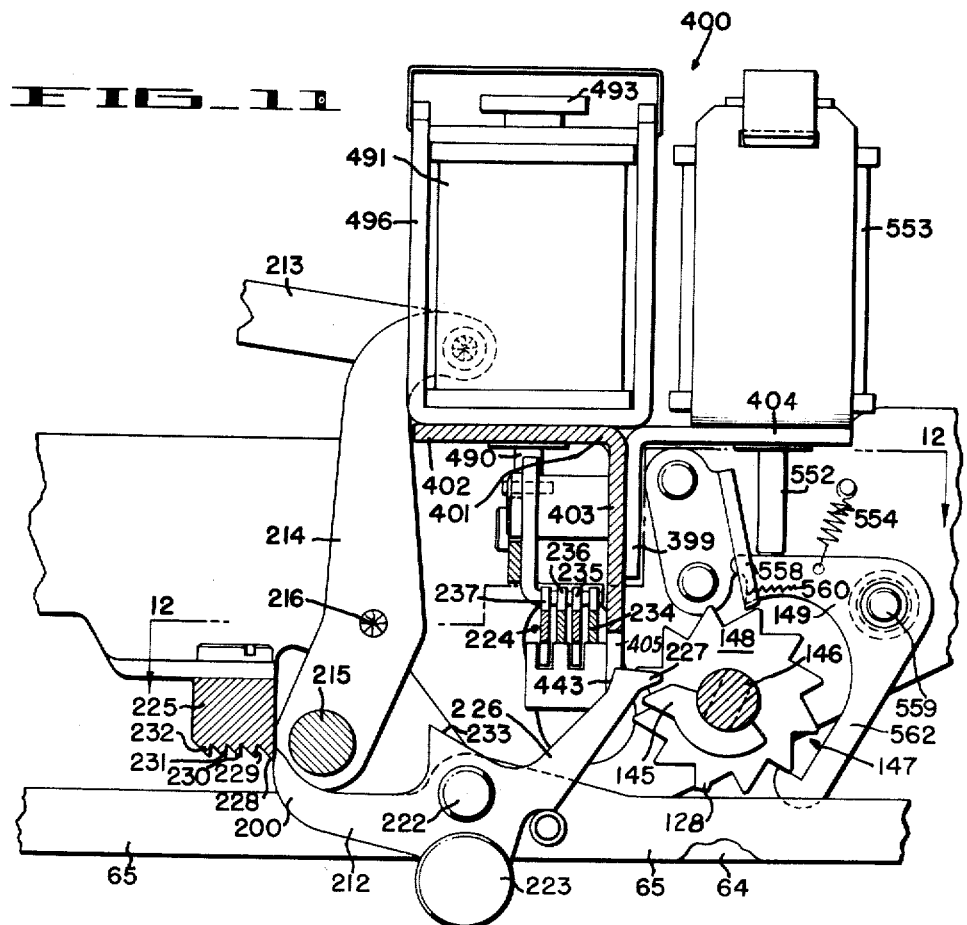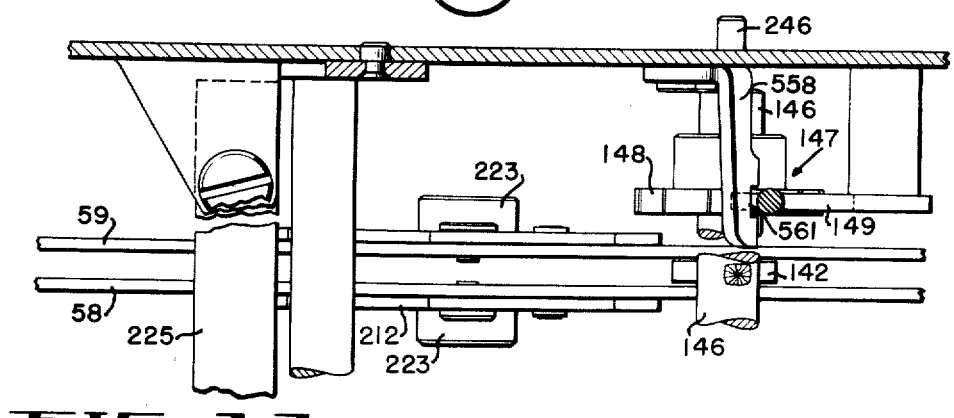

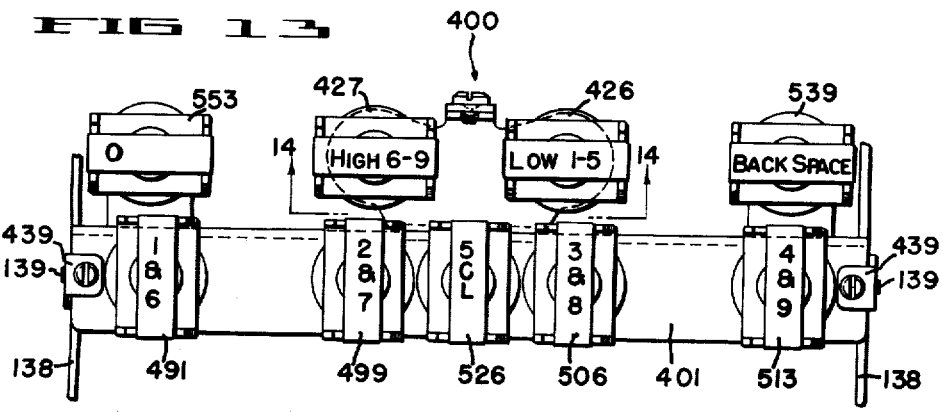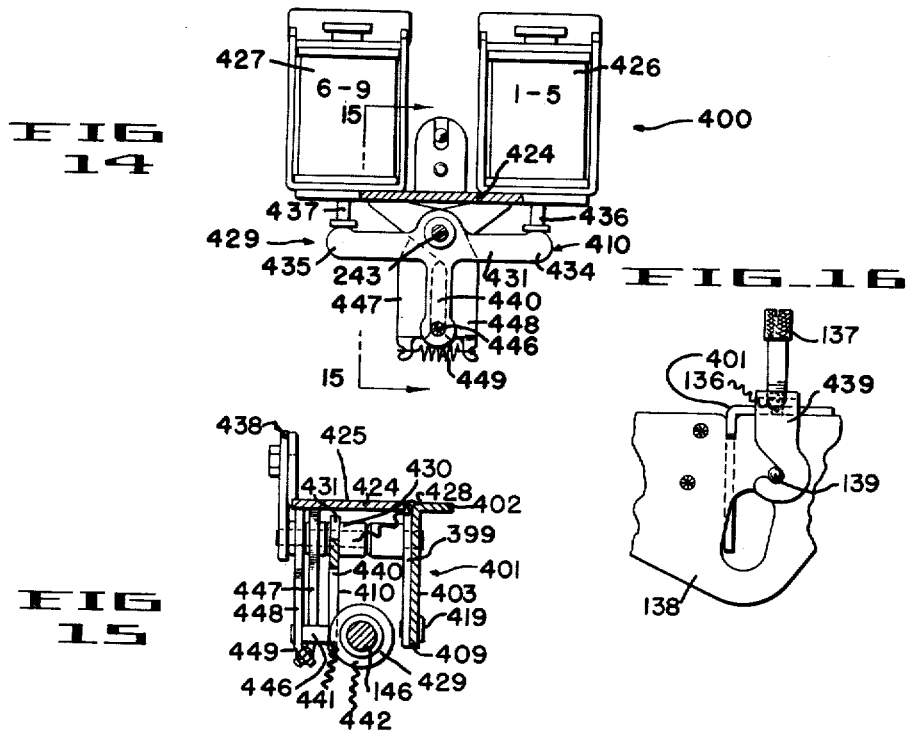

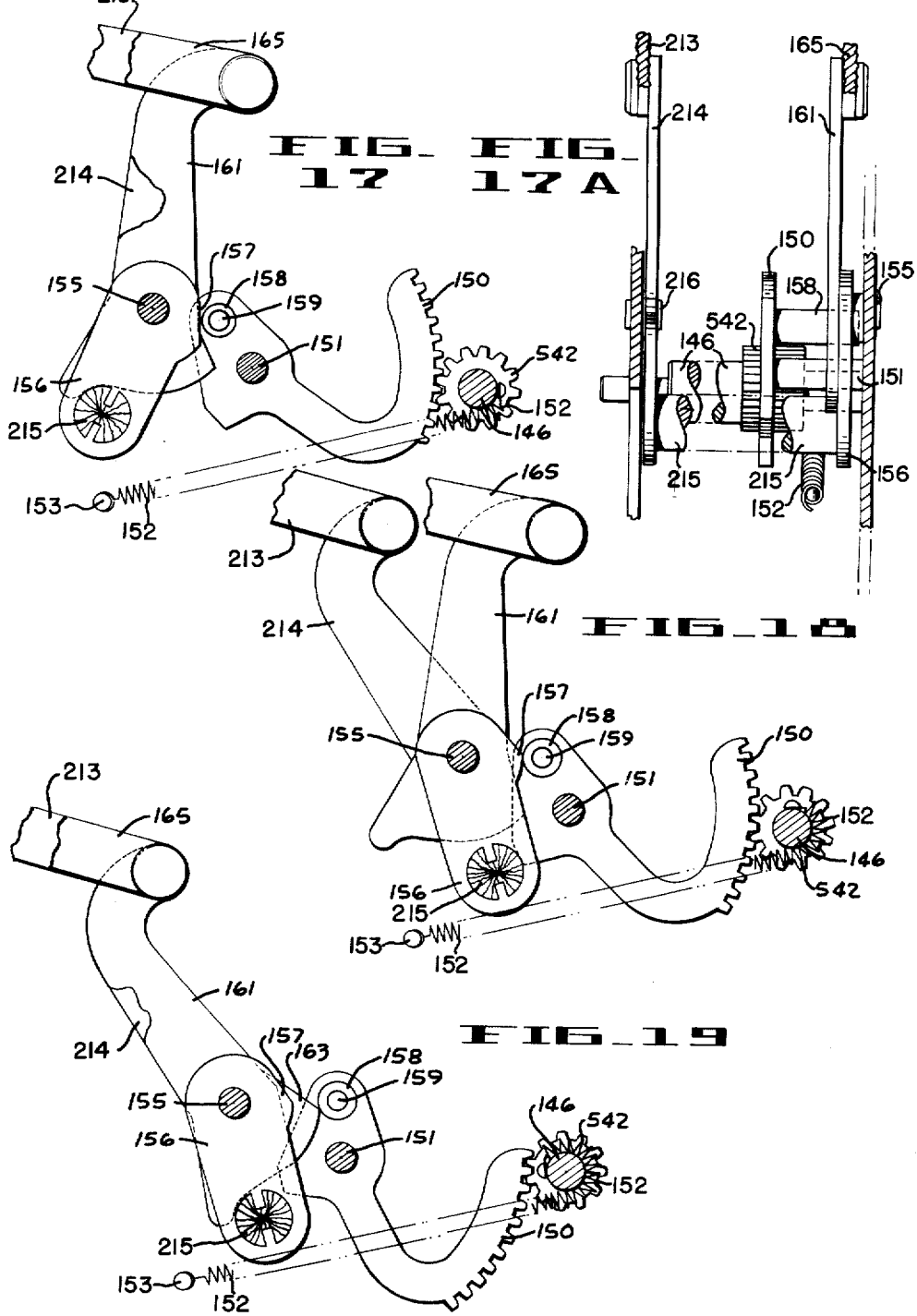

July 8, 1958 M. P. MATTHEW 2,842,310
TYPEWRITER CONTROLLED CALCULATORS
Filed Sept. 15, 1953 30 Sheets-Sheet 13
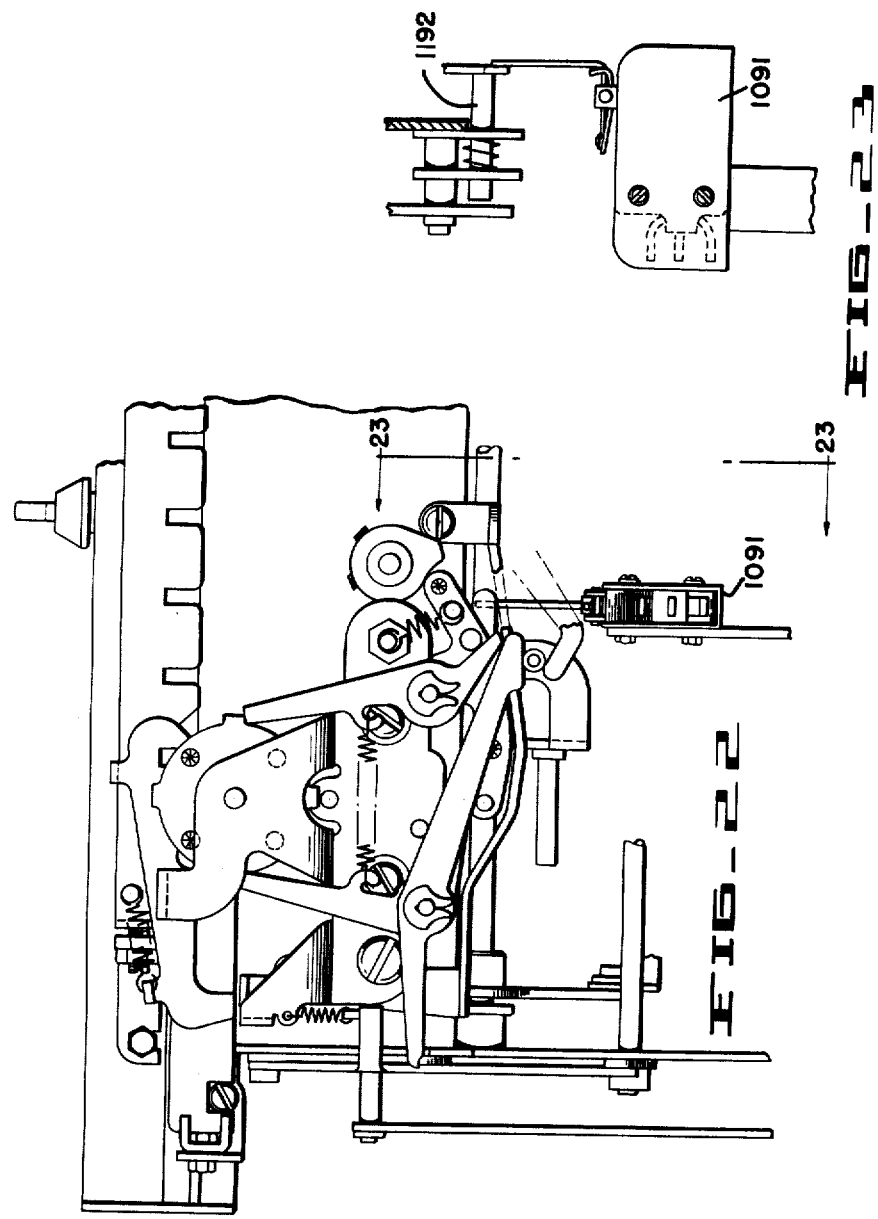

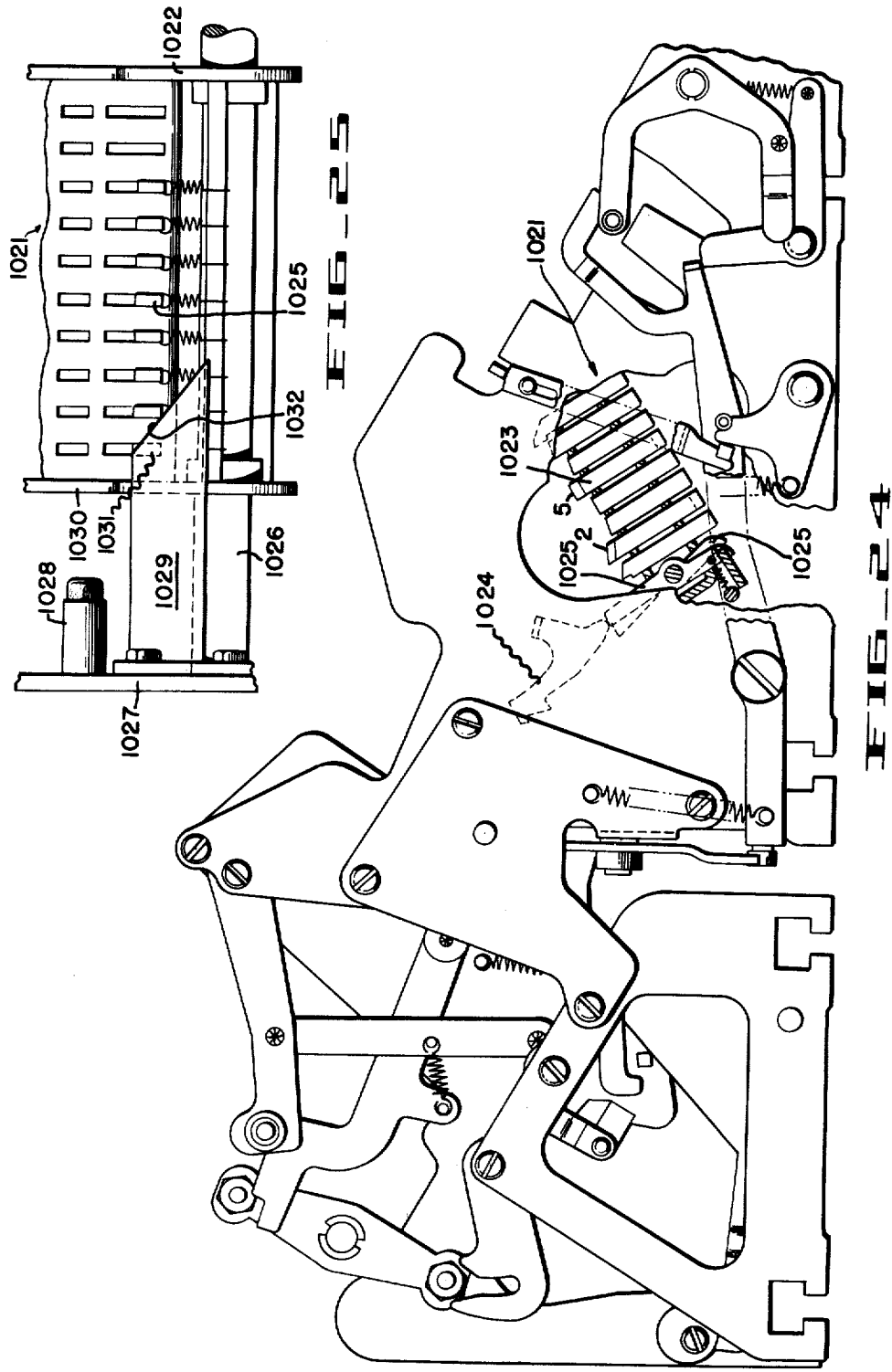

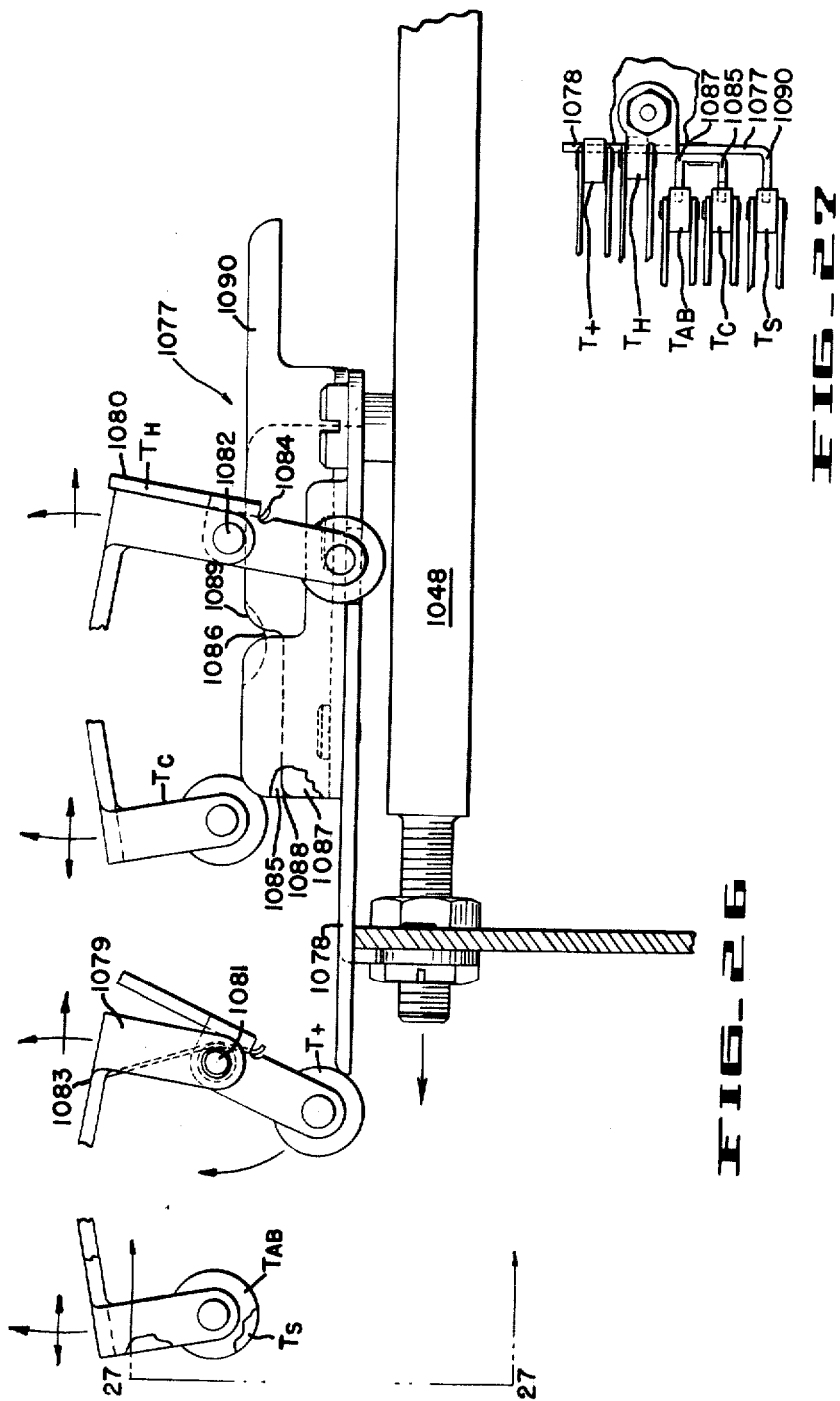

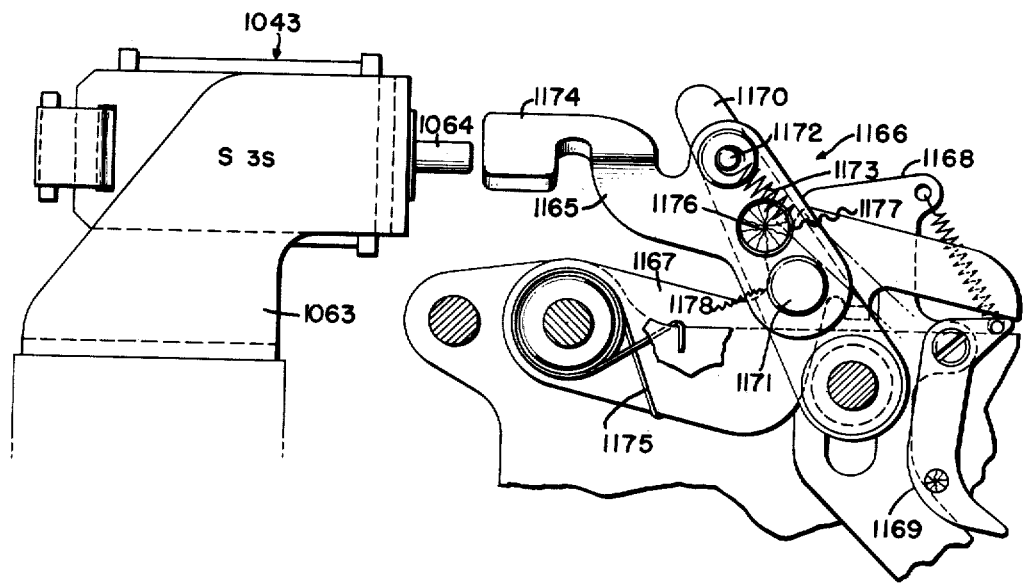
FIG_28
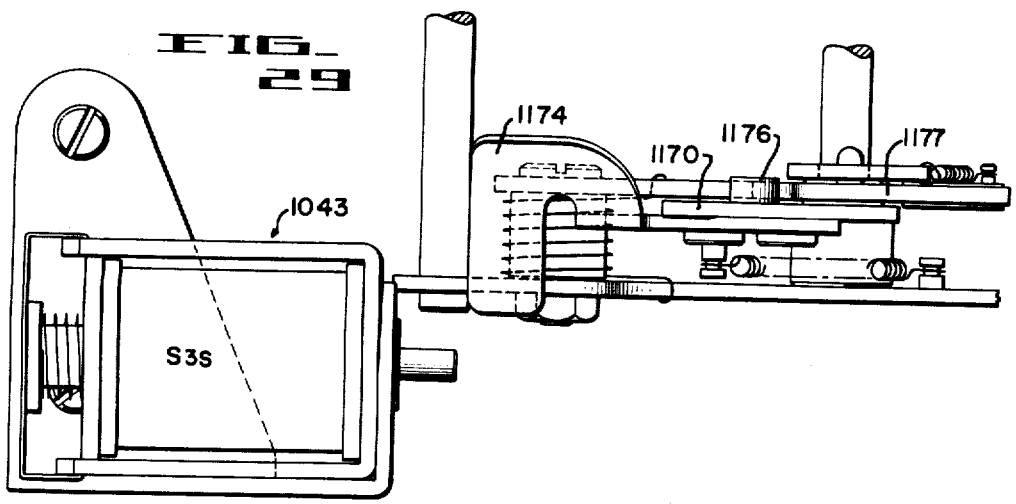
FIG_29

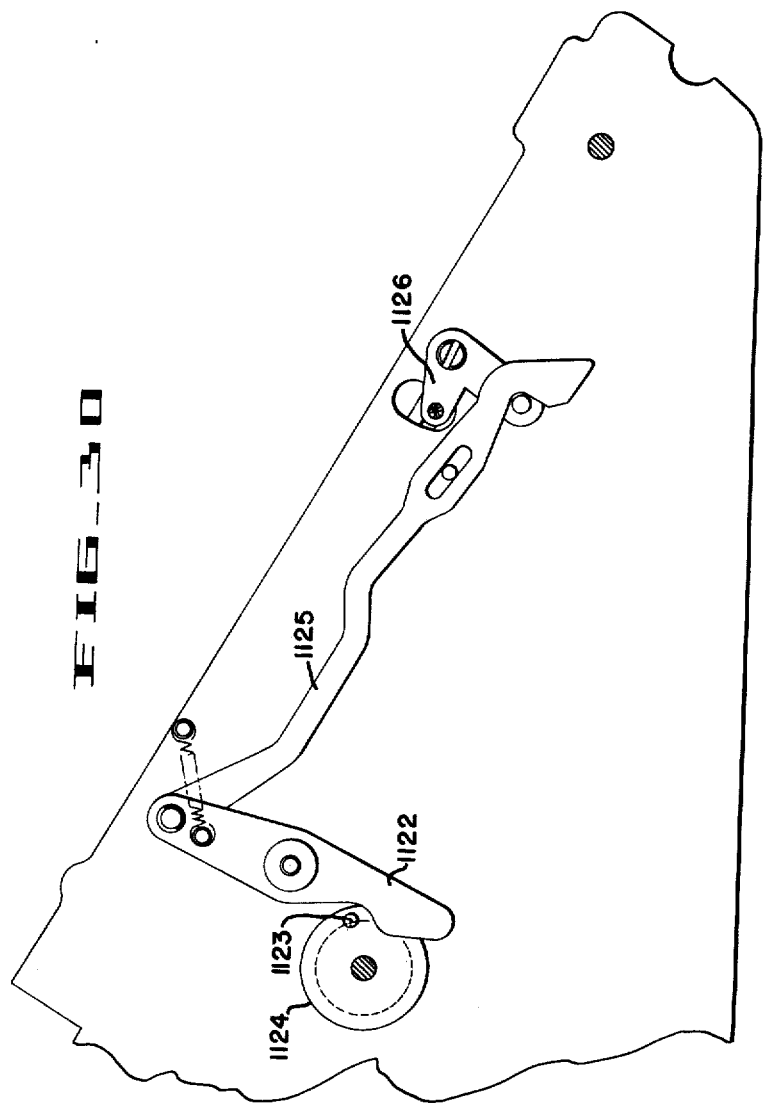

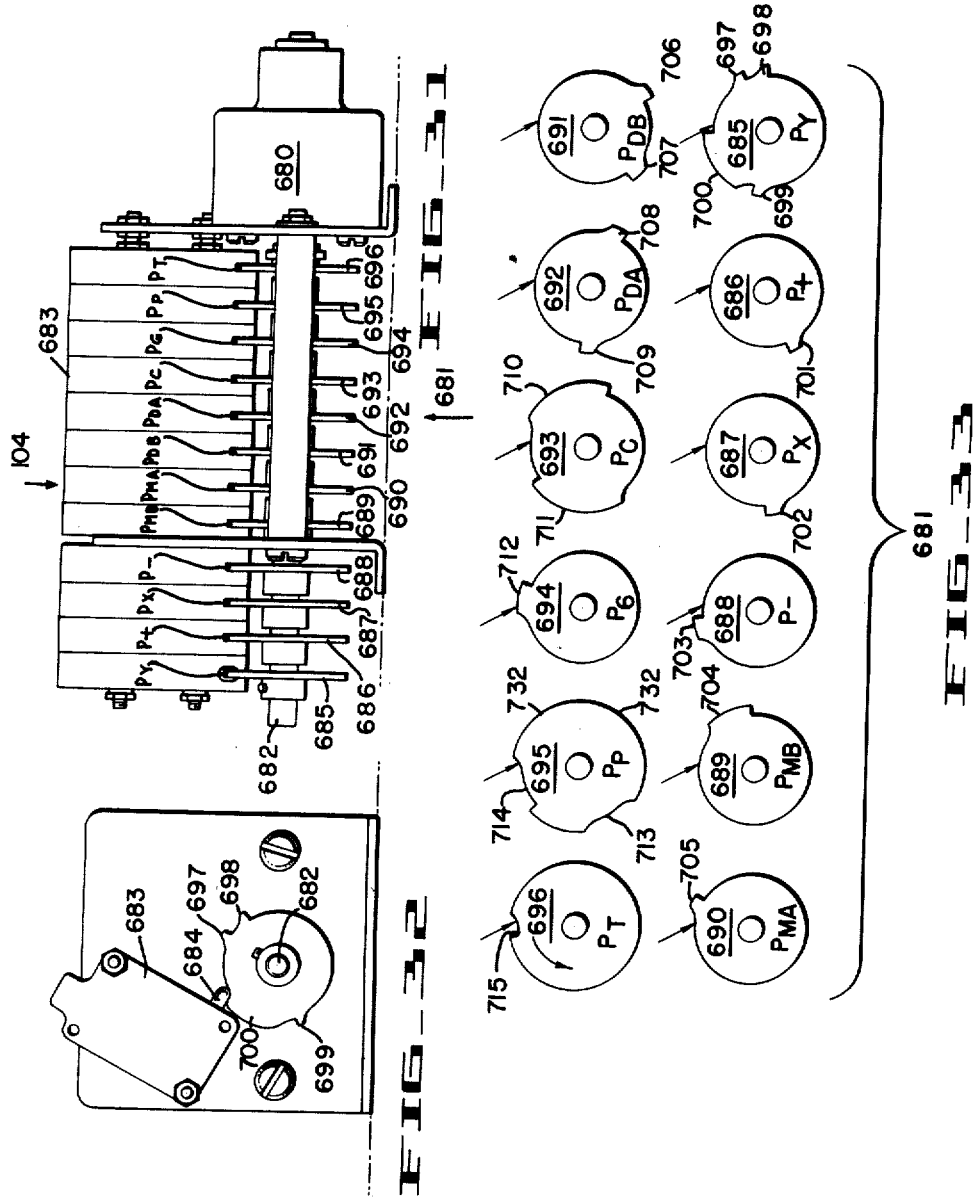

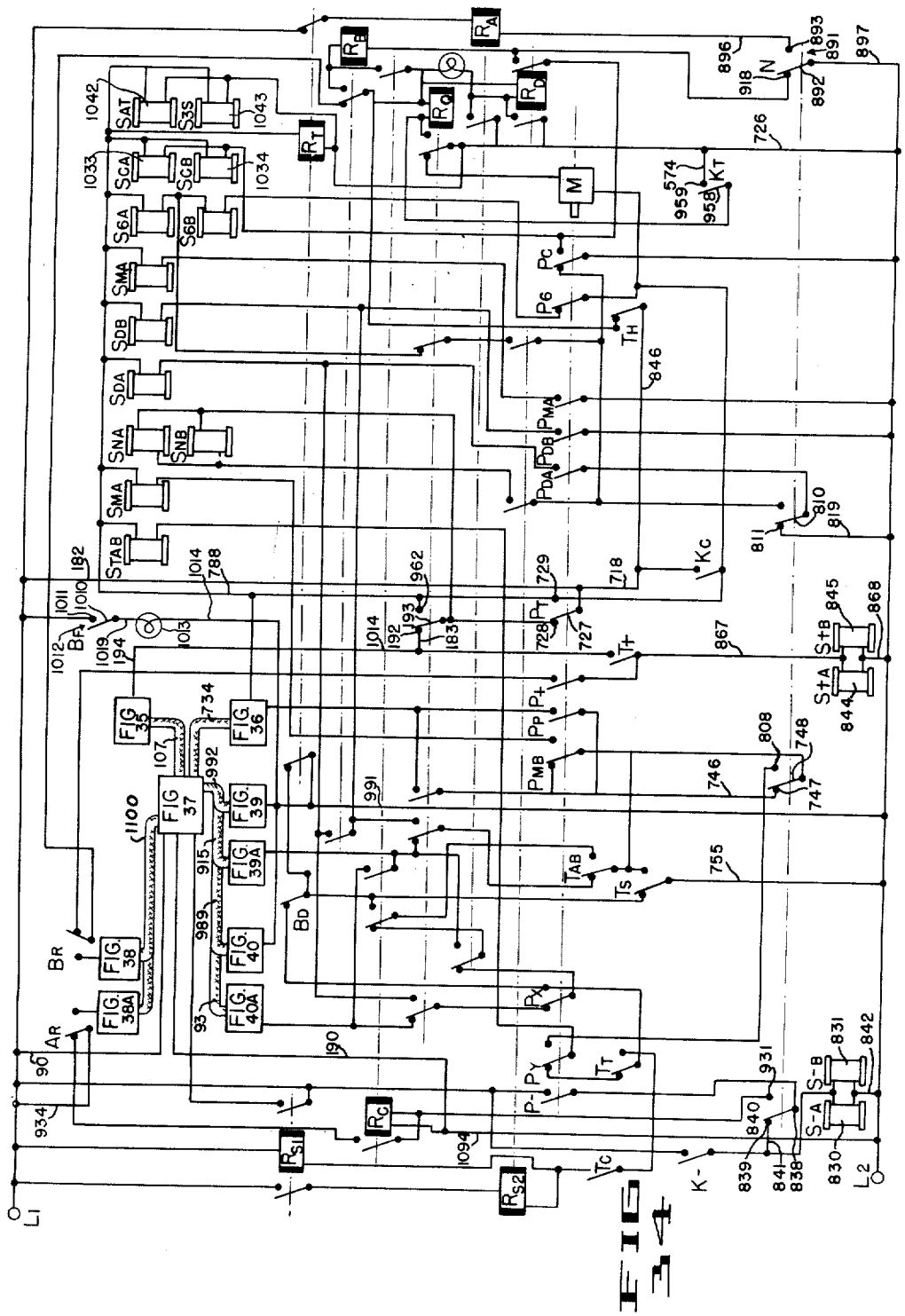

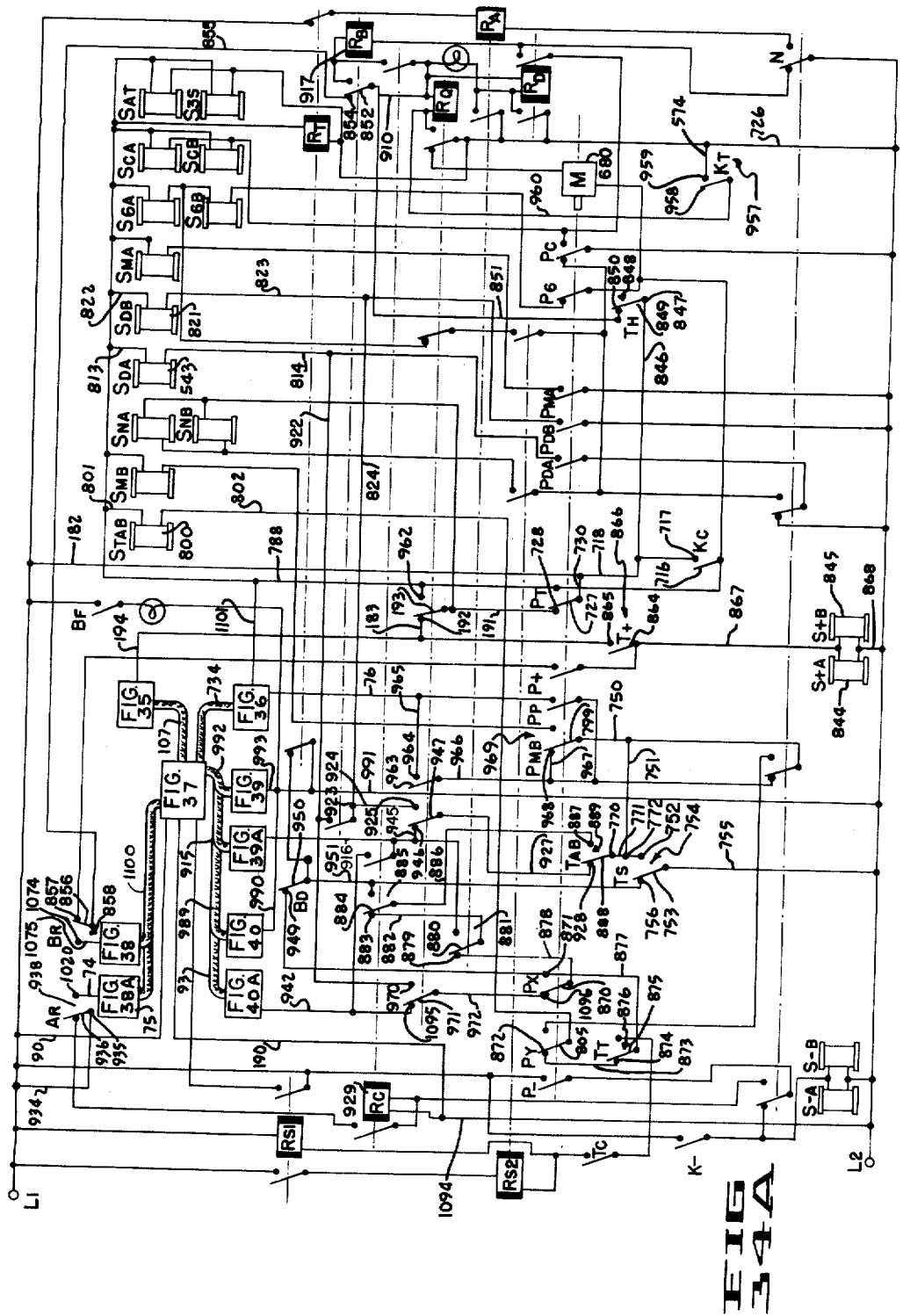

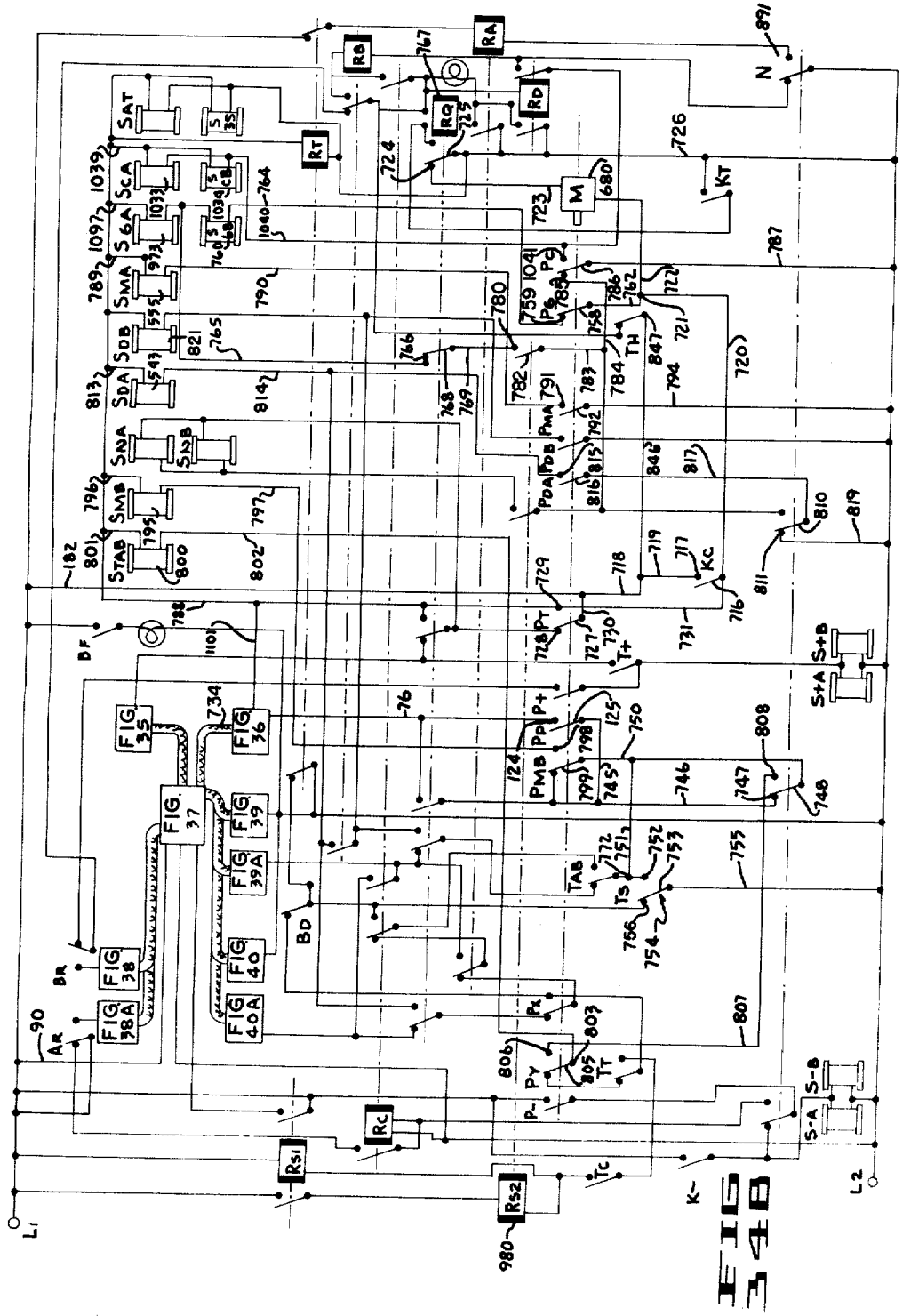

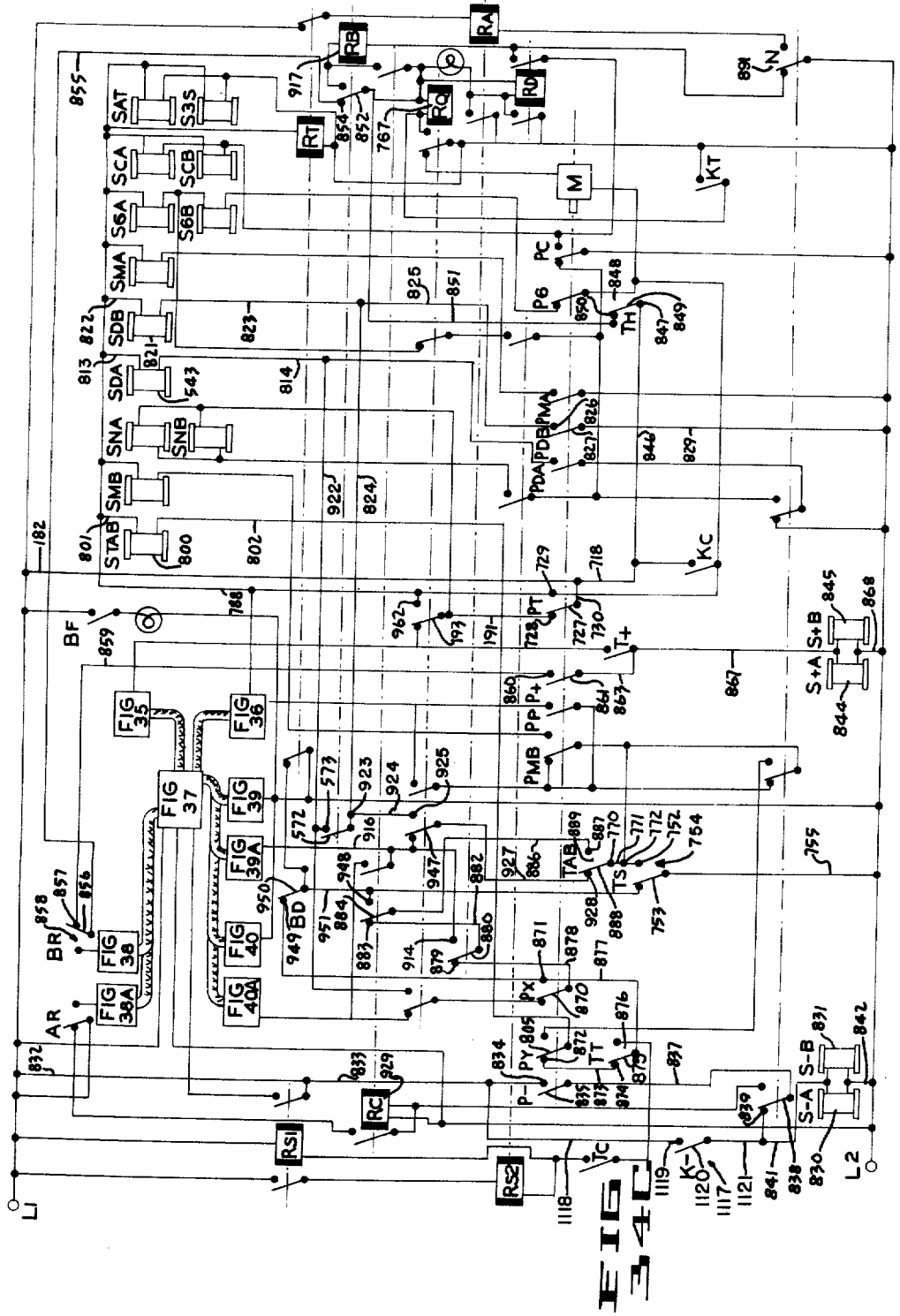

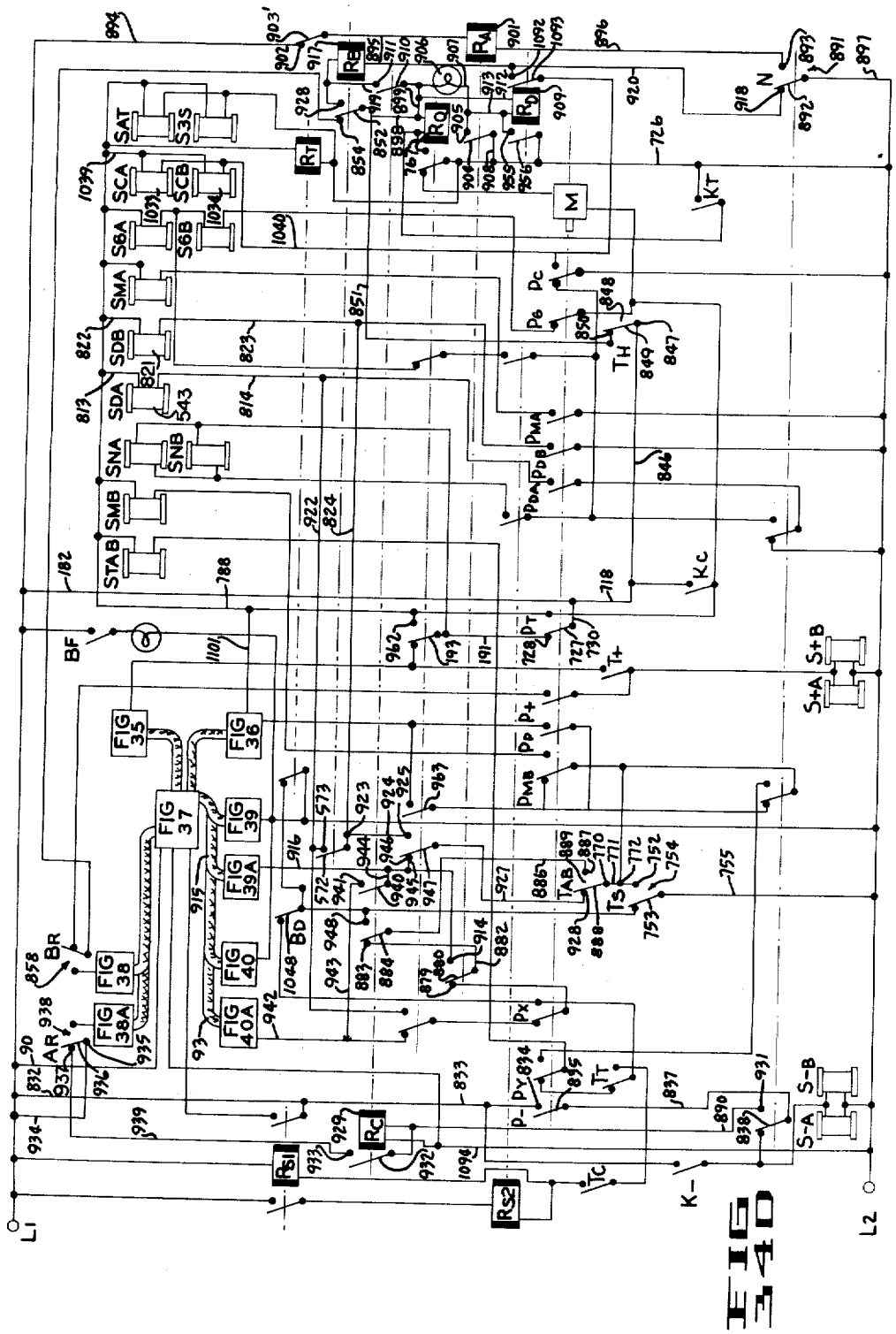

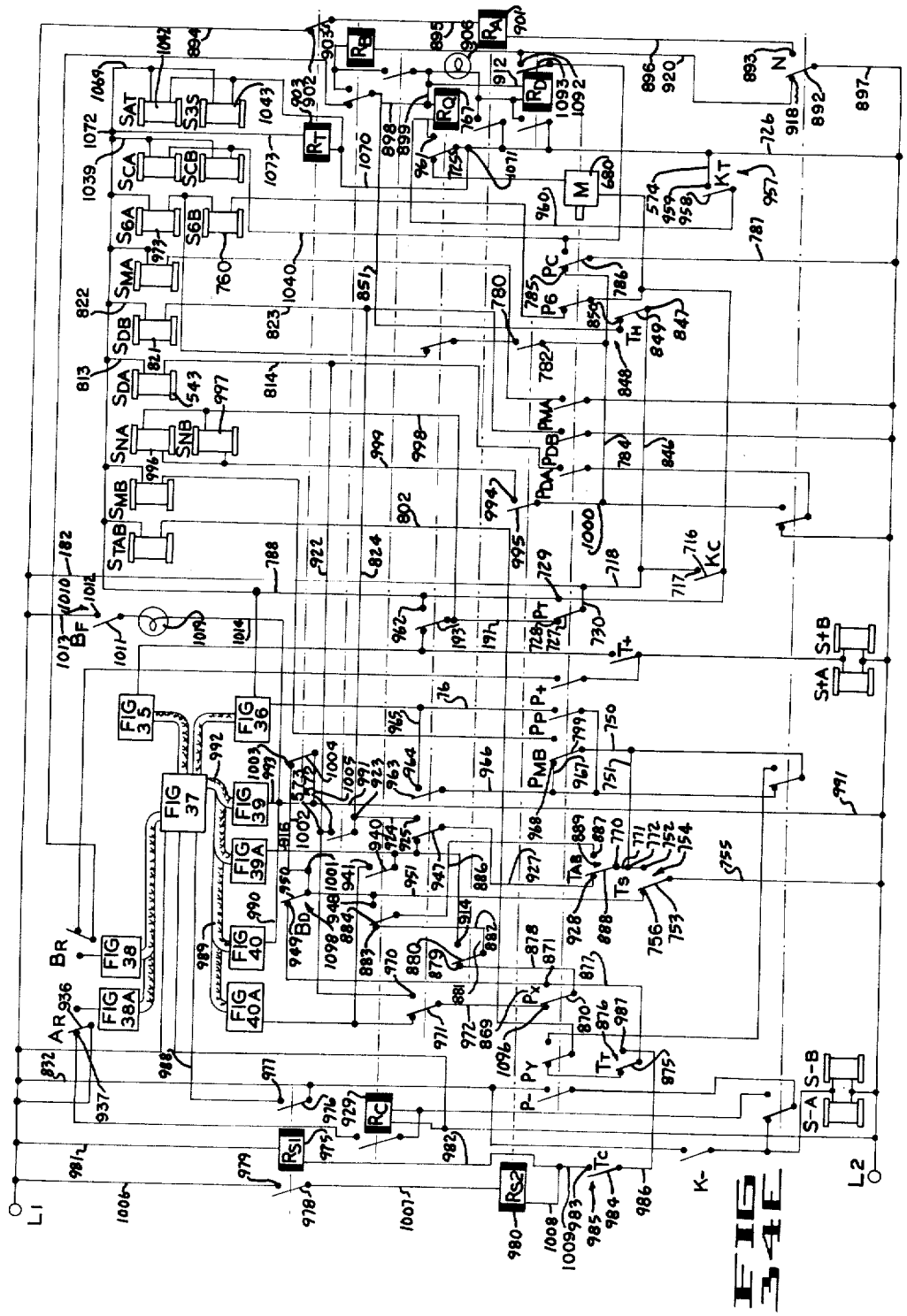

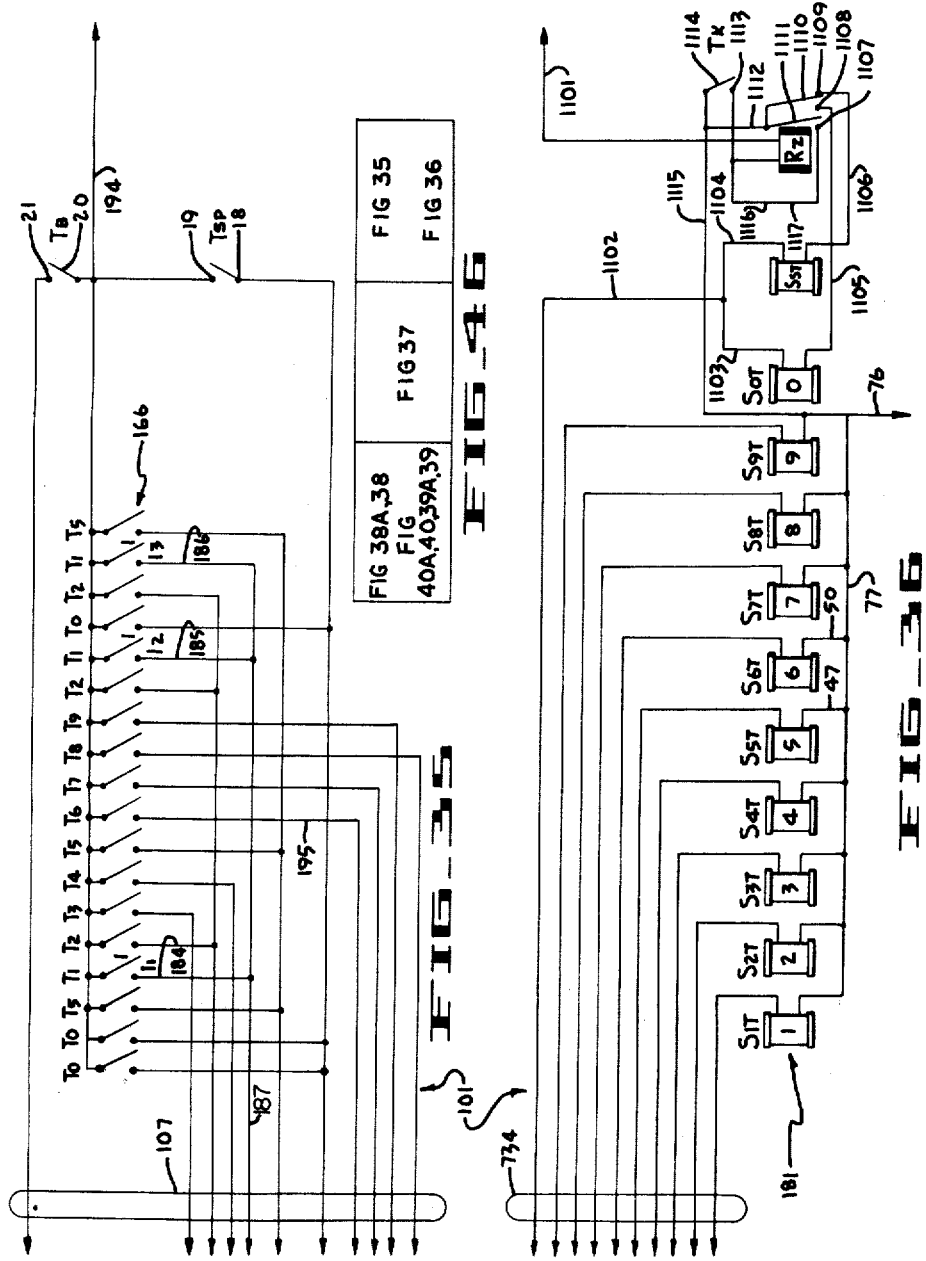

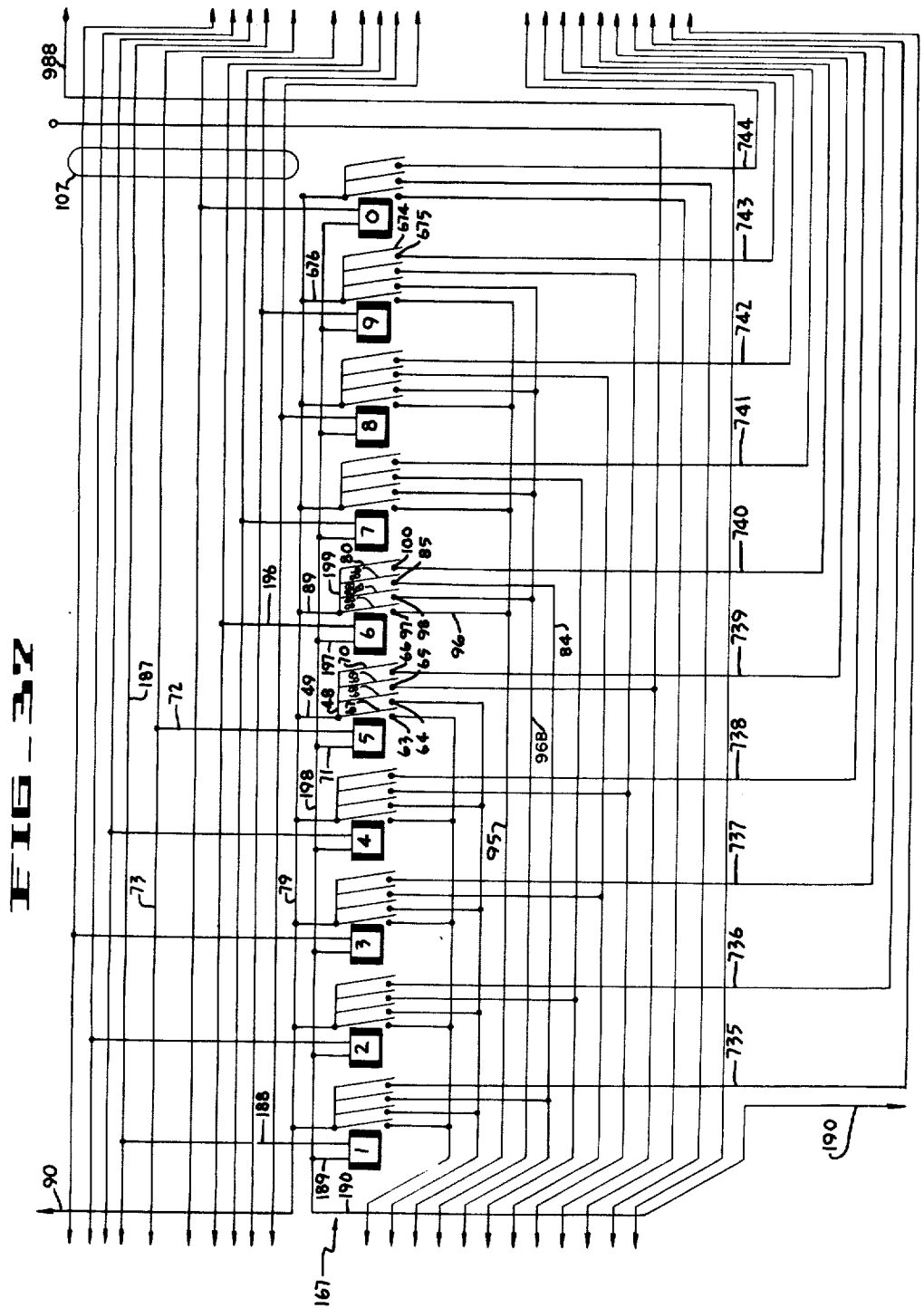

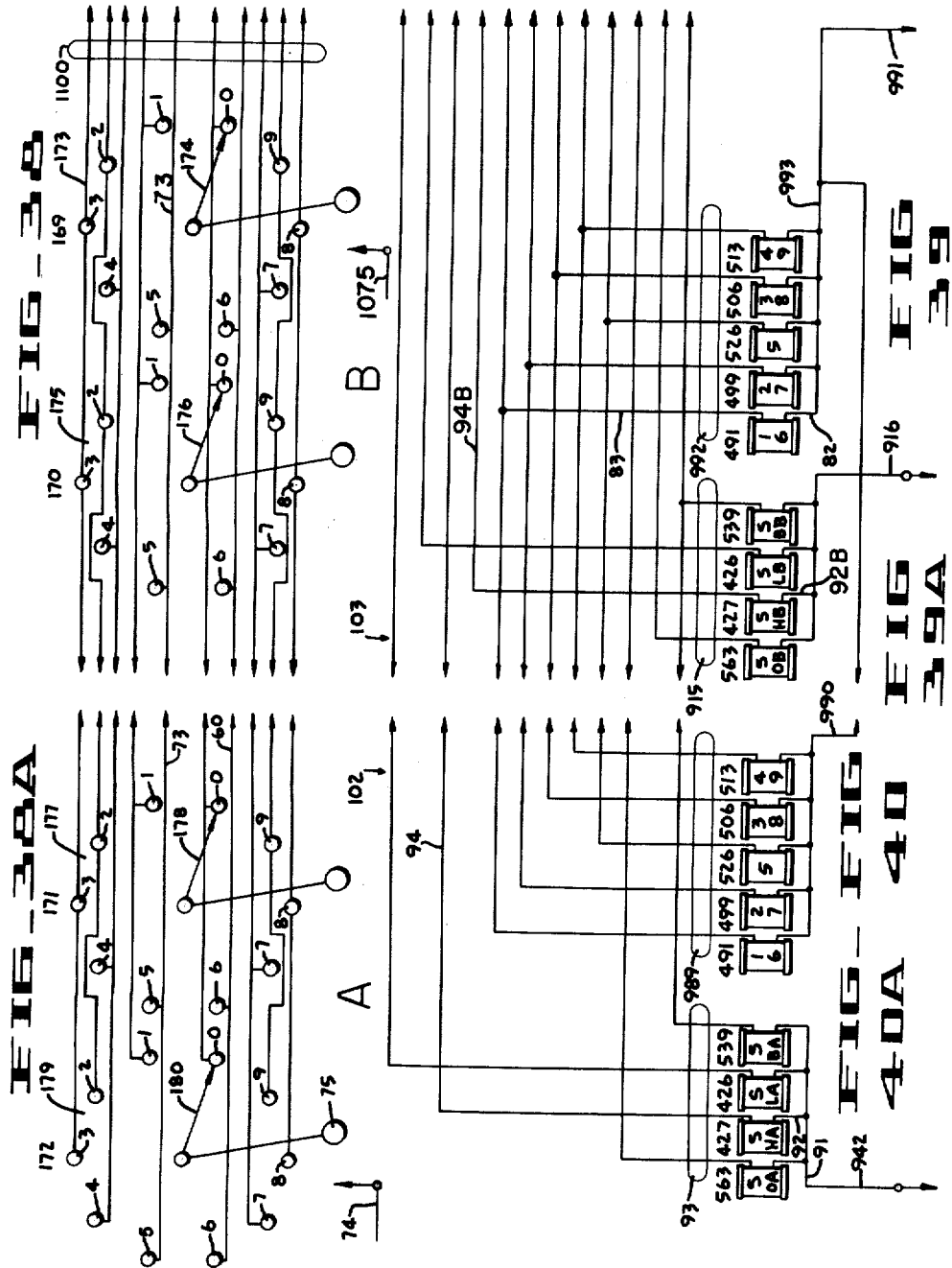

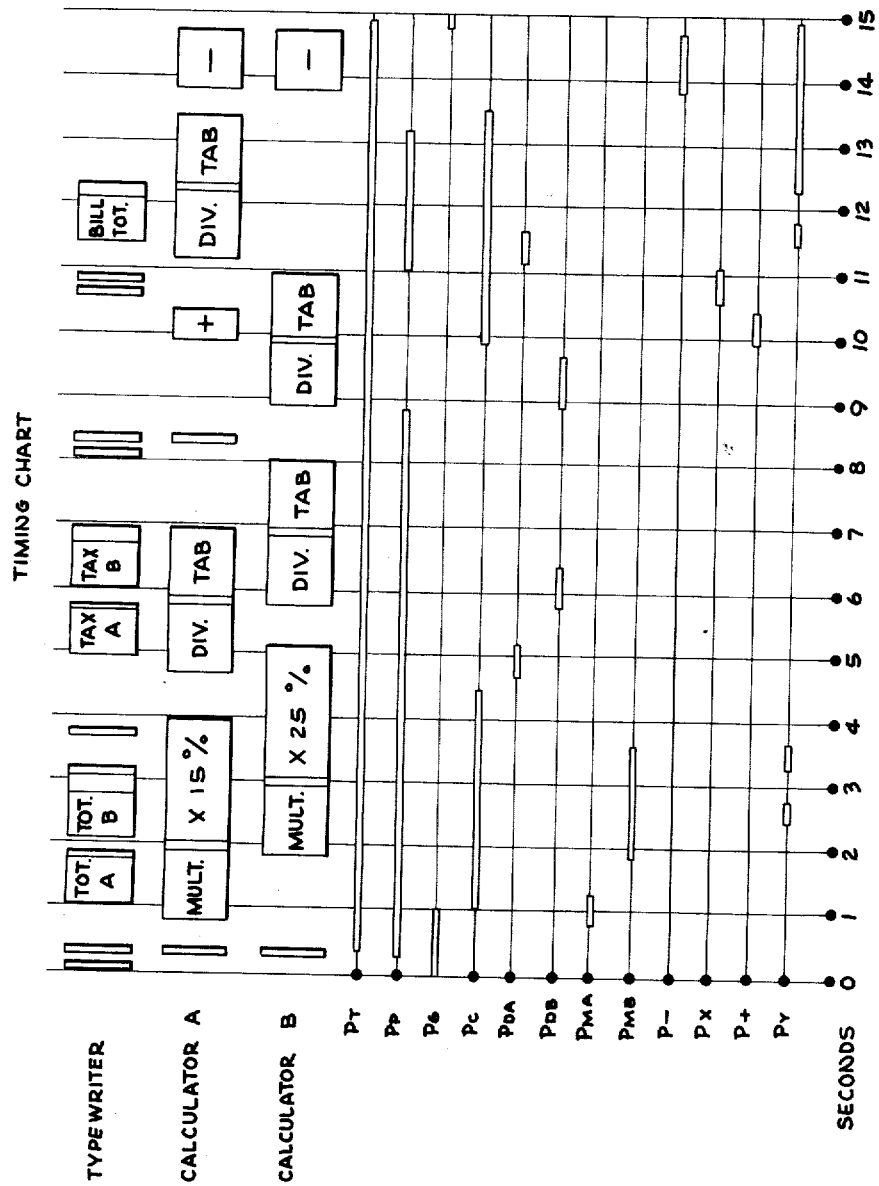

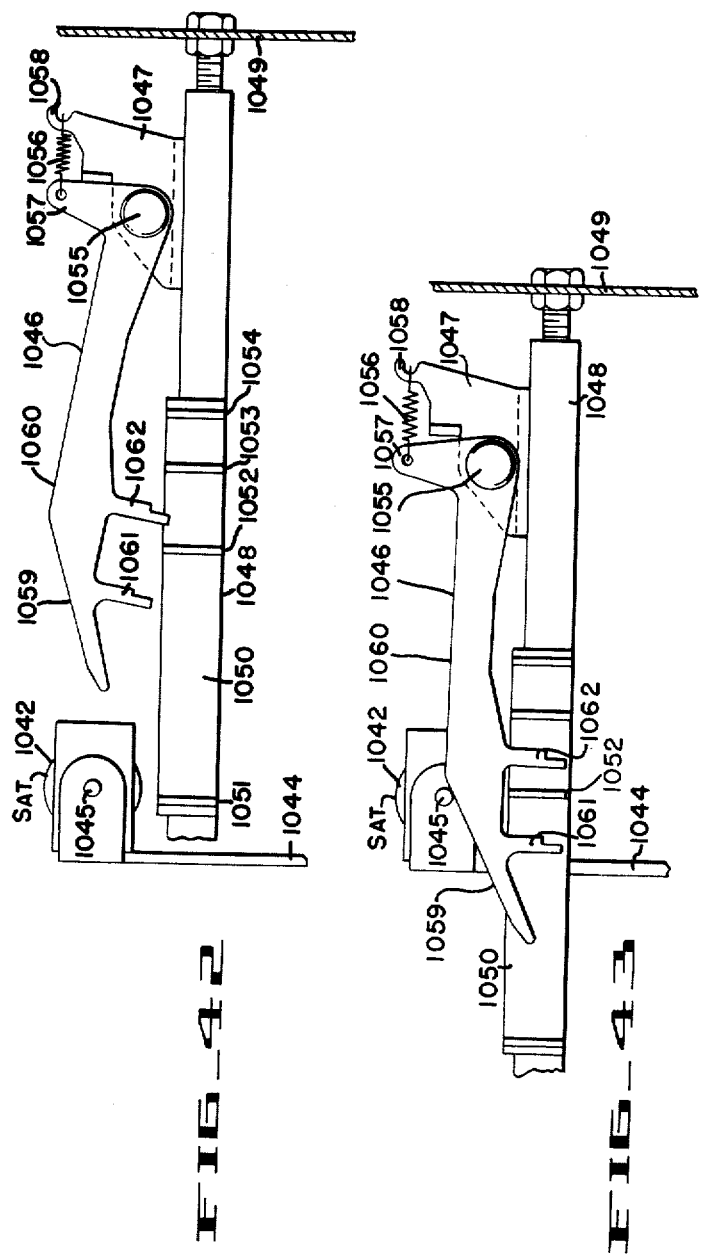

July 8, 1958 M. P. MATTHEW 2,842,310
TYPEWRITER CONTROLLED CALCULATORS
Filed Sept. 15, 1953 30 Sheets-Sheet 30

FIG_45

PR 6 3600     TOLL SERVICE AND TELEGRAMS

| | PLACE CALLED | MESSAGES TAXED AT 15% | OTHER MESSAGES |
|---|---|---|---|
| AUG | | | |
| 1 | S MTO | | |
| 5 | BOSTON T | 15 | 220 |
| 14 | CGO | 231 | 275 |
| 17 | DET | | 1035 |
| 23 | N Y | | |
| | NON TAX ITEMS | | |
| 1 | ALBQ | | 125 |
| 3 | SAC | | 50 |
| 6 | N Y | | 370 |
| TOTALS OF ABOVE SERVICE CHARGES | | 246 | 2075 |
| U.S.—TELEPHONE MESSAGES UNDER 25¢ EACH AND 15% | | | |
| TAX ALL DOMESTIC TELEGRAPH MESSAGES | | | |
| TELEPHONE MESSAGES OVER 24¢ EACH—25% | | | |
| INTERNATIONAL TELEGRAPH MESSAGES—10% | | 37 | 383 |
| TOTAL CARRIED TO BILL | | | 2741 |

FIG_44

HU 3 0152     TOLL SERVICE AND TELEGRAMS

| | PLACE CALLED | MESSAGES TAXED AT 15% | OTHER MESSAGES |
|---|---|---|---|
| AUG | | | |
| 3 | NILES | | 115 |
| 4 | MGA | 15 | |
| 10 | ML VY | 20 | 25 |
| 13 | L A | 20 | 210 |
| 19 | S J | | |
| 24 | " | | |
| TOTALS OF ABOVE SERVICE CHARGES | | 55 | 350 |
| U.S.—TELEPHONE MESSAGES UNDER 25¢ EACH AND 15% | | | |
| TAX ALL DOMESTIC TELEGRAPH MESSAGES | | | |
| TELEPHONE MESSAGES OVER 24¢ EACH—25% | | | |
| INTERNATIONAL TELEGRAPH MESSAGES—10% | | 8 | 88 |
| TOTAL CARRIED TO BILL | | | 501 |

United States Patent Office 2,842,310
Patented July 8, 1958

2,842,310

TYPEWRITER CONTROLLED CALCULATORS

Morton P. Matthew, Berkeley, Calif., assignor to Friden, Inc., a corporation of California Application September 15, 1953, Serial No. 380,241

8 Claims. (Cl. 235—60.12)

This invention relates to calculating and recording apparatus, and more particularly to calculating and recording apparatus operable to print notations and base figures; make required calculations and print the resulting figures on a record sheet.

The object of the invention is to provide improved means for calculating and printing business information, for example, bills to customers.

A feature of the invention resides in an improved automatic typewriter operable to be controlled by means of a calculator apparatus.

Another feature resides in an improved calculator apparatus operable under control of the typewriter.

Another feature resides in a selection solenoid unit for controlling the setting of selector slides in the calculator.

Another feature resides in a control unit cooperably operable to control printing out operation of the typewriter and selection in the calculators.

Another feature resides in a distributor switch structure and arrangement controlled by means of the numeral dials of the calculator apparatus.

Another feature resides in an improved multiplier in the calculator apparatus.

Another feature resides in a triple space mechanism for the typewriter.

Another feature resides in an auxiliary tab stop provided in the typewriter.

Another feature resides in the combination of the improved typewriter and the improved calculator apparatus.

In the drawings:

Fig. 1 is a view in perspective of a complete assembly of the improved typewriter and caclulator apparatus mounted in an improved office desk.

Fig. 2 is a schematic view of the apparatus shown in Fig. 1, and shows the arrangement of the typewriter, calculators, and control unit which comprise the machine.

Fig. 3 is a side view, partly in section, of a portion of a typewriter modified in accordance with this invention and showing a switch operated by a typewriter type mechanism and also a typical solenoid which operates a typewriter numerical key.

Fig. 4 is a side view of a portion of a calculator modified in accordance with this invention and showing solenoids mounted on the calculator and operable to operate push keys and another movable member of the calculator and operable to control various operations in the calculator.

Fig. 5 is a side view, partly in section, of a portion of a calculator modified in accordance with the present invention, and showing a numeral dial forming part of the readout portion of the calculator.

Fig. 5A is a top view, partly in section, of a portion of the structure shown in Fig. 5 and shows more clearly the wiper contact of a switch.

Fig. 6 is a top plan view of the portion of the calculator shown in Fig. 5, but rotated 90° counter-clockwise from the position shown in Fig. 5, and with the left-hand portion of the illustration in Fig. 5 removed.

Fig. 6A is a top plan view of one of the numeral dials cut partly away to form a cam and operating a switch.

Fig. 7 is an enlarged top plan view, partly in section, showing stator members and wiring of the stator members of a bank of distributor switches provided on the carriage of a calculator such as shown in Fig. 6.

Fig. 8 is an enlarged front elevational view of the left and left central portions of a selection solenoid unit involving a solenoid controlled system of gates and a stepping cam shaft for controlling the operation of the selecting slides of a calculator.

Fig. 9 is a complemental figure to Fig. 8 and shows the right and right central portions of the selection solenoid unit. Some of the parts and portions thereof shown in the right-hand portion of Fig. 8 are shown again in the left-hand portion of Fig. 9.

Fig. 9A shows the stepping cam shaft shown in Figs. 8 and 9, the stepping cam shaft being broken at one point and shown in two parts merely for convenience in getting the illustration in the available space on the drawing.

Fig. 10 shows four gate bars employed in the selection solenoid unit shown in Figs. 8 and 9.

Fig. 11 is a side view, partly in section, of a portion of the calculator selection, selection solenoid unit and involving a solenoid controlled escapement for the stepping cam shaft employed in the selection unit of the calculator for controlling the setting of the selecting slides of the calculaor.

Fig. 12 is a top view of a portion of the structure shown in Fig. 11 and with the solenoids removed.

Fig. 13 is a top plan view of the selection solenoid unit.

Fig. 14 is a front view of a portion of the upper central portion of the selection solenoid unit shown in Fig. 13 and taken on the line 14—14 and in the direction of the arrows.

Fig. 15 is a side view, partly in section, of the apparatus shown in Fig. 14 and taken in the direction of the arrows on the line 15—15, the solenoids being removed.

Fig. 16 is a side view of a fragmentary portion of the apparatus shown in Fig. 13 and shows a mounting means for the selection solenoid unit.

Figs. 17, 18 and 19 show in sequence the relative positions of parts of gear-connected members in the selector unit and show the means for restoring the calculator selection mechanism to each of its two possible starting positions.

Fig. 17A is a plan view, partly in section, of the structure shown in Fig. 17 and taken from the left of that figure.

Fig. 20 shows a ratchet control for one of the gears shown in Figs. 17, 18 and 19 and operable to cause a back spacing movement of the parts and shows means for stepping the calculator selection stepping cam shaft (in a direction opposite to the normal direction of escapement).

Fig. 21 is a rear elevational view of a portion of the calculator and shows a solenoid in control of mechanism operable to clear the carriage of the accumulator portion of the calculator.

Fig. 22 is a rear elevational view of a portion of the calculator modified by the addition of an Acro-switch operable to close during a left shift of the carriage.

Fig. 23 is a side view of the Acro-switch and associated parts shown in Fig. 22.

Fig. 24 is a side view of part of the calculator, with certain parts broken away, and shows some of the multiplier modified, some carriage return and resetting control mechanism, and a bank of adjustably positioned stop pins in a multiplier to condition the multiplier for required operation.

Fig. 25 is an enlarged view of the multiplier conditioning apparatus and shows the multiplier resetting chamber.

Fig. 26 is a view of a portion of a typewriter carriage with switches controlled thereby.

Fig. 27 is a view of a fragmental portion of the structure shown in Fig. 26.

Fig. 28 is an enlarged view of triple spacer mechanism provided in the typewriter and a solenoid control member for operating the triple spacer mechanism.

Fig. 29 is a top view of the parts shown in Fig. 28.

Fig. 30 is a side view of a portion of the calculator and shows an add release and pitman assembly constructed and arranged to limit the number of adding cycles in the calculator.

Fig. 31 is a side elevational view of the program switch unit involving a set of motor driven cams and a set of Acro-switches.

Fig. 32 is an end view of the unit shown in Fig. 31.

Fig. 33 shows the cams employed in the program switch.

Fig. 34 shows a simplified diagram of the electrical circuit of the machine, part of which is shown schematically. Figs. 35, 36, 37, 38, 38A, 39, 39A, 40 and 40A, together show an expansion of the schematic portion of Fig. 34, completing the electrical circuit diagram.

Figs. 34A, 34B, 34C, 34D and 34E are duplicates of Fig. 34 showing reference numbers contained throughout this description.

Fig. 35 shows a bank of numeral switches employed in connection with the typewriter bars.

Fig. 36 shows a bank of solenoids for operating the typewriter numeral bars after a calculation is made.

Fig. 37 is a circuit continuation of the circuits shown in Figs. 35 and 36, and shows the control unit numeral relays.

Figs. 38 and 38A show the electrical circuits of the calculator dial readout units.

Figs. 39 and 39A show the electrical circuits of the "B" calculator selection unit.

Figs. 40 and 40A show the electrical circuit of the "A" calculator selection units.

Fig. 41 is a timing chart for the program unit which controls various operations of the machine during a complete cycle.

Fig. 42 is a plan view of a carriage stop bar provided on the typewriter and a solenoid to cam the bar downward from the position shown for interposing two additional tab stops on the typewriter.

Fig. 43 is a view of the parts shown in Fig. 42 but with the bar cammed down by the solenoid to a required operating position.

Figs. 44 and 45 shows types of bills readily prepared by use of this invention and in which the figuring of the percentages and the totaling of the charges have been automatically accomplished by the calculators "A" and "B" and the calculated amounts have been read out to automatically control the operation of the typewriter. In preparing these bills the charges typed by the operator have been automatically entered in the calculators and through the depression of control keys by the operator, the totals, taxes and grand total have been computed and printed.

Fig. 46 shows how the sheets showing Figs. 35 to 40A, inclusive, may be relatively arranged to facilitate an understanding of the invention.

In preparing bills to customers for services or materials supplied, it is the usual practice to type notations on the bills indicating the nature of the charges and the charged amounts for each item and a total of all the amounts charged. In some cases it has become necessary to calculate percentages of the charges and to add to the regular charges on the bill the amount of the percentages calculated.

In accordance with the present invention and by means of the apparatus herein shown and described, a chargeable item may be typed on a bill, a percentage or tax on the item may be calculated and typed on the bill, and a total of the charges may be typed on the bill to indicate the total charge to the customer including the tax.

Without having the advantage of the use of this invention in the preparation of customers' bills for services or materials supplied, it is the usual practice for an operator to type notations on the bills indicating the nature of the charges, and the amount charged for each item. Normally a second operation is required for computing the bill. This usually necessitates the use of adding machines, tax charts, etc., often remotely situated from the place where the bill is originally prepared. This is sometimes done after the original preparation of the bill and frequently the computed figures must be written on the original bill by hand.

The present invention makes a neatly typed bill, accurately and rapidly computed, and printed at the same time and place the bill originates. This invention saves extra handling of the bills, and takes the place of separate equipment needed for totaling and taxing, saves handwriting of amounts, and makes it possible for the entire bill to be completed by a single operator, with a minimum amount of special training.

The apparatus provided in this invention comprises an electrical typewriter, an electrical calculator, and a program control apparatus all connected in an electrical system.

The typewriter is operable to type letter and number symbols on paper sheets when the keys of the typewriter are manually operated in the usual way. It is also operable through switches associated with movable parts of the key-controlled members to set up contact conditions in a control unit to control the operation of an electrical calculator constructed along the general lines of a type frequently employed in making arithmetical calculations. The typewriter is also operable through a set of solenoids under control of the calculator through the control unit to print on the bill amounts calculated and accumulated in the calculator.

GENERAL OPERATION

The principal components of this machine are:

(a) One typewriter
(c) Two calculators (one or more could be used)
(b) One control unit The typewriter and calculator are provided with an electrical input and output. In general, any output can transmit numerical information to any input, or combination of inputs. The transmission of any output to any input or inputs, is always via the ten numeral control relays in the control unit. Whether or not a certain output is transmitting to a certain input or inputs is determined by certain elements to be covered later. The transmission of numbers is always sequential, i. e., only one digit at a time may be transmitted.

Typewriter numeral switches

The output for the typewriter consists of a bank of switches closed by the respective numeral type bars. Mechanically these are shown in the upper part of Fig. 3. These switches set up contact conditions in the control unit to control the operation of an electrical calculator. Electrically these switches are shown in Fig. 35.

Typewriter key solenoids

The typewriter key solenoids comprise the typewriter input. These solenoids, under control of the calculator by way of the control unit, print the bill amounts calculated and accumulated in the calculator(s). Mechanically these are shown in the lower part of Fig. 3. Electrically these are shown in Fig. 36.

Calculator accumulator readout

The output for each calculator consists of six sets of readout contacts. Each set is mounted above an accumulator dial so that the position of the accumulator dial determines which numeral relay in the control unit is to be selected. Mechanically these are shown in Figs. 5, 6 and 7. Electrically the readout is shown in Figs. 38 and 38A.

In calculators of the general type that may be employed in this invention, multiplier means are provided in order that base amounts may be multiplied a required number of times and by a predetermined multiplier figure. A dividend figuring means represented by a movable tab or button and commonly called a dividend entry key, is also provided in the calculator. Calculators found suitable for use in the present invention might be, for example, of the type shown in C. M. Friden et al. Patents Nos. 2,399,917 and 2,403,273, issued May 7, 1946 and July 2, 1946, respectively, but modified in some respects to make them more suitable for control through electrical systems.

When the typewriter and calculator are equipped and arranged as indicated in this invention and the typewriter and calculator are suitably conditioned and operated, a base amount may be typed on a bill, a percentage of the base amount may be calculated and subsequently typed on the bill, and a total of the base amount and percentage may be computed and typed on the bill without requiring any manual or mental figuring of the percentage or total, and without any manual typing of the percentage and total.

The apparatus of this invention is suitable for use as a billing machine and may be used to considerable advantage in preparing bills for telephone or other services wherein some of the items charged on the bill are taxable and the taxes must be computed during the preparation of the bill. The apparatus shown herein and described is suitable for preparing a telephone bill in which a plurality of kinds of telephone calls are charged on a bill and two of the kinds of services are taxable at different rates. In order to take care of the two different rates of taxation, two calculators "A" and "B" are provided, each being set to compute a tax of a predetermined different percentage. For example, one calculator "A" may be set to compute 15% of a taxable item entered in the calculator and the second calculator "B" might be set to calculate 25% of a taxable item entered in the second calculator, as shown in Figs. 44 and 45.

The 15% taxable items are typed in the left-hand amount column of the bill by the typewriter and in doing this the position of the carriage of the typewriter is utilized to operate a switch to switch into connection with the typewriter, the "A" calculator.

The 25% taxable items and other than the 15% taxable items are typed in the right-hand amount column and in doing this the position of the carriage of the typewriter is utilized to switch into connection with the typewriter, the "B" calculator.

During the computing cycle the totals in the calculators are read out and printed, the taxes are computed and printed and the respective totals added to them. For the grand total, the amount in the "B" calculator is read out and automatically put into the "A" calculator which is subsequently read out and into the typewriter to operate the typewriter to print the grand total.

In order that the typewriter may control the operation of the calculators, electrical switches are mounted in the typewriter, such switches being operated by some moving parts of the mechanism operable each time a number key of the typewriter is operated. The electrical switches that apply to the typewriter are in control of an electrical control unit located between the typewriter and the calculators; the control unit being operable to control the calculators in accordance with the numerals typed by the typewriter and required to be entered and accumulated in the calculators. The calculator employed in each case is, in general, a conventional form of calculator, but for the purpose of making it adaptable for use in the invention, it is modified by removing the numeral keyboard and providing in place thereof a selector unit for controlling the selecting slides of the calculator.

The control unit which in the present illustration is common to the two calculators, involves a cam equipped program control unit and a system of relays controlled by the program control unit, and the key-controlled switches of the typewriter, and is operable to control a solenoid selector unit in each calculator and solenoids operable to operate push type control keys of the calculators.

A feature of the modified calculator resides in the selector unit shown in Figs. 8, 9, 9A, 10, 11, 12, 13, 14, 15 and 16, and comprises a set of four lengthwise movable gate bars, five solenoids to cause selective movements of the gate bars, and a longitudinally movable and rotatable stepping cam shaft, equipped with spirally arranged spaced projections. Solenoids are also provided in the selector unit to apply lengthwise movement to the stepping cam shaft and for other purposes as will be subsequently explained. The selector solenoid unit serves as a means to control the setting of the selecting slides of the calculator.

As shown in Fig. 1, the complete apparatus comprises four main units, namely; an electrically operated typewriter 101, a first calculator 102, a second calculator 103, and a control unit 104, the typewriter 101, calculators 102, 103 and the control unit 104 being mounted in a modified office desk 105 equipped with a hinge-supported back door 106.

A shown in Fig. 2, the typewriter 101, the calculators 102, 103 and the control unit 104 are electrically connected for automatic operation through the wire systems 107, 108 and 109, all of which are fed from a supply line 110 equipped with a plug 111 that may be connected to a suitable source of current supply, not shown. The typewriter 101, as shown briefly in Fig. 3, comprises a suitable frame 112 in which are mounted sets of manually operable keys 113 operable through linkages 114 to cause key bars 115 carrying type symbols 116 to strike a platen 117. The keys 113, linkages 114, key bars 115 and type symbols 116 as well as the platen 117, are conventional in electrically operated typewriters. In the present invention, however, the typewriter has been modified by the addition of solenoids 181 to operate the keys 113 and consequently cause the key bars 115 to operate to bring the type symbols 116 into engagement with the platen 117. The typewriter 101 has also been modified by the addition of a set of Acro-switches 166, mounted on a suitable apertured bar 120 which is mounted in the typewriter 101 so that it extends transversely across the position of linkages 114 in the typewriter structure. Bar 120 supports movable pins 126 and comprises a bracket portion 121 bolted in place by the bolts 122, the bracket 121 being apertured to receive mounting bolts 123 which extend through apertures in the switches 166. The linkages 114 are operable to move the pins 126 to operate the switches 166.

Each calculating machine employed in this invention, as above-mentioned, is modified by removal of the usual number keyboard and the provision in place thereof of a selector solenoid unit to control the operation of the selecting slides.

SELECTING SLIDES CONTROL—SELECTOR SOLENOID UNIT

The counterpart calculating machine selecting slides 54, 55, 56, 57, 58, 59, 60, 61, 62, 63, 64 and 65 shown in Figs. 8, 9 and 11, instead of being, as shown in the above-identified patents, normally urged upwardly and operated by means of push keys, are normally urged downwardly by means of springs and are controlled as to their extent of downward movement by means of a set of levers 201, 202, 203, 204, 205, 206, 207, 208, 209, 210, 211 and 212 which are pivotally supported on the selecting slides and selectively operated by means of cams 140, 141, 142, 143, 144 and 145 on a rotatable and longitudinally movable stepping cam shaft 146, having an escapement 147 which might be, for instance, of the Graham type having a wheel 148 and a pallet 149. The stepping cam shaft 146 operates to control the levers 201 to 212 inclusive, to tilt the levers on their pivotal points of support against the action of counter-weights 223. Operation of the levers 201 to 212 under the action of the cams on the stepping cam shaft 146 will permit the selecting slides to move down under urge of their springs a distance permitted by the selector solenoid unit 400 comprising the set of gate bars 224 and a toothed holding bar 225. For example, as shown in Fig. 11, the cam 145 on the shaft 146 will engage the toe portion 227 of th leg portion 226 and tilt the lever 212 so that the finger 200 of the lever 212 will move downwardly out of engagement with the holding bar 225 and to the left of the position shown in Fig. 11 and beyond one or another of the teeth 228 to 232, inclusive, on the holding bar 225, the extent of movement being controlled by the setting of the gate bars 234 to 237, inclusive, through the gateways of which the leg portion 226 may be urged more or less by means of a spring, not shown, but operable to move the selecting slides 54-65, inclusive, to the left and slantingly downward from the position shown in Fig. 11. The selecting slides may be all restored to normal position by operation of a lever 213 connected to arms 214 of a bail 215 pivotally supported at 216. The bail 215 may be moved to the right from the position shown in Fig. 11 to engage the teeth 233 on the levers 201 to 212, inclusive. Operation of the bail 215 against the teeth 233 will lift all the selecting slides 54 to 65 toward the right and upwardly to the position shown in Fig. 11, and the selecting slides will be held in this elevated position by means of the levers 201 to 212, inclusive, having their fingers 200 engaged in the teeth on the holding bar 225. The selecting slides are selectively released by operation of the cams 140 to 145, inclusive, on the rotatable and longitudinally movable stepping cam shaft 146.

The stepping cam shaft 146 may be rotated by operation of the pivotally supported curved rack 150 as shown in Fig. 17, and may be moved longitudinally by means of the solenoid-operated T-shaped lever 410 shown in Fig. 14 forming part of the calculator selector solenoid unit 400 shown in Figs. 8, 9, 11, 13 and 14.

The pivotally supported curved rack 150 has its teeth in driving engagement with the pinion 542 on the stepping cam shaft 146. When the rack 150 is swung downwardly on its pivotal point of support 151 from the position shown in Fig. 17 to the position shown in Fig. 18, the shaft 146 is rotated against the action of a spring 152, one end of which is attaced to the shaft 146 while the other end is secured at some fixed point 153. In the rotation of the shaft 146 in a counter-clockwise direction against the action of the spring 152, part of the spring 152 is, in effect, wound up on the shaft 146. The extent of windup of the spring 152 on the shaft 146 will determine the full extent of clockwise rotation of the shaft 146 when the shaft 146 is permitted to rotate back to normal position. In the operation of the apparatus of this invention the shaft 146 is operable to rotate to two separate positions other than normal, one position being called a "two-place clear position" and the other a "six-place clear position." In the "two-place clear position" the stepping cam shaft 146 will allow the selecting slides in two column positions of the calculator, to move to a selecting position. In the "six-place clear position" the cam shaft 146 will allow the selecting slides in six column positions of the calculator to move to a selecting position. Operation of the stepping cam shaft 146 to the "two-place clear position" may be accomplished by operation of a lever 214 pivotally supported on a stud 216, Fig. 17A, the lever having, through its bail 215, mechanical connection with a cam lever 156 having a cam portion 157 in bearing engagement with a roller 158 supported on a pin 159 secured to and extending from the rack 150 at a position offset from the pivotal point of support 151. In Fig. 19, the lever 161, which is rotatably supported on the stud 155, has been moved counter-clockwise from the position shown in Figs. 17 and 18, to a new position to bring its cam portion 163 into engagement with the roller 158 to cause further downward swinging of the curved rack 150 and further counter-clockwise rotation of the cam shaft 146 to obtain a six-place clear position of the stepping cam shaft 146. The levers 214 and 161 are located on opposite sides of the calculator and are separately controlled by the respective rods 213 and 165 each of which is attached to the movable member of a separate solenoid, not shown in the structural drawings, but mounted on sides of the frame of the calculator, the solenoids having mechanical connection with the levers 213 or 165 as required. For example, see Fig. 34, one solenoid ($S_{NA}$ or $S_{NB}$) on one side of the frame has its movable core mechanically connected to the rod 213. Another solenoid ($S_{6A}$ or $S_{6B}$) on the opposite side of the frame has its movable member in mechanical connection with the rod 165.

The longitudinal movement of the cam shaft 146 in either direction is followed automatically by the desired clockwise rotation by virtue of the spring 152 and the escapement comprising the toothed ratchet 148, mounted on the shaft, a stop 558 mounted on the left frame of the selecting solenoid unit and a pallet 149 pivoted to the frame by a stud 559 and urged in a clockwise direction by a spring 554. The upper leg 560 of the pallet rests in a slot 561 in stop 558, the top of which restrains the pallet in the position shown. The lower leg 562 of the pallet 149 serves as a hook engaging a tooth of the ratchet and preventing undue rotation of the shaft 146 by the spring 152. Longitudinal movement of the shaft 146 in either direction from the position shown in Fig. 11 disengages the ratchet from the pallet 149 allowing clockwise rotation of shaft 146 until the stop 558 is engaged by the ratchet 148.

The selector solenoid unit 400 is operable to control the setting of the selecting slides 54 to 65, inclusive, of the calculator and comprises, as shown in Figs. 8, 9, 11, 13 and 14, an angle bar body 401 L-shaped in cross-section and operable to be mounted in a position to extend transversely across the selecting slides of the calculator. It will be appreciated that the selecting slides in a conventional calculator are operated by means of manually operated keys to control the operation and extent of rotation of numeral wheels according to the numerals to be registered in the calculator, and that in the modified calculator of the present invention the manual keyboard is dispensed with and the selecting slides are controlled in their operation by the selector solenoid unit 400.

The gate bars of the selector solenoid unit 400, as shown in Fig. 10, comprise a set 224 of bars 234, 235, 236 and 237 with teeth on the upper and lower edges. The gate bars 234 and 236 are alike on the lower edge but unlike on the upper edge. The gate bars 235 and 237 are different from the gate bars 234 and 236 and are alike on the lower edge but unlike on the upper edge.

When the gate bars 234, 235, 236 and 237 are assembled in parallel spaced relation so that the end portions are even and the teeth are in alignment, open gateways are cooperatively provided by the gate bars through the cutaway portions between the lower teeth on the gate bars. For example, open gateways 238, 239, 240 and 241 are formed between the first two teeth on the right-hand end of the lower edges of the gate bars 234, 235, 236 and 237, respectively. Open gateways are provided also through the cutaway portions 242, 243, 244 and 245. In this same position reading from right to left it will be seen that open gateways 246, 247, 248 and 249 are provided. Next in order are the open gateways 250, 251, 252 and 253 followed by open gateways 254, 255, 256 and 257. Next in order are gateways 258, 259, 260 and 261, followed by 262, 263, 264 and 265, which are followed by 266, 267, 268 and 269, next in order being 270, 271, 272 and 273 followed by 274, 275, 276 and 277, followed by 278, 279, 280, and 281, followed by 282, 283, 284 and 285, next in order being 286, 287, 288 and 289, followed by 290, 291, 292 and 293, followed by 294, 295, 296 and 297, next in order being 298, 299, 300 and 301, followed by 302, 303, 304 and 305, followed by 306, 307, 308 and 309, and the final order being 310, 311, 312 and 313. It will be seen that by shifting the gate bar 237 to the left the distance of one tooth, the gateways above-mentioned are closed since the teeth 314, 315, 316, 317, 318, 319, 320, 321, 322, 323, 324, 325, 326, 327, 328, 329, 330, 331, 332 and 333 will lie across the respective gateways in the gate bar 236, namely, the gateways 240, 244, 248, 252, 256, 260, 264, 268, 272, 276, 280, 284, 288, 292, 296, 300, 304, 308 and 312. Therefore, any heel portion 443 of a lever 211, or lever of a similar character, trying to pass through the gateways in the gate bars would be stopped by the teeth closing the gateways, and in this case the gateways are closed by the teeth in the last gate bar 237. The extent to which the heels 443 of the leg portions of the levers 211 can pass through the gateways, will be only as far as the last gate bar 237. Movement of the gate bar 237 toward the right to restore the gate bar 237 to original position, will open the gateways formerly blocked by the teeth of the gate bar 237. Movement of the gate bar 236 toward the left would close the lower ends, of the gateways 239, 243, 247, 251, 255, 259, 263, 267, 271, 275, 279, 283, 287, 291, 295, 299, 303, 307 and 311 by the respective teeth 334, 335, 336, 337, 338, 339, 340, 341, 342, 343, 344, 345, 346, 347, 348, 349, 350, 351 and 352. While the heel portions 443 are passing through the gateways under the urge of the spring-urged selecting slides, the fingers 200 of the levers 212 are tilted outwardly of the teeth 228 to 232, inclusive. When the heel portion 443 of the lever 212 strikes the tooth of a gate bar, the lever 212 is operated to bring the finger 200 into engagement with the teeth 228, 229, 230, 231, 232 depending on whether the lever 212 has encountered a tooth in a gateway near the beginning of the gateway or near the ending of the gateway or at some intermediate point. The counterweights 223 operate to urge the fingers 200 to engage the bar 225 but in a rather slow movement due to inertia of the counterweight 223 when the selecting slide is in motion.

Movement of the gate bar 235 to the left would close the lower ends of the gateways 238, 242, 246, 250, 254, 258, 262, 266, 270, 274, 278, 282, 290, 294, 298, 302, 306 and 310 in the gate bar 234 by the respective teeth 354, 355, 356, 357, 358, 359, 360, 361, 362, 363, 364, 365, 366, 367, 368, 369, 370, 371 and 372.

Movement of the gate bar 234 to the left would close the upper ends of the gateways 239, 243, 247, 251, 255, 259, 263, 267, 271, 275, 279, 283, 287, 291, 295, 299, 303, 307 and 311 by the respective teeth 374, 375, 376, 377, 378, 379, 380, 381, 382, 383, 384, 385, 386, 387, 388, 389, 390, 391 and 392.

The body 401 of the selector solenoid unit 400 has a top flange 402 and a downwardly extending flange 403 against which is secured the downwardly extending flange 399 of a shelf 404. The flange 403, as shown in Figs. 8 and 9, is formed on its lower edge to provide a plurality of spaced and apertured projections 405, 406, 407, 408, 409, 411, 412, 413 and 414 supported in the first four of which are, in the order named, posts 415, 416, 417, and 418. In the projection 409 is a rivet 419, the function of which will be subsequently explained. The projections 411, 412, 413 and 414 support the respective posts 420, 421, 422 and 423. The posts 415, 416, 417, 418, 420, 421, 422 and 423 are alternately transversely slotted to accommodate the lower edges of the alternate gate bars, the slots in each of the posts 415, 416, 417, 418, 420, 421, 422 and 423 being two in number and operating as guides for the alternate gate bars 234, 236, 235 and 237, respectively. The projection 409 supports a rivet 419 supporting a bracket 424, the shelf portion 425 of which serves as a support for the solenoids 426 and 427. Supported in the bracket 424, as shown in Fig. 15, and extending under the shelf portion 425 is a post 428, the reduced end portion of which is riveted into the body 401. The outer end of the post 428 is supported in a bar 438 secured to an ear extending upward from the bracket 424.

Rotatably supported on the post 428 is a T-shaped lever 410 having a sleeve portion 430 extending from the cross-head 431 and arranged to accommodate the post 428. The end portions 434 and 435 of the cross-head 431 are engageable by the cores 436 and 437 of the respective solenoids 426 and 427. The post portion 440 of the T-shaped lever 410 is adapted to swing in an arc and the lower end 441 of the post portion 440 is positioned in the sleeve 442 mounted on and secured to the central portion of the rotatable stepping cam shaft 146. The sleeve 442 is provided with end flanges 444 and 445 and spacing between the flanges 444 and 445 is sufficient to accommodate the lower end 441 of the post portion 440. A pin 446 extends angularly from the lower end 441 of the post portion 440 and between and into engagement with two pivotally supported levers 447 and 448 which are pivotally supported on post 428. The lower ends 447 and 448 are urged toward each other by the spring 449, the ends of which are attached to the lower ends of the levers 447 and 448. The upper ends of the levers 447 and 448 bear against the under surface of the bracket 424. The function of the levers 447 and 448 and the associated spring 449 is to restore the T-shaped lever 410 to normal position after it has been rotated by the operation of the solenoid 426 or 427.

The gate bars 234, 235, 236 and 237 are equipped on their upper edge portions as shown in Figs. 8, 9 and 10, with upwardly extending teeth to provide engagement points for pivotally supported levers operable to move the gate bars. The pivotally supported levers are operable by means of solenoids and are operable as shown in Figs. 8 and 9 to selectively move the gate bars 234, 235, 236 and 237 relative to each other and lengthwise of the position shown in Figs. 8 and 9. As shown in Fig. 8 there is a pair of levers 450 and 451 pivotally supported on pins 452 and 453 which are mounted in and extend from the body 401. The lever 450 has a leg portion 454 and an arm portion 458, the leg portion 454 terminating at its lower end in an angularly extending foot portion 456 which extends transversely across the upper edges of the gate bars 234, 235, 236 and 237. The foot portion 456 is engageable with a tooth 457 extending upwardly from the upper edge of the gate bar 234. The arm portion 458 of the lever 450 extends toward a corresponding arm portion 459 of the lever 451, the leg portion 460 of which terminates at its lower end in a foot portion 461 which extends transversely across the upper edges of the gate bars 234, 235, 236 and 237 and in one path of movement of a tooth 462 extending upwardly from the upper edge of the gate bar 237, and in one path of movement of a tooth 463 extending upwardly from the upper edge of the gate bar 234. To the right of and spaced from the levers 450 and 451 is a pair of levers 464 and 465 pivotally supported on the pins 466 and 467 respectively, the pins 466 and 467 being secured in and extending from the flange 403 of the body 401. The levers 464 and 465 are constructed, in general, like the levers 450 and 451, and have foot portions extending transversely across the upper edges of the gate bars 234, 235, 236 and 237. The foot portion 468 on the lever 464 extends into one path of movement of the upwardly extending tooth 469 on the gate bar 235. The foot portion 470 on the lever 465 extends into one path of movement of the upwardly extending tooth 471 on the gate bar 237. To the right of and spaced from levers 464 and 465, and as shown in Fig. 9, is a pair of levers 472 and 473 pivotally supported on the respective pins 474 and 475, and which are mounted in and extend from the flange 403 of the body 401. The levers 472 and 473 are, in general, like the levers 464 and 465 and have foot portions 476 and 477, respectively, which extend transversely across the upper edges of the gate bars 234, 235, 236 and 237. The foot portion 476 of the lever 472 extends into one path of movement of the upwardly extending tooth 478 on the gate bar 236. The foot portion 477 of the lever 473 extends into one path of movement of the upwardly extending tooth 479 on the gate bar 237, and into one path of movement of the upwardly extending tooth 480 on the gate bar 236. To the right of and spaced from the levers 472 and 473 is a pair of levers 481 and 482 pivotally supported on the respective pins 483 and 484 which are mounted in and extend from the flange 403 of the body 401. The levers 481 and 482 are, in general, like the levers 450 and 451 and have foot portions 485 and 486, respectively, which extend transversely across the upper edges of the gate bars 234, 235, 236 and 237. The foot portion 485 of the lever 481 extends into one path of movement of the upwardly extending tooth 487 on the gate bar 237. The foot portion 486 of the lever 482 extends into one path of movement of the upwardly extending tooth 488 of the gate bar 236, and into one path of movement of the upwardly extending tooth 489 on the gate bar 237.

The pairs of levers above-described are operable by means of solenoids to shift the gate bars longitudinally and relative to each other, to selectively close and open the gateways as required to control the operation of the selecting slide 54 to 65, inclusive. When the levers 450—451, 464—465, 472—473 and 481—482 are operated they will cause movement of any gate bar having an upwardly extending tooth in the path of movement of the levers and will operate to selectively move the gate bars as required for selective control of the selecting slides and will restore previously positioned gate bars to normal positions. The foot portions on the levers also operate to prevent overthrow movements in the gate bars.

The levers 450 and 451 are operable by means of the solenoid 491, comprising the operating coil 492, a flanged plunger 490 having a flange 493 of magnetic material, and the retainer clip 494, leg portions of the retainer clip being spring biased to snap into recesses 495 formed in the upper portions of the magnetic material legs 496, the retainer clip being in the form of a cross and made of nonmagnetic material. When the solenoid 491 is energized, the plunger 490 thrusts downward against arm portions 458 and 459 of the respective levers 450 and 451, against the action of the spring 497, and rotates the levers 450 and 451 on their pivotally supporting pins 452 and 453, respectively, and thrusts the foot portion 456 against the tooth 457 and moves the gate bar 234 to a required position. The foot portion 461 of the lever 451 is thrust in the direction of, and against, the tooth 462 on the gate bar 237 to move the gate bar 237 to a required position.

The levers 464 and 465 have their arm portions in engagement with the lower end portion of a plunger 498 of the solenoid 499 comprising the operating coil 500, the plunger 498, the flange 501 of the core of magnetic material, the pole pieces 502 and the spring clip 503, the end portions of the spring clip 503 being engaged in recesses 504 formed in the pole pieces. When the solenoid 499 is energized, the plunger 498 is thrust downward to move the levers 464 and 465 to adjust the set of gate bars 234, 235, 236 and 237 as required. The foot portion 468 of the lever 464 operates to press against an upwardly extending tooth 469 on the gate bar 235. The foot portion 470 of the lever 465 is thrust in the direction of, and against the upwardly extending tooth 471 on the gate bar 237. The levers 464 and 465 may have a return spring 497 secured at its ends to the levers 464 and 465 and operating to urge the levers against the plunger 498.

The levers 472 and 473 have their arm portions in engagement with the lower end portion of a plunger 505 of the solenoid 506 comprising the operating coil 507, the flanged core 508, the pole pieces 509 and a spring clip 510, the end portions of which engage in recesses 511 formed in the pole pieces. When the solenoid 506 is energized, the plunger 505 bears downwardly on the levers 472 and 473 and operates the levers 472 and 473 against the action of the spring 497, so that the foot portion 476, on thrusting against the upwardly extending tooth 478 of the gate bar 236, moves the gate bar 236 longitudinally to a required position and the foot portion 477 of the lever 473 thrusts against the upwardly extending tooth 479 of the gate bar 237 and against the tooth 480 of the gate bar 236 and sets the gate bars 236 and 237 in required positions relative to each other.

The levers 481 and 482 are operable by means of the plunger 512 of the solenoid 513, comprising the operating coil 514, the flanged core 515, the pole pieces 516, and the spring clip 517, the end portions of the spring clip 517 having engagement in recesses 518 formed in the pole pieces 516. When solenoid 513 is energized, the plunger 512 operates the levers 481 and 482 to move the foot portion 485 of the lever 481 against the upwardly extending tooth 487 of the gate bar 237, and the foot portion 486 of the lever 482 against the upwardly extending tooth 488 of the gate bar 236 to set the gate bars in required condition for permitting the heel portion 443 of one of the levers such for example the lever 212 to pass a required distance through one of the gateways formed cooperatively by the gate bars 234, 235, 236 and 237.

The levers 465 and 473 have a mechanical linkage extending between, and connected to them, to provide a single means for moving the gate bars 234, 235, 236 and 237 to normal position. The linkage comprises a lever arm 520 connected at one end by means of a pin 512 to the lever 465 and mechanically connected at the other end by means of a pin 522 to the lever 473, the pin 522 extending through an elongated aperture 523 in the lever 520 and into the lever 473. The lever 520 is provided with a central enlargement 524 engaged with a plunger 525 of a solenoid 526 comprising the operating coil 527, the flanged core 528, the pole pieces 529 and the spring clip 530, ends of the spring clip 530 having engagement in recesses 531 formed in the pole pieces 529. When the solenoid 526 is energized the plunger 525 thrusts downwardly on the enlargement 524 on the lever arm 520, and operates the levers 465, 473 in a counter-clockwise direction, the foot portion 470 of the lever 465 operating to thrust against the upwardly extending tooth 471 on the gate bar 237, while the foot portion 477 of the lever 473 thrusts against the upwardly extending tooth 479 on the gate bar 237, and in the direction of the upwardly extending tooth 480 on the gate bar 236. A spring latch 532 is provided to latch the gate bars 234 to 237, inclusive, against unintentional lengthwise movement. The latch comprises a bracket 533 secured to the body 401 by means of a screw 534, a spring-pressed bolt 535 which extends through the bracket 533 and through an aperture 536 formed in the flange 402 of the body 401, and a set of inverted V-shaped teeth 537 on the upper edges of the gate bars 234 to 237, inclusive. When a gate bar is moved longitudinally from its normal position, the inverted V-shaped tooth 537 on that gate bar must displace the latch bolt 535 upwardly against the action of the spring 538, the latch bolt then coming down on the opposite side of the tooth 537 on the bar under movement to insure correct positioning of the gate bar and maintaining of the gate bar in required position until an intended movement is applied to the gate bar.

It will be seen that the levers 450, 464, 472 and 481 are individually operable to selectively move the associated gate bar to required position, and that the levers 451, 465, 473 and 482 are operable to restore any previously positioned gate bar to normal position.

The gate bars 234 to 237, inclusive, may be selectively moved longitudinally in different combinations as required, by suitable selective operation of the solenoids 491, 499, 506, 513 and 526.

The selector solenoid unit 400 is removably attached to a calculator by means of hooks 439—439 supported on the unit 400 and engageable with pins 139—139 extending from frame walls 138—138 of a calculator. Screws 137 mounted in the hooks 439 and having conical end portions 136 engageable with apertured portions of the body 401 are operable to urge the hooks 439 into engagement with the pins 139.

SELECTING SLIDES

The selecting slides in calculators of the type shown in Figs. 1 and 2, are arranged in pairs so that there is a separate pair of selecting slides for each order of digits. One selecting slide in the pair is operable by keys representing digits from "1" to "5," inclusive, and the other selecting slide in the pair is operable by keys representing digits from "6" to "9," inclusive. When keys representing digits from "1" to "5" are operated in a particular order or column, one of the selecting slides of the pair serving that order is moved against the action of its restoring spring. When keys representing digits from "6" to "9," inclusive, are operated in the same particular order the other selecting slide of the pair is operated. Each selecting slide controls the positioning of a gear relative to an actuator, comprising a toothed rotatable cylinder, the actuator being operable through the gear controlled by the selecting slide, and a system of gears to drive the numeral wheels in a register part of the calculator.

In the present invention the selecting slides are normally spring loaded and are selectively released by operation of a stepping cam shaft 146 which trips latches on the selecting slides to allow the selecting slides to move against a system of gate bars, 234 to 237, inclusive, which are operated to control the extent of movement of the selecting slides. The gate bars are moved by means of levers which are operable by means of the solenoids 491, 499, 506, 513 and 526, which are selectively operated either by operation of numeral keys of the typewriter 101 when records are being put into the calculator 102 or 103, or by operation of a readout means comprising numeral wheel operated switches in the calculator. The stepping cam shaft 146 is rotatable and longitudinally movable and is positioned transversely of the selecting slides 54 to 65, inclusive, as shown in Figs. 8 and 9, and in position to control the levers 201 to 212, inclusive, provided on the selecting slides 54 to 65, inclusive. The stepping cam shaft 146 is provided with the cams 140 to 145, inclusive, which are progressively distributed in a helical pattern about the cylindrical outer surface of the shafts as shown in Fig. 9a. Normally the stepping cam shaft 146 is positioned so that upon suitable rotations of the shaft the cam 140 will extend into a space between the selecting slides 54 and 55, the cam 141 will extend into a space between the selecting slides 56 and 57, the cam 142 will extend into a space between the selecting slides 58 and 59, the cam 143 will extend into a space between the selecting slides 60 and 61, the cam 144 will extend into a space between the selecting slides 62 and 63 and the cam 145 will extend into a space between the selecting slides 64 and 65. In this position, if the stepping cam shaft is rotated, the cams on the stepping cam shaft will have no effect on the levers 201 to 212, inclusive, on the selecting slides 54 to 65, inclusive. The stepping cam shaft 146 however, is longitudinally movable to either the right or the left as required to bring the cams 140 to 145, inclusive, in register with the latches on the right-hand selecting slides of each pair or the left-hand selecting slides of each pair. The digits in the typewriter and the calculator from "1" to "9" are divided into two orders; namely, a low order for "1" to "5" and a high order from "6" to "9." In the calculator and with reference to Figs. 9 and 8, the selecting slides 54, 56, 58, 60, 62 and 64 are the selecting slides for the low order digits in the calculator. The selecting slides 55, 57, 59, 61, 63 and 65 are the selecting slides for the high order digits in the calculator. When a key in the typewriter 101 is pressed to type a required digit on a record sheet, suitable solenoids in the selector solenoid control unit 400 are energized to insure that the required digit will be entered into the calculator, in cases where calculation is required.

With reference to Figs. 13 and 14 and assuming that the digit operated in the typewriter is of a low order, from "1" to "5," the solenoid 426 in the control unit 400 will be energized to cause the shaft 146 to move to the left of the position shown in Figs. 8 and 9. This will bring the cams on the stepping cam shaft 146 into register with the latches on the left-hand selecting slides 54, 56, 58, 60, 62, and 64 in the calculator and upon suitable rotation of the stepping cam shaft 146, the cams 140 to 145, inclusive, will individually operate to release an associated latch on a selecting slide of the low order, the selecting slide being, in turn, released to bear against the system of gate bars 234 to 237, inclusive. If the digit to be entered into the calculator is a digit "1," the solenoid 491 will be operated to operate the levers 450 and 451 to selectively position the gate bars 234 to 237, inclusive, to such relative positions that the appropriate left-hand selecting slide in the calculator will be permitted to move downwardly under the action of its spring to bring a required gear in the calculator into engagement with the appropriate actuator in order that the required digit may be entered into the calculator. If the digit key operated in the typewriter is one of a high order, from "6" to "9," the solenoid 427 in the selector solenoid control unit 400 will be energized to move the cam shaft 146 to the right of the position shown in Figs. 8, 9 and 9a. In this case when the cam shaft 146 is suitably rotated, the cam 140 will have the effect of releasing the selecting slide 55; cam 141 will have the effect of releasing the selecting slide 57; cam 142 will effect releasing of the selecting slide 59; cam 143 will effect releasing of the selecting slide 61; cam 144 will effect releasing of the selecting slide 63; and cam 145 will effect releasing of the selecting slide 65. Release of the selecting slides will bring them into control of the gate bars 234 to 237, inclusive, which are selectively controlled and operable to the required positions by operation of the solenoids 491, 499, 506, 513 and 526. If the high order digit to be entered is the digit "9," the solenoid 513 will be energized to operate the levers 481 and 482 to relatively position the gate bars 234 to 237, inclusive, so that the high order selecting slide for the digit "9" will be allowed to pass through the gateways in the gate bars 234 to 237, inclusive, to bring the gear system in the calculator into position for operation by the actuator for the digit "9" in the caculator to enter into the calculation, the digit "9."

The gate bars 234, 235, 236 and 237 may be relatively moved to positions to permit the selecting slides in the calculator to move to positions for putting into the calculation the digits "1" to "9," inclusive, by selective operation of the solenoids in the selector solenoid control unit 400. By operation of the solenoids in combination as follows the digits "1" to "9" may be entered in the calculator: solenoids 426 and 491 for the digit "1"; solenoids 426 and 499 for the digit "2"; 426 and 506 for the digit "3"; 426 and 513 for the digit "4"; 426 and 526 for the digit "5"; 427 and 491 for the digit "6"; 427 and 499 for the digit "7"; 427 and 506 for the digit "8"; 427 and 513 for the digit "9." The shaft 146 is operable to be rotated in one direction against the action of a spring and is controlled in its reverse rotation by means of an escapement 147 involving the ratchet wheel 148 and the pallet 149. The pallet 149 is operable in one direction by means of the plunger 552 of a solenoid 553 against the action of a return spring 554, one end of which is secured to the pallet 149, the other end being attached to a fixed support. Operation of the solenoid 553 steps the stepping cam shaft 146 one escapement step for each pulse to permit the calculator to record a zero.

The ratchet wheel 148 has a special tooth 128 of such dimension that it will not pass free of the sides of the slot 561 in the stop 558 when the shaft 146 is moved lengthwise. This prevents further progressive escapement of the cam shaft 146 when the special tooth 128 reaches the stop 558.

The stepping cam shaft 146, as shown in Fig. 20, may be backspaced in steps by operation of a solenoid 539, the plunger 540 of which bears against a pivotally supported pawl 541 operable downwardly under the thrust of the plunger 540 and against the pinion 542 on the shaft 146. The solenoid 539 may be under control of a corresponding solenoid or relay in control of the backspace member on the typewriter 101.

CONTROL OF FUNCTIONAL KEYS IN CALCULATORS

The calculators employed in this apparatus are provided, as shown in Fig. 4, with solenoid members to control various functional keys or other usual manually operable members of the calculator to make the calculator operate to add, subtract, multiply or calculate numbers as required. The solenoids may be controlled from a typewriter position and through a suitable control unit. As shown in Fig. 4, there is a solenoid 543 having a plunger 544 in engagement with a dividend key 545 on the calculator. There is also a solenoid 546 having a plunger 547 in engagement with the minus key 548 of the calculator; a solenoid 549 having a plunger 550 in engagement with the add key 551 of the calculator; a solenoid 555 having a plunger 556 in engagement with a lever 557 is provided to control the multiplication apparatus of the calculator. Energization of the solenoids 543, 546, 549 and 555 above-mentioned would be equivalent to manual depression of the usually manually operated functional keys of the calculator. Since the solenoids can be remotely controlled they may be controlled either from a typewriter position or from a suitable control box located at some convenient point and from a control unit operating to make the typewriter apparatus, and the calculators go through a required cycle of operations in recording numerals, calculating amounts, taking percentages of amounts, summing up the amounts and typewriting the amounts on a suitable record sheet. Since the calculators are provided with solenoid means to operate various control keys thereof and with solenoid controlled means for operating the selecting slides of the calculator, and with the solenoids, in control of a calculator, in control of the keys of a typewriter, it is quite apparent that required amounts may, in effect, be put into the calculator apparatus by operation of the digital keys of a typewriter; that the calculator may be set into operation to add, subtract, or multiply the amounts accumulated therein, and that the calculator may be, in effect, made to read back into the typewriter and control the typewriter keys to type the amounts accumlated and calculated in the calculator.

As shown in Figs. 35, 36, 37, 38 and 39, an electrical system is provided between the typewriter apparatus 101 and the calculating apparatus 102—103. Fig. 35 shows a set of switches 166 operable by means of the numeral type bars of typewriter keys 129 shown in Fig. 3. Fig. 37 shows a set 167 of control unit relays which are operable to relay signals from the typewriter to the calculators and from the calculators to the typewriter or from one calculator to another or itself. In the typing-in operation the relays in the set 167 are controlled by means of the switches shown in Fig. 35, the control unit relays 167 being operable to control a set of solenoids in the solenoid selector unit 400 shown in Figs. 8 and 9 and contained in the calculator. The control unit relays 167 are also in circuit connection with readout selector switches shown in Fig. 38, and which are supported on parts of the calculator apparatus involving numeral wheels of the calculator and the carriage of the calculator apparatus. The switches of Figs. 38 and 38a are used as readout switches to read out amounts accumulated in the calculators. Figs. 39, 39a, 40 and 40a show the selection gate solenoids and the escape shaft solenoids of the selector solenoid unit 400, which are in circuit connection with the control unit relays shown in Fig. 37. The selector solenoid unit 400 is also shown in Figs. 13 and 14. Both sets of solenoids shown in Fig. 36 and Fig. 39 are controllable either together or one set at a time by the control relays shown in Fig. 37. The switches 166 shown in Fig. 35 are controlled by means of the typewriter number keys representing the numbers from "0" to "9" and are identified in Fig. 35 as $T_0$, $T_1$, $T_2$, $T_3$, $T_4$, $T_5$, $T_6$, $T_7$, $T_8$, and $T_9$ switches, there being duplications of the switches $T_0$, $T_5$, $T_1$, $T_2$, by reason of the automatic two-digit keys on the typewriter. Each of the switches 166 can be closed by operation of the associated typewriter key to control an associated control unit relay in the set of relays 167 shown in Fig. 37 and numbered from "1" to "0." The relays 167, shown in Fig. 37, are used in extending the control from the typewriter switches 166 to, in the first place, solenoids, shown in Fig. 39, in the selector solenoid unit 400 shown in Figs. 8, 9, 11, 13, 14 and 15, and comprising in each calculator the solenoids 491, 499, 506, 513, and 526, which are operable to selectively control the set of gate bars 234, 235, 236 and 237, which are selectively operated to control the movement of selecting slides in the calculators "A" and "B" shown in Figs. 1, 2 and 34. When the switches 166 are operated, by means of the typewriter keys, and the corresponding control unit relays 167, shown in Fig. 37, and representing the same numerals, as are represented by the operated typewriter keys and accompanying switches are operated, the required solenoids in the selector solenoid unit 400 are suitably operated to selectively operate the gate bars in the selector solenoid unit 400 so that selecting slides in the calculating machines "A" and "B" will be selectively operated so that the calculating machines "A" and "B" will record on their numeral wheels, the numbers of the keys of the typewriter that have been operated. The calculating machines "A" and "B" will record in the usual manner on their numeral wheels, numbers indicating the amounts that have been fed into the calculating machines "A" and "B." The numeral wheels of the calculating machines "A" and "B" will also operate corresponding readout switches, movable parts of which are applied to the numeral wheels of the calculating machines "A" and "B." The readout switches are shown in Figs. 38 and 38a, and may be equal in number to the number of numeral wheels provided in the calculating machines "A" and "B," but for the purpose of illustrating this invention, only four readout switches have been shown, the readout switches being numbered 169, 170, 171 and 172. The readout switches 169, 170, 171 and 172 comprise, respectively, a set of radially arranged fixed contacts 173 and a wiper contact 174, a set of radially arranged fixed contacts 175 and a wiper contact 176, a set of radially arranged fixed contacts 177 and a wiper contact 178 and a set of radially arranged fixed contacts 179 and a wiper contact 180. The switches 169, 170, 171 and 172 will represent, by the positions of their wiper contacts on their sets of relatively fixed contacts, the amounts accumulated in the calculating machines "A" and "B," and may be brought into circuit connection with the control unit relays as shown in Fig. 37 to, in effect, readout from the calculating machines, the amounts accumulated therein, the readout being by way of contacts controlled by the control unit relays 167 shown in Fig. 37 and carrying the readout information to the typewriter to operate the set of typewriter solenoids 181 and representing the numerals "1" to "0," inclusive. In the operation of recording on the numeral wheels the calculator is operated to go through its conventional plus cycle.

*Readout operation*

Upon operation of the readout switches 169, 170, 171 and 172, to control the control units relays 167 shown in Fig. 37, in the readout operation, the corresponding typewriter solenoids 181 will be operated to operate the typewriter keys to typewrite the numbers represented on the numeral wheels of the calculating machines "A" and "B" and indicated by the positions of the readout switches 169, 170, 171 and 172. For example, if the typewriter key representing the numeral "1" operated, the control unit relay "1" in the set of relays 167 will be operated to control the operation of the selecting solenoid unit 400 to operate the solenoids 426 in the "A" or "B" calculators, and operate the solenoids 491 in the "A" or "B" calculators, which thereupon will register the numeral "1" in the switches 169 or 171. Selection of the calculator "A" or "B" will depend on the nature of the entry and the relative positions of some of the parts of the typewriter. When the apparatus is subsequently operated to readout from the calculating machines "A" or "B" and into the typewriter, the control unit relay #1 in the set 167 will be operated to extend the control from the selector switches 169 or 171 to the typewriter 101 so that the typewriter solenoid #1 in the set of typewriter solenoids 181 will be operated and the typewriter key representing the #1 will be operated to print the #1 on a record sheet supported on the platen of the typewriter machine. The circuit for the input to the calculator can be traced as follows: In Fig. 3a, conductor $L_1$, conductor 182 to 730, 727, 728, 191, 193, 192, 183, 194 to switch $T_1$ in Fig. 35, represented in three places by movable contacts 1—1—1 which may be closed against corresponding fixed contacts $1_1$, $1_2$, and $1_3$ in circuit connection with respective conductors 184, 185 and 186, leading to conductor 187 in cable 107. From conductor 187 to conductor 188 (Fig. 37), winding of relay #1 (Fig. 37) of the numeral relay 167, conductor 189, conductor 190, conductor 1094 (Fig. 34a) to line wire $L_2$.

In the typing-in operation the position of the column in which the record is being made determines whether the amount being put into a calculation will go into the "A" or "B" calculators. The "A" and "B" calculators may be set for different multipliers. For example, the "A" calculator may be set to calculate 15% of amounts entered therein and the "B" calculator may be set to calculate 25% of the amounts entered in the "B" calculator. A switch is provided on the typewriter and controlled by cams on the carriage to control the entering of amounts in the "A" and "B" calculators.

For another example and assuming that the number typed by the typewriter 101 was #6, and the amount should be entered in the "A" calculator, the circuit would be as follows: Line wire $L_1$ (Fig. 34a), conductor 182, conductor 730, movable contact 727, left-hand fixed contact 728, conductor 191, movable contact 193, left-hand fixed contact 192, conductor 183, conductor 194, to movable contact of $T_6$ (Fig. 35), to the fixed contacts thereof, conductor 195, conductor 196, winding of relay #6 of the group of relays 167 in the control unit relays shown in Fig. 37, conductor 197, conductor 198, conductor 190, conductor 1094 (Fig. 34a), to line wire $L_2$. Relay #6 upon being operated will close its movable contacts 199 (Fig. 37), against its fixed contacts 100, 85, 98 and 97. Through its fixed contact 97 and conductor 96 the circuit will be extended from line wire $L_1$, conductor 90, conductor 79, conductor 89, movable contact 88, fixed contact 97, over conductor 96, conductor 95, conductor 94 of cable 93 (Fig. 40a), winding of solenoid 427 in the "A" calculator, conductor 92, conductor 91, and ultimately to line wire $L_2$, by way of conductor 942 (Fig. 34a), left-hand fixed contact 1095, movable contact 971, conductor 972, left-hand fixed contact 1096 of switch $P_X$, movable contact 870, left-hand fixed contact 879, movable contact 880, conductor 882, left-hand fixed contact 883, movable contact 884, conductor 886, right-hand fixed contact 887, movable contact 888, of switch $T_{AB}$, point 770, conductor 771, point 772, right-hand fixed contact 752 of switch $T_S$, movable contact 753, conductor 755 to line wire $L_2$. Assuming that the digit "6" should be entered in the "B" calculator, relay #6 through operation of its movable contacts 199 and against its fixed contacts establishes another circuit as follows: Line wire $L_1$, conductor 90 (Fig. 37), conductor 79, conductor 89, movable contact 88B, fixed contact 98, conductor 96B, conductor 94B (Fig. 39a), winding of solenoid 427, controlling the escapement shaft of the "B" calculator (Fig. 39a), conductor 92B, and ultimately to line wire $L_2$ by way of conductor 916 (Fig. 34a), conductor 945, left-hand fixed contact 946, movable contact 947, conductor 927, left-hand fixed contact 928 and movable contact 888 of switch $T_{AB}$, point 770, conductor 771, point 772, right-hand fixed contact 752, and movable contact 753 of switch $T_S$, conductor 755 to line wire $L_2$. Operation of solenoid 427 conditions the escape shaft solenoid control for the "B" calculator so that operation of solenoid 491 of the selection gate solenoids in the "B" calculator will control the gate bars so that a selecting slide for the numeral "6" will be operated in the "B" calculator, and the numeral wheel for the "B" calculator will move its wiper contact 174 (Fig. 38) to a fixed contact representing the numeral "6." The circuit through the solenoid 491 may be traced as follows: Conductor 90 (Fig. 37), conductor 89, set of movable contacts 199, movable contact 86, fixed contact 85, conductor 84, conductor 83 (Fig. 39), winding of solenoid 491, conductor 82, conductor 993, conductor 991 (Fig. 34a) to line wire $L_2$.

After the numeral "6" or any other numeral has been put into either or both of the calculators, the numerals can be read out from the calculators to the typewriter. The readout circuit for the numeral "6" registered in the "A" calculator may be traced as follows: Line wire $L_1$ (Fig. 34a), conductor 934, point 935, movable contact 936, right-hand fixed contact 1020, conductor 74, readout contact 75, wiper contact 180 (Fig. 38a), selector switch 172, fixed contact number 6 of selector switch 172, conductor 60, cable 1100, conductor 196, winding of relay 6 of relays 167 (Fig. 37), conductor 197, conductor 198, conductor 190, conductor 1094 (Fig. 34a) to line wire $L_2$. Relay 6 in operating, closes its outermost movable contact 80 against fixed contact 100 to close the circuit for the energization of solenoid $S_{6T}$ in the solenoids 181 in the typewriter. When the solenoid $S_{6T}$ in the typewriter is operated, the typewriter operates to print the numeral "6" on a record sheet supported on the platen of the typewriter. The circuit for the energization of solenoid S₆T may be traced as follows: Line wire L₁, conductor 90 (Fig. 37), conductor 79, conductor 89, outermost movable contact 80 of relay 6, contact 100, conductor 740 through cable 734, winding of solenoids S₆T (Fig. 36), conductor 50, conductor 77, conductor 76, conductor 965 (Fig. 34a), movable contact 963 and fixed contact 964, conductor 966, conductor 967, left-hand fixed contact 968 and movable contact 799 of switch P_MB, conductor 750, conductor 751, point 772, right-hand fixed contact 752 and movable contact 753 of switch T_S, conductor 755 to line wire L₂.

The selector switches 169, 170, 171, and 172, by operation of their wiper contacts 174, 176, 178 and 180, respectively, control the numerals to be read out of the calculator machines "A" and "B" into the typewriter. The wiper contacts 174, 176, 178 and 180 are rotated over the associated fixed contacts in accordance with the accumulation in the calculator machines "A" and "B" as the calculating machines are operated in calculating the sums or products of amounts put into the calculator. The calculating machines may be operated to add up columns of figures, to multiply one figure by another, to subtract one figure from another, and to make most calculations required in calculating prices or charges, in this application. Whatever fixed contact the wiper contact of the selector switch is resting on at the instant of readout from that particular switch, the associated relay in the bank of relays 167 will be operated to bring into operation a solenoid in the bank of solenoids 181 in the typewriter so that the appropriate type key in the typewriter will be operated to print on the record sheet the number identical with the numeral read out from the selector switch in the calculator. For example, if the numeral in the calculator carrying the switch 169 were represented as the numeral "5" and the wiper contact 174 at the instant of readout, rested on the contact 5, relay 5 in the bank of relays 167 in the control unit relays shown in Fig. 37, would be operated. Relay 5, upon operating, would close the circuit for the operation of solenoid S₅T in the bank of solenoids 181 in the typewriter. The circuit for the operation of relay 5 in the control unit relays shown in Fig. 37, for a readout operation, may be traced as follows: Line wire L₁, conductor 182 (Fig. 34a), conductor 718, conductor 846, movable contact 849, and fixed contact 850 of switch 848–T_H, conductor 851, movable contact 852 and fixed contact 854 of relay R_B 917, conductor 855, movable contact 856 and left-hand fixed contact 1074 of switch 858–B_R, conductor 1075, wiper contact 174 (Fig. 38), fixed contact 5, conductor 73 through cable 1100, cable 1076, conductor 72, winding of relay 5 in the bank of numeral relays 167, conductor 71, conductor 198, conductor 190, conductor 1094 to line wire L₂. Energization of relay 5 in the bank of relays 167 will close movable contacts 70, 69, 68 and 67 against the respective fixed contacts 66, 65, 64 and 63. Closure of movable contact 70 against contact 66 will complete the circuit for the energization of solenoid S₅T in the group of solenoids 181 in the typewriter, to operate the typewriter key bearing the numeral "5" to print the numeral "5" on a record sheet supported on the platen of the typewriter. The circuit for the operation of the solenoid S₅T may be traced as follows: Line wire L₁, conductor 90 (Fig. 37), conductor 79, conductor 49, conductor 48, movable contact 70, fixed contact 66, conductor 739 of cable 734 (Fig. 36), winding of solenoid S₅T, conductor 47, conductor 77, conductor 76 (Fig. 34a), conductor 965, fixed contact 964 and movable contact 963, conductor 966, conductor 967, left-hand fixed contact 968 and movable contact 799 of switch P_MB, conductor 750, conductor 751, point 772, right-hand fixed contact 752 and movable contact 753 of switch T_S, conductor 755 to line wire L₂.

The selector switches 169, 170, 171 and 172 shown in Figs. 38 and 38a, are shown as being two in number for the "A" calculator and two in number for the "B" calculator. In the actual setup of the apparatus however, as shown in Fig. 6, six selector type switches are provided in a single calculator. For example, there are provided in the calculator "A" selector switches 600, 610, 620, 630, 640 and 650. Each switch comprises a set of fixed contacts and a wiper contact to frictionally engage the fixed contacts in selective movements. The selector switch 600 as shown in Fig. 6, and as shown in partially sectional view in Fig. 5, comprises a set of fixed contacts "0" to "9," inclusive, and a wiper contact 611. The selector switch 610 comprises a set of fixed contacts numbered "0" to "9," inclusive, and a wiper contact 612. The switch 620 comprises a set of fixed contacts numbered "0" to "9," inclusive, and a wiper contact 613. The switch 630 comprises a set of fixed contacts numbered "0" to "9," inclusive, and a wiper contact 614. The switch 640 comprises a set of fixed contacts numbered "0" to "9," inclusive, and a wiper contact 615, and the switch 650 comprises a set of fixed contacts numbered "0" to "9," inclusive, and a wiper contact 616. The sets of fixed contacts for the readout selector type switches 600, 610, 620, 630, 640 and 650 are mounted on a common mounting strip 617 of insulating material which is apertured to accommodate the fixed contacts in the switches and metal caps 618 for the respective switches 610, 620, 630, 640 and 650. Each metal cap 618 is mounted as shown in Fig. 5, on a reduced diameter upper end portion of a stem 624 of one of the conventional numeral wheels 625 of a calculator apparatus. Between the flanged lower end 626 of the cap 618 and resting on a part 627 of the stem 624 with the inner portion of an apertured central portion 628 of the wiper contact such as the contact 611 shown in Fig. 5a, the apertured central portion being joined to the outer portion by a connecting web 632, and the outer portion 629 having formed thereon, an embossing 631 which, upon rotation of the wiper contact 611, will selectively engage the fixed contacts from "0" to "9" of the selector type switch. The outer portion 629 of each wiper contact is tilted and upwardly spring biased to bring the embossed portion 631 upwardly into engagement with the fixed contacts in the selector switch. The wiper contact is so supported on the stem of the numeral wheel 625 that the embossing 631 on the wiper contact is in register with the numeral "1" on the numeral wheel 625. Spaced above the numeral wheel 625 and the insulating strip 617, is an insulating strip 651 which rests on an insulating block 652 which extends in parallel spaced relation with the upper surface of the insulating strip 617. The insulating block 652 and insulating strip 651 are apertured to accommodate bolts 653 which extend through apertures provided in the insulating strips 617 and into pillars 654 resting on and extending upwardly from a reciprocating carriage 655 of the calculator. Supported on the upper surface of the insulating strip 651 are leaf spring contacts 656, 657, 658, 659, 660 and 661 which are apertured at one end and secured in place on the insulating strip 651 by means of contact rivets 662, 663, 664, 665, 666 and 667, respectively, the contact rivets having shanks which extend through suitable apertures provided in the insulating strip 51. The shank portions of the contact rivets extend through apertures in the leaf spring contacts and hold one end of each leaf spring contact in place on the insulating strip 651. The free end portions of the leaf spring contacts 656 and 661, inclusive, are arranged to bear with spring pressure on the tops of the respective conducting caps 618 and 623, inclusive, which are mounted on the rotatable stems of the numeral wheels in the calculator. The main portions of the readout selecting switches are carried back and forth in a reciprocating motion during the time of readout of the calculator by means of the reciprocating carriage 655. As the carriage moves in its reciprocating motion the contact screws 662 to 667, inclusive, are successively carried under and into contact with a stationary leaf spring contact 668 which is supported on a leaf spring 669, one end of which is mounted by means of a mounting screw 670 on a stationary part of the calculator, this stationary part as shown in Fig. 5, being a platform 671 which is mounted on spaced pillars 672 supported in a fixed bar 673 of the calculator. An adjustment screw 775 is provided to regulate the pressure of the leaf spring contact 669 toward the contact screws 662 to 667, inclusive, the adjustment screw 775 being mounted in and extending through the platform 671 and into engagement with the under surface of leaf spring contact 669.

The insulating mounting strip 617 is provided with sets of notches of graduating depth along two opposite edge portions to receive and hold wires leading to and from the fixed contacts in the readout selector switches. As shown in Fig. 7 and in which three stator elements of the readout selector switches are shown, the fixed contacts in one of the switches are connected to like contacts of the other switches by means of conductor wires which are run from one contact to the other and are held in spaced relation in required areas to obtain a neat arrangement of wiring. For example, the fixed contact 1 in the stator of the switch 600 is electrically connected by means of a conductor wire 601, one end of which is looped around and secured to the fixed contact 1 of the switch 600. The wire 601 is extended through a notch 602 formed in the edge portion 603 of the insulating strip 617. After passing through the notch 602, the wire 601 is extended at right angles to its previous course, and on the opposite side of the insulating strip 617, and into a corresponding notch 604 and through to the opposite side of the insulating strip 617 and around fixed contact 1 in another readout selecting type switch and then back again through the notch 604 to the opposite side again of the insulating strip 617 then upwardly through a notch 605 and around the fixed contact 1 in the stator portion of the readout selecting switch 650 where the wire 601 is again doubled upon itself to pass for the second time through the notch 605 and from this point on the wire 601 passes against one face of the insulating strip 617 and finally outwardly through an aperture 606. The fixed contact 2 in the switch 600 is electrically connected to corresponding contacts 2 in other switches in the set by means of a conductor 607 which, after passing through notches of greater depth than the notches 602, 604, and 605, and such as the notches 608, 609 and 619, until the wire 607 finally emerges from an aperture 621 after connection of the wire 607 to the contact 2 in the set of fixed contacts in the switch 650. Wire 622 extends through notches 623, 633 and 634, and is connected to the number 3 contacts of the sets of fixed contacts in the stator elements of the switches 600, 610, 620, 630, 640 and 650, the conductor 622 finally emerging from an aperture 635 in the insulating strip 617. Wire 636 serves to serially connect the #4 contacts in the readout selector type switches and finally emerges from the insulating strip 617 by way of an aperture 637. Wire 638 serves to serially connect the #5 fixed contacts in the readout selector switches, the wire 638 finally emerging from the insulating strip 617 by way of the aperture 639. The wire 641 serves to serially connect the #6 fixed contacts in the readout selector switches, the wire 641 finally emerging from the insulating strip 617 by way of the aperture 642. The wire 643 extends through apertures formed in the opposite edge of the insulating strip 617 and serves to serially connect the #7 fixed contacts in the readout selector switches, and finally emerges from the insulating strip 617 by way of the aperture 644. The #8 fixed contacts in the readout selector switches are serially connected by the wire 645 which finally emerges from the insulating strip 617 by way of the aperture 646. The #9 fixed contacts in the readout selector switches are serially connected by means of the wire 647 which finally emerges from the insulating strip 617 by way of the aperture 648. The wire 649 serves to serially connect the #0 fixed contacts in the readout selector switches, the wire 649 finally emerging from the insulating strip 617 by way of the aperture 776.

Calculators of the type above-mentioned are provided with function keys to be operated to make the calculator operate to add, subtract, multiply and do various other calculations mechanically. The function keys are depressible keys and are usually operated manually. In this invention solenoids are provided to operate the usual depressible function keys, with exception of those not required for this invention, on the calculator, the solenoids being arranged, for example, as shown in Fig. 4, in which the solenoid 543 is operable to depress the dividend key of the calculator, the dividend key in this toll biller setup of the invention being not used as a dividend entry key, but as a tabulating member. The solenoid 546 when energized is operable to depress the minus key 548 of the calculator. The solenoid 549 is operable to depress the plus key 551 of the calculator, and the solenoid 555 is operable to depress a lever 557 which has mechanical connection with the mechanism in the calculator to make the calculator operate to multiply one number by another. To control the operation of the solenoids in this apparatus in accordance with a predetermined program, the program control unit 104 is provided.

PROGRAM CONTROL UNIT

The program control unit 104, as shown particularly in Figs. 31 and 32, comprises an electric motor 680, a set of cams 681 mounted on a shaft 682, and a set of switches 683 controlled by means of the cams 681. A set of relays, indicated by the prefix R, not shown in Figs. 31, 32 and 33, but shown in the circuit in Figs. 34, 34a, 34b, 34c, 34d and 34e, are provided in the program control unit 104. The program control unit 104 is designed to operate two calculators, namely the calculators "A" and "B," identified as 102 and 103, respectively, shown in Fig. 1. The cams in the set 681 are contoured and arranged on the shaft 682 so that the cams will engage projections 684 of movable members in the switches 683. The set of cams 681 comprises (as shown in Fig. 33) the cams in the order shown, in Fig. 31, the cams being identified as 685, 686, 687, 688, 689, 690, 691, 692, 693, 694, 695 and 696. Cam 685 has two high spots 697 and 698 followed by a relatively short high spot 699 having a following relatively long high spot 700. Cam 686 has a single high spot 701; cam 687 has a single high spot 702; cam 688 has a single high spot 703; cam 689 has a single but relatively long high spot 704; cam 690 has a single relatively short high spot 705; cam 691 has two relatively short high spots 706, 707; cam 692 has two relatively short high spots 708, 709 almost diametrically opposite each other. Cam 693 has two relatively long high spots 710 and 711 diametrically opposite each other; cam 694 has a single high spot 712; cam 695 has two low spots 713 and 714 and cam 696 has one small low spot 715. The switches in the set 683 may be switches of the Acro type in which a movable spring contact member operates against a fixed contact. The switches are identified as $P_P$, $P_T$, $P_6$, $P_C$, $P_{DA}$, $P_{DB}$, $P_{MA}$, $P_{MB}$, $P_-$, $P_X$, $P_+$, and $P_Y$ to identify them with the same indications in Figs. 34, 34a, 34b, 34c, 34d and 34e. In an actual setup of the apparatus the motor 680 was a 4 R. P. M. Telechron motor which operated for a program of 15 seconds as shown in the timing chart in Fig. 41, in which the switch $P_6$ is already closed and will remain closed for about 1 second more. $P_P$ will close in about ¼ second and will remain closed for about 8½ seconds. $P_T$ will close in about ⅓ second and will remain closed for about 14½ seconds. $P_P$ opening for about 2 seconds and then closing again for about 2¼ seconds. $P_C$ will close in about 1 second and remain closed for about 3½ seconds, and then will be open and remain open for about 5½ seconds, and then close for about 3½ seconds. $P_{DA}$ will remain open for about 4½ seconds and then will close for about ½ second, opening again for about 5¾ seconds and then closing for about ½ second. $P_{DB}$ will remain open for about 5¾ seconds and then will close for about ¾ second, and then will open for about 2¼ seconds and will then close for about 9/10 second. $P_{MA}$ will be open for about ½ second and then will close for about ½ second. $P_{MB}$ will remain open for about 2 seconds and then will close for about 1¾ seconds. $P_-$ will remain open for about 13 9/10 seconds and then will close for about 9/10 second. $P_X$ will remain open for about 10½ seconds and then will close for about ½ second. $P_+$ will remain open for about 9 9/10 seconds and then will close for about ½ second. $P_Y$ will remain open for about 2½ seconds and will close for about ¼ second, will open for about ½ second and close for about ½ second, will open for about 8 seconds and then will close for about ¼ second, will open again for about ½ second and then will close for about 2½ seconds.

When the complete program is to be started the compute initiating switch $K_C$ (Fig. 34b) is operated to close its movable contact 716 against fixed contact 717, to close a circuit for the program motor 680. The circuit for operation of the program motor 680 may be traced as follows: Line wire $L_1$ (Fig. 34b), conductor 182, conductor 718, conductor 719, contact 717, movable contact 716, conductor 720, binding post 721, conductor 722, winding of motor 680, conductor 723, fixed contact 724 and movable contact 725 of relay $R_Q$, conductor 726 to line wire $L_2$. The line wires $L_1$ and $L_2$ are the main current supply lines of the electrical system and are arranged for connection to a suitable source of current supply not shown but, which may be a 60 cycle, 110 volt, A. C. current supply source. In about ⅕ of a second after the switch $K_C$ is closed, the motor 680 will have rotated the cam 696 to operate the switch $P_T$ to move its movable contact 727 away from its left-hand contact 728 and into engagement with its right-hand fixed contact 729. The switch $P_T$ is, in effect, a single pole double throw switch and operates to close the motor circuit for the duration of the program, the motor circuit being then traceable as follows: Line wire $L_1$ (Fig. 34b), conductor 182, conductor 730, movable contact 727, fixed contact 729 of switch $P_T$, conductor 731, conductor 720, binding post 721, conductor 722, winding of motor 680, conductor 723, fixed contact 724 and movable contact 725 of relay $R_Q$, conductor 726 to line wire $L_2$.

Calculating machines "A" and "B" employed in this invention are of the type in which the amounts registered in the calculating machine are shown by the display of numerals on the numeral wheels, such for instance as the numeral wheel 625 (Fig. 5). The numeral wheels are rotated as different amounts are put into the calculating machine. For example, if the numeral "1" is put into the calculating machine, the numeral wheel 625 will register the numeral "1." If another amount is put into the calculating machine and it is operated to add the second amount to the first, the numeral wheels will show the sum of the amounts entered into the calculating machine. Subtractions are obtained by a reverse rotation of the numeral wheels by suitable operation of the calculating machine. Multiplications are obtained by putting into the calculating machine the two amounts to be multiplied and by operating the calculating machine in the usual manner for multiplication, the product being shown by the numeral wheels in the calculating machine. It will be appreciated that the wiper contacts of the readout selector switches which are arranged for rotation by means of the spindles of the numeral wheels, will be moved relative to fixed contacts in the readout selector switches in accordance with the amounts accumulated in the numeral wheels. Since the wiper contacts in the readout selector switches are carried on the stems of the numeral wheels and are rotated to successively engage the fixed contacts of the readout selector switches and will come to rest on a fixed contact representing the amount put into the calculating machine, the amounts calculated by the calculating machine can be, in effect, read out of the calculating machine and into the typewriter by means of the readout selector switches in combination with the control unit, the relays and the set of solenoids 181 in the typewriter.

In the readout operation the carriage of the calculating machine is reciprocated under the fixed contact 668 which in succession serves as the readout contact for each of the readout selector switches, as each switch comes along under the fixed contact 668. For example, if the wiper contact of the readout selector switch, at the instant of readout, were on fixed contact 9 in the readout selector switch 169 (Fig. 38), the #9 numeral relay in the control unit 104 relays 167 (Fig. 37) would be operated to close the circuit through its outermost movable contact 674 against fixed contact 675, and the circuit for operation of the solenoid 9 in the set of solenoids 181 in the typewriter may be traced as follows: Line wire $L_1$, conductor 90 (Fig. 37), conductor 79, conductor 676, movable contact 674, fixed contact 675, conductor 743 of cable 734, winding of solenoid $S_{9T}$, conductor 76, fixed contact 124 (Fig. 34b) and movable contact 125 of switch $P_P$, conductor 745, conductor 746, left-hand fixed contact 747 and movable contact 748 of manual switch N–891, conductor 750, conductor 751, point 772, fixed contact 752, movable contact 753 of switch $T_S$, conductor 755 to line wire $L_2$. In its reciprocating motion the calculator carriage 655 (Fig. 5) rides along fixed rails 679 and 779 supported on their respective fixed supports 777 and 778, the carriage 655 having a bar 682 bearing on the rail 779 and having a rear flanged portion 774 bearing on the rail 679.

The typewriter is operable to automatically tabulate to the first charge column as soon as the manually operated key $K_C$ is closed and the switch $P_T$ is transferred. As shown in Fig. 41, shortly after the motor 680 has started by the initial closing of the manually operated key $K_C$, and the subsequent establishing of the regular running circuit for the motor by the closing of contact 727 against fixed contact 729 by the operation of the switch $P_T$, the switch $P_P$ is closed by the operation of the high area 732 of the cam 695 to prepare a circuit for the operation of the typewriter solenoids, as shown in Fig. 36, for operation of the typewriter keys. The circuit may be traced as follows: Line wire $L_1$, conductor 90 (Fig. 37), movable contacts of the set of relays 167, conductors 735 to 744, inclusive, in cable 734, to windings of solenoids $S_{1T}$, $S_{2T}$, $S_{3T}$, $S_{4T}$, $S_{5T}$, $S_{6T}$, $S_{7T}$, $S_{8T}$, $S_{9T}$, $S_{0T}$, $S_{ST}$, conductor 76, fixed contact 124 (Fig. 34b), $P_P$, and movable contact 125 of $P_P$, conductor 745, conductor 746, left-hand contact 747 and movable contact 748 of manual switch N–891, conductor 750, conductor 751, right-hand contact 752, and movable contact 753 of switch $T_S$ 754, conductor 755, to line wire $L_2$. The switch $T_S$ 754 normally has its movable contact 753 resting against its left-hand fixed contact 756, but is operated to have its movable contact 753 moved against its fixed contact 752 by operation of the carriage of the typewriter which operates to close the movable contact 753 against the fixed contact 752 when the typewriter carriage is in such position that the typewriter will operate to print the energized characters in the "A" and "B" six-place amount columns of the bill to be typed. Therefore, when the readout occurs from the numeral wheels in the calculators to operate the required solenoids in the set 181 in the typewriter, the number characters brought into operation in the typewriter by operation of the solenoids representing the numbers from "0" to "9," will be typed in the required columns in the bill under preparation.

During all of the first 1 second, the $P_6$ switch is closed so that its movable contact 758 is against its fixed contact 759 to provide a control circuit for the solenoid 760 which is known as the solenoid $S_{6B}$, which operates to restore the stepping cam shaft 146 in the "B" calculator to a "six-place clear condition," the solenoid 760 being mechanically attached to the lever operable to move the curved rack in the "B" calculator to rotate the stepping cam shaft to a "six-place clear position." The circuit for operation of the solenoid 760 may be traced as follows: Line wire $L_1$ (Fig. 34b), conductor 182, conductor 730, movable contact 727 of the $P_T$ switch, right-hand contact 729 of the $P_T$ switch, conductor 731, conductor 720, binding post 721, conductor 762, movable contact 758, fixed contact 759, of program switch $P_6$, conductor 764, winding of solenoid 760, conductor 765, fixed contact 766 of relay $R_Q$ 767, movable contact 768 of relay 767, conductor 769, fixed contact 780 of relay $R_{S2}$—980, movable contact 782 of relay $R_{S2}$—980, conductor 783, conductor 784, fixed contact 785 of $P_C$, movable contact 786 of $P_C$, conductor 787 to line wire $L_2$.

About ¾ second after the program motor 680 has started, the switch $P_{MA}$ is operated to close the circuit for the operation of solenoid 555 which will operate through its plunger 556 (Fig. 4) in the "A" calculator to press down a multiplication lever 557 which sets the calculator in operation to perform any multiplication operations necessary in computing the charges required. The circuit completed by the operation of the cam operated switch $P_{MA}$ may be traced as follows: Line wire $L_1$ (Fig. 34b), conductor 182, conductor 730, movable contact 727 and a right-hand contact 729 of switch $P_T$, conductor 788, conductor 789, winding of solenoid 555—$S_{MA}$, conductor 790, fixed contact 791 and movable contact 792 of program switch $P_{MA}$, conductor 794 to line wire $L_2$.

About 1 second after the beginning of the program, switch $P_C$ is operated for a period of about 3½ seconds and is again operated about 10 seconds after programming begins, for a period of about 3½ seconds. Operation of switch $P_C$ completes a circuit to the carriage clearing solenoids $S_{CA}$ and $S_{CB}$. This circuit is traceable from line wire $L_1$, through conductor 182, conductor 730, contacts 729 and 727 of switch $P_T$, conductor 788, conductor 1039, windings of solenoids $S_{CA}$ and $S_{CB}$, conductor 1040, contacts 1041 and 786 of switch $P_C$ and conductor 787 to line wire $L_2$. Operation of switch $P_C$ also controls the circuit to the selection clearing $S_{8A}$ and $S_{6B}$. This circuit is traceable from line wire $L_1$, conductors 182 and 730, contacts 727 and 729, conductors 788 and 1097, windings of solenoids $S_{8A}$ and $S_{6B}$, conductor 765, contacts 766 and 768 of relay $R_Q$, conductor 769, contacts 780 and 782 of relay $S_{S2}$, conductor 783, conductor 784, contacts 785 and 786 of switch $P_C$ and conductor 787 to line wire $L_2$.

About 1⁹⁄₁₀ seconds after the beginning of the program and subsequent to the operation of switch $P_{MA}$, switch $P_{MB}$ is operated for about 2 seconds to close the circuit for the operation of the multiplication solenoid 795 in the "B" calculator, and multiplication solenoid 795 being the equivalent in the "B" calculator of the multiplication solenoid 555 in the "A" calculator. The circuit for the operation of the solenoid 795 may be traced as follows: Line wire $L_1$ (Fig. 34b), conductor 182, conductor 730, movable contact 727 and right-hand fixed contact 729 of switch $P_T$, conductor 788, conductor 796, winding of solenoid 795, conductor 797, right-hand fixed contact 798, and movable contact 799 of switch $P_{MB}$, conductor 750, conductor 751, right-hand fixed contact 752 and movable contact 753 of $T_S$ switch 754, conductor 755 to line wire $L_2$. Operation of solenoid 795 in the "B" calculator is equivalent to operation of the multiplication key in a calculator to multiply the figures required therein in the calculation.

About 2½ seconds after the program starts, switch $P_Y$ is operated to partially complete a circuit for the operation of the solenoid 800 $S_{TAB}$ in the typewriter 101. Solenoid 800 in the typewriter is operable to move the tabulating key in the typewriter when tabulation is required, its operation through the $P_Y$ switch occurs twice in rather rapid succession to provide extra tabulation movements for the typewriter. The circuit for operation of the solenoid $S_{TAB}$ 800 may be traced as follows, but this circuit applies only to the condition known as "Non-Tax" condition in which the manual switch N–891 is operated to its right-hand fixed contact, the circuit being as follows: Line wire $L_1$ (Fig. 34b), conductor 182, conductor 730, movable contact 727 of switch $P_T$, fixed contact 729, conductor 788, conductor 801, winding of solenoid 800, conductor 802, binding post 803 of switch $P_Y$, movable contact 805 and right-hand fixed contact 806 of program switch $P_Y$, conductor 807, right-hand fixed contact 808 of switch N–891, movable contact 748 of switch N–891, conductor 750, conductor 751, right-hand fixed contact 752 of switch 754, movable contact 753, conductor 755 to line wire $L_2$.

About 4½ seconds after the beginning of the program switch $P_{DA}$ is closed to provide a circuit for the operation of solenoid 543 $S_{DA}$, the function of which is to operate what is known as the "Div Tab Key" 545 (Dividend Key) in the calculator. The circuit for the operation of solenoid 543 may be traced as follows: Line wire $L_1$ (Fig. 34b), conductor 182, conductor 730, movable contact 727 of switch $P_T$, fixed contact 729, conductor 788, conductor 813, winding of solenoid 543, conductor 814, fixed contact 815 and movable contact 816 of switch $P_{DA}$, conductor 817, movable contact 810 and fixed contact 811 of manual switch N–891, conductor 819 to line wire $L_2$.

Shortly after the operation of the solenoid 543 $S_{DA}$, in the "A" calculator, a corresponding solenoid 821 $S_{DB}$ is operated in the "B" calculator to operate the Div Tab Key of the "B" calculator. The circuit for the operation of solenoid 821 is as follows: Line wire $L_1$ (Fig. 34c), conductor 182, conductor 730, movable contact 727, right-hand fixed contact 729, conductor 788, conductor 822, winding of solenoid 821, conductor 823, conductor 825, fixed right-hand contact 826 of program switch $P_{DB}$, movable contact 827, conductor 829 to line wire $L_2$.

About 9¾ seconds after the beginning of the program, switch 843 $P_+$ is operated to close the circuit for the operation of solenoids 844 and 845 $S_{+A}$ and $S_{+B}$, respectively, which operate to depress the plus keys in the respective calculators "A" and "B" such, for example, as the plus key 551 shown in Fig. 4. The circuit for the operation of the solenoids 844 and 845 may be traced as follows: Line wire $L_1$ (Fig. 34c), conductor 182, conductor 718, conductor 846, binding post 847, movable contact 849 and fixed contact 850, of switch 848 $T_H$, conductor 851, movable contact 852 and fixed contact 854 of relay $R_B$—917, conductor 855, movable contact 856 and fixed contact 857 of switch $B_R$—858, conductor 859, fixed contact 860 and movable contact 861 of program switch $P_+$, conductor 863, conductor 867, windings of solenoids 844 and 845 in parallel, conductor 868, to line wire $L_2$.

Shortly after the closure of switch $P_+$ the switch $P_{DA}$ is closed again for a brief interval to operate to close a circuit for the energization of solenoid $S_{DA}$—543 which operates to depress the Div Tab Key in the "A" calculator such as the Div Tab Key 545 shown in Fig. 4, the circuit for operation of solenoid 543 being the same as previously described.

About 10½ seconds after beginning of the program, switch $P_X$ is operated to move its movable contact 870 against its right-hand fixed contact 871 to close the circuit for the operation of solenoid 800 $S_{TAB}$ to provide an extra tabulate pulse for the typewriter during the normal compute cycle. The circuit for the operation of the solenoid 800 and involving the program switch $P_X$, may be traced as follows: Line wire $L_1$ (Fig. 34c), conductor 182, conductor 730, movable contact 727 and right-hand fixed contact 729 of switch $P_T$, conductor 788, conductor 801, winding of solenoid 800, conductor 802, movable contact 805, left-hand fixed contact 872, conductor 873, fixed contact 874, movable contact 875, conductor 877, fixed contact 871, movable contact 870, conductor 878, fixed contact 879, movable contact 880, conductor 882, fixed contact 883, movable contact 884, conductor 886, right-hand fixed contact 887, movable contact 888, conductor 771, fixed contact 752, movable contact 753 and conductor 755 to line wire $L_2$. The tab pulse is broken momentarily by the $T_T$ switch which transfers when the typewriter is tabbing, so $P_X$ gives repeated pulses (21 in number) to $S_{TAB}$ until carriage transfers, $T_{AB}$ interrupting this circuit.

At about the same time as the solenoid 543 is operated the second time, the $P_Y$ program switch is again operated for a brief interval and then subsequently for a period of about 2½ seconds, operating, each time, to close a circuit for solenoid 800 $S_{TAB}$ which provides extra tabulate pulses to the typewriter 101 during the special compute cycle, the circuit for operation of the solenoid 800 $S_{TAB}$ being by way of the program switch $P_Y$, the same as previously described. The final closure of the program switch $P_Y$ remains until approximately the end of the program.

About 13¾ seconds after the beginning of the program, cam operated switch P_ is operated to close a circuit for the operation of the two solenoids 830 $S_{-A}$ and 831 $S_{-B}$, the functions of which are to operate the minus keys in the "A" and "B" calculators, such, for example, as the minus key 548 shown in Fig. 4. The circuit for the operation of the solenoids 830 and 831 may be traced as follows: Line wire $L_1$ (Fig. 34c), conductor 832, conductor 833, fixed contact 834 and movable contact 835, of program switch P_, conductor 837, movable contact 838, and fixed contact 839, of switch 891–N, conductor 841, windings of solenoids 830 $S_{-A}$ and 831 $S_{-B}$ in parallel, conductor 842 to line wire $L_2$. The solenoids 830 $S_{-A}$ and 831 $S_{-B}$ may also be operated under control of a correction switch 1117 K_ over a circuit as follows: Line wire $L_1$, conductor 832, conductor 833, conductor 1118, fixed contact 1119 and movable contact 1120 of switch 1117 K_, conductor 1121, conductor 841, windings of 830 $S_{-A}$ and 831 $S_{-B}$, in parallel, conductor 842 to line wire $L_2$.

Control box

Added to the typewriter and located to the right of the keyboard, is a box containing control keys, $K_C$, $K_-$, and $K_T$, two indicating lamps, one red and one yellow, and a four pole double throw switch 891–N. All are shown in the circuit diagram Fig. 34, and the box can be seen in Figs. 1 and 2.

In the program apparatus there is provided also, the set of control relays 900 to further enable carrying out of the required program. As shown in Fig. 34d, relay 901 $R_A$ operates as soon as the "N" switch 891 is operated to move its movable contact 892 to engage its right-hand fixed contact 893. Relay $R_A$ 901 remains energized while all Non-Tax entries are typed, but is deenergized during the compute and totals operating parts of the program. When the switch 891–N is closed on its right-hand fixed contact 893, the circuit for energization of relay 901 $R_A$ is as follows: Line wire $L_1$ (Fig. 34d), conductor 894, fixed contact 902 and movable contact 903' of relay $R_T$, conductor 895, winding of relay 901 $R_A$, conductor 896, right-hand fixed contact 893, movable contact 892 of switch 891–N, conductor 897 to line wire $L_2$. When relay 901 $R_A$ is energized, all Non-Tax entries coming in from the typewriter numeral keys will be entered in the "B" calculator. Relay 901 upon energization, closes its movable contact 904 against its fixed contact 905 to close the circuit for the operation of a yellow lamp 906, the circuit being as follows: Line wire $L_1$ (Fig. 34d), conductor 182, conductor 718, conductor 846, binding post 847, movable contact 849 of switch $T_H$ 848, left-hand fixed contact 850 of switch 848, conductor 851, conductor 898, conductor 899, signal lamp 906, conductor 907, fixed contact 905, and movable contact 904 of relay 901 $R_A$, conductor 908, conductor 726 to line wire $L_2$. The yellow lamp 906 remains illuminated to indicate a Non-Tax condition when the switch 891–N is closed on its right-hand fixed contact 893 and switch $T_H$ is closed. Closure of movable contact 904 against fixed contact 905 by the operation of relay 901 $R_A$ also completes an initial circuit for the operation of relay 909 $R_D$, which may be traced as follows: Line wire $L_1$ (Fig. 34d), conductor 182, conductor 718, conductor 846, movable contact 849 of switch 848 $T_H$, conductor 851, conductor 898, conductor 899, conductor 912, winding of relay 909 $R_D$, conductor 913, fixed contact 905 and movable contact 904 of relay 901 $R_A$, conductor 908, conductor 726 to line wire $L_2$. Relay 901 $R_A$ on its outermost left-hand contacts also, by removal of its movable contact 880 from left-hand fixed contact 879 and into engagement with its right-hand fixed contact 914, does two things: The first being that it opens the circuit of the escape shaft solenoids of the "A" calculator, and the second being that it closes a circuit leading to the solenoids for operating the escape shaft in the "B" calculator so that there may be selection into the "B" calculator while typing is being done in the 15% column, the last-mentioned circuit into the escape shaft solenoids of the "B" calculator being as follows: Line wire $L_1$ (Fig. 34d), conductor 90, numeral relays cable 915, escape shaft solenoids (Fig. 39a) for the "B" calculator, conductor 916, Fig. 34d, fixed contact 914 of relay $R_A$—901, movable contact 880, conductor 882, left-hand fixed contact 883, and movable contact 884 of relay $R_C$—929, conductor 886, right-hand fixed contact 887 and movable contact 888 of switch 889, point 770, conductor 771, point 772, right-hand fixed contact 752 and movable contact 753 of switch 754 $T_S$, conductor 755 to line wire $L_2$.

Relay 917 $R_B$ operates upon return of movable contact 892 in switch 891 (the N switch) to its left-hand fixed contact 918, the circuit for relay 917 in its operation being from line wire $L_1$ (Fig. 34d), conductor 182, conductor 718, conductor 846, movable contact 849 and fixed contact 850 of switch $T_H$—848, conductor 851, conductor 898, conductor 899, movable contact 910, fixed contact 911 of relay $R_C$, conductor 919, winding of relay 917 $R_B$, conductor 920, left-hand fixed contact 918 and movable contact 892 of switch 891 (the N switch), conductor 897 to line wire $L_2$. Operation of $R_B$ relay 917, through removal of its movable contact 852 from its left-hand fixed contact 854, opens the circuit to the $B_R$ switch 858 to prevent readout of the "B" calculator while it Div Tabs simultaneously with the "A" calculator. It also provides a hold circuit for the $R_B$ relay. The holding circuit for $R_B$ relay 917 is by way of its right-hand fixed contact 928, movable contact 852, conductor 851, fixed contact 850 and movable contact 849, switch 848, conductor 846, conductor 718, conductor 182 to line wire $L_1$.

Relay $R_C$ is energized when the P_ switch is operated to close its movable contact 835 against its fixed contact 834, by the P_ program switch which is operated toward the end of a Non-Tax compute operation. The circuit for operation of relay 929 $R_C$ may be traced as follows: Line wire $L_1$ (Fig. 34d), conductor 832, conductor 833, right-hand fixed contact 834 and movable contact 835 of program switch P_, conductor 837, movable contact 838 and right-hand fixed contact 931 of switch 891–N, conductor 890, winding of relay 929 $R_C$, conductor 1094 to line wire $L_2$. Relay 929 $R_C$ operates to close a holding circuit for itself by way of its movable contact 932 and its fixed contact 933, the holding circuit being traceable from line wire $L_1$ (Fig. 34d), conductor 934, point 935 and movable contact 936 and left-hand fixed contact 937 of $A_R$ switch 938, conductor 939, left fixed contact 933 and movable contact 932 of relay 929, conductor 890, winding of relay 929, conductor 1094 to line wire $L_2$. The right-hand contacts of relay 929 $R_C$ complete a circuit for the picking of relay $R_B$ 917 and assures that relay 917 will pick only following a Non-Tax compute cycle. Operation of relay 929 $R_C$ also closes its central contacts comprising movable contact 940 and fixed contact 941 to provide a circuit for operating to select into the "A" calculator, amounts that are entered in the "B" column after a Non-Tax compute cycle. The circuit for the select into operation in the "A" calculator above-mentioned, may be traced as follows: Line wire $L_1$ (Fig. 34d), conductor 90, contacts of the numeral relays shown in Fig. 37 (selected contacts), cable 93, Fig. 40A escape shaft solenoids for the "A" calculator, conductor 942, conductor 943, right-hand fixed contact 941 and movable contact 940 of central contacts of relay 929 $R_C$, conductor 944, conductor 945, left-hand fixed contact 946, and movable contact 947 of the contacts of relay 767 $R_Q$, conductor 927, left-hand fixed contact 928 and movable contact 888 of switch 889 $T_{AB}$, point 770, conductor 771, point 772, right-hand fixed contact 752 and movable contact 753 of switch 754 $T_S$, conductor 755 to line wire $L_2$. Through a closure of its movable contact 884 against its right-hand fixed contact 948, relay 929 $R_C$ provides a circuit that will permit tabbing from the start of the "A" column to the "B" column of the calculation of totals following a Non-Tax compute cycle. The circuit is as follows: Line wire $L_1$ (Fig. 34c), conductor 182, conductor 730, movable contact 727 and left-hand fixed contact 728 of switch $P_T$, conductor 191, movable contact 193 of relay $R_Q$, fixed contact 962, conductor 788, conductor 801, winding of solenoid 800 $S_{TAB}$, conductor 802, movable contact 805 and left-hand fixed contact 872 of switch $P_Y$, conductor 873, movable contact 875 and left-hand fixed contact 874 of switch 876 $T_T$, conductor 877, fixed contact 949 and movable contact 950 of switch $B_D$, conductor 951, fixed contact 948 and movable contact 884 of relay 929 $R_C$, conductor 886, right-hand fixed contact 887, and movable contact 888 of switch 889 $T_{AB}$, point 770, conductor 771, point 772, right-hand fixed contact 752 and movable contact 753 of switch $T_S$, conductor 755 to line wire $L_2$. The energization of relay 917 $R_B$ also closes its outermost left-hand movable contact 572 against fixed contact 573 to connect in parallel the Div Tab solenoids 543 and 821 $S_{DA}$ and $S_{DB}$, respectively, allowing both calculators to Div Tab together while only the "A" calculator reads out. Switch $B_D$ is a single pole, single throw switch as shown in Fig. 34 and is normally closed. It is caused to open by the depression of the dividend entry key 543 beneath which it is mounted as shown in Fig. 4. The circuit for the operation of the Div Tab solenoids 543 and 821 $S_{DA}$ and $S_{DB}$, respectively, in parallel, is by way of conductor 182 (Fig. 34d), conductor 730, movable contact 727 and fixed contact 728 of switch $P_T$, conductor 191, movable contact 193 and fixed contact 962 of relay $R_Q$, conductor 788, conductors 813 and 822 for the respective Div Tab solenoids 543 and 821 through the windings of the Div Tab solenoids and from the winding of the Div Tab solenoid 543 by way of conductor 814 to conductor 922, fixed contact 573 and movable contact 572 of relay 917 $R_B$, and for the Div Tab solenoid 821 by way of its winding and conductor 823, conductor 824 to point 923. From point 923 the parallel circuit is completed by way of conductor 924, fixed contact 925 and movable contact 947 of relay 767 $R_Q$, conductor 927, left-hand fixed contact 928 and movable contact 888 of switch 889, point 770, conductor 771, point 772, fixed contact 752 and movable contact 753 of switch 754 $T_S$, conductor 755 to line wire $L_2$.

Relay $R_D$ operates at the same time as relay $R_A$ and is operated by the contacts of relay $R_A$. After $R_D$ has been energized it is locked in its operated position by its own contacts and remains in its operated position until the carriage return following a final total operation. The holding circuit for relay $R_D$ may be traced from line wire $L_1$ (Fig. 34D) through conductor 182, conductor 718, conductor 846, contacts 849 and 850 of switch $T_H$, conductor 851, conductor 898, conductor 899, conductor 912, winding of relay $R_D$, contacts 955 and 956 of relay $R_D$ and conductor 726 to line wire $L_2$. A second set of contacts on relay $R_D$ prepares a circuit for the carriage clearing solenoids $S_{CA}$ and $S_{CB}$. These solenoids operate after the Non-Tax switch N has been operated and restored to normal. These solenoids prepare the calculator carriages so that upon readout of a total after the Non-Tax switch has been restored, the calculator carriages will clear (return to their zero starting point). The circuit for the operation of these solenoids may be traced through line wire $L_1$, conductor 182, left-hand contacts of switch $P_T$, contacts 193 and 962 of relay $R_Q$, conductor 788, conductor 1039, windings of solenoids $S_{CA}$ and $S_{CB}$, conductor 1040, contacts 1092 and 1093 of relay $R_D$, conductor 920, left-hand contacts of switch N and conductor 897 to line wire $L_2$.

Relay 767 $R_Q$ is initially operated when the total initiating switch 957 $K_T$ is operated to close its movable contact 958 against its fixed contact 959, the initial energizing circuit for relay 767 $R_Q$ being traceable from; line wire $L_1$ (Fig. 34e), conductor 182, conductor 718, conductor 846, movable contact 849 and fixed contact 850 of switch 848 $T_H$, conductor 851, conductor 898, winding of relay 767 $R_Q$, conductor 960, movable contact 958 and fixed contact 959 of switch 957 $K_T$, conductor 574, conductor 726 to line wire $L_2$. Relay 767 $R_Q$, upon being energized, breaks the initial circuit leading to the motor 680 and moves the movable contact 725 of relay 767 $R_Q$ against its fixed contact 961, to provide the locking circuit by way of conductor 726 to line wire $L_2$. When relay 767 $R_Q$ operates it prepares a new circuit (Fig. 34e), to take the place of the circuit going through $P_T$ switch on its right-hand fixed contact 729 so that the circuit from conductor 182 extends by way of conductor 730, movable contact 727, to fixed contact 728 on left side of $P_T$ switch, through conductor 191 to movable contact 193 closed by the operation of relay $R_Q$ 767 against fixed contact 962 and then up through conductor 788 to the various solenoids supplied through conductor 788. Operation of relay 767 $R_Q$ prepares a new circuit to take the place also, of the printing circuit going through the switch $P_P$ involving the typewriter solenoids and the conductor 76, the new circuit being prepared by the closing of movable contact 963 against the fixed contact 964 of the contacts of relay $R_Q$ 767 so that the new circuit will branch off conductor 76 by way of conductor 965 and through fixed contact 964 and movable contact 963 of relay 767 $R_Q$ to conductor 966, to conductor 967, left-hand fixed contact 968 of program switch $P_{MB}$, movable contact 799, conductor 750, conductor 751, point 772, right-hand fixed contact 752 and movable contact 753 of switch 754 $T_S$, conductor 755 to line wire $L_2$. Operation of relay 767 $R_Q$ also prepares a new circuit to take the place of the circuits for the Div Tab solenoids 543 and 821 completed during compute, through the contacts of program switches $P_{DA}$ and $P_{DB}$, the new circuit for the Div Tab solenoid 543 $S_{DA}$ being by way of conductor 922 (Fig. 34e), right-hand fixed contact 970 and movable contact 971 of relay 767 $R_Q$, conductor 972, left-hand fixed contact 1096, movable contact 870 of program switch $P_X$, conductor 878, left-hand fixed contact 879 and movable contact 880 of relay $R_A$ 901, conductor 882, left-hand fixed contact 883 and movable contact 884 of relay 929 $R_C$, conductor 886, right-hand fixed contact 887 and movable contact 888 of switch 889 $T_{AB}$, point 770, conductor 771, point 772, right-hand fixed contact 752, and movable contact 753 of switch 754 $T_S$, conductor 755 to line wire $L_2$. The new circuit for $S_{DB}$ is by way of conductor 824, point 923, conductor 924, fixed contact 925 of relay $R_Q$, movable contact 947, conductor 927, fixed contact 928, movable contact 888, conductor 771, fixed contact 752, movable contact 753 and conductor 755 to line wire $L_2$. The operation of relay 767 $R_Q$ also opens the $L_2$ side of the circuit, extending through the solenoids 973 and 760 $S_{6A}$ and $S_{6B}$, respectively.

Relay 975 $R_{S1}$, operates through its right-hand contacts 976 and 977 to close a circuit to the selection gate clear solenoids in the "A" and "B" calculators and through its left contacts 978 and 979 to close a circuit for relay 980 $R_{S2}$. The circuit for the operation of relay 975 $R_{S1}$ is line wire $L_1$ (Fig. 34e), conductor 981, winding of relay 975 $R_{S1}$, conductor 982, fixed contact 983 and movable contact 984 of switch 985 $T_C$, conductor 986, right-hand fixed contact 987 and movable contact 875 of switch 876 $T_T$, conductor 877, fixed contact 949 and movable contact 950 of switch $B_D$, conductor 1002, fixed contact 1003, and movable contact 1004 of relay $R_T$ 903, conductor 1005, conductor 991 to line wire $L_2$, and at times through an alternate $R_{S1}$ circuit from fixed contact 949 and movable contact 950 of switch $B_D$, conductor 951, fixed contact 756 and movable contact 753 of switch $T_S$, conductor 755 to line wire $L_2$. The circuit to the selection gate clear solenoids for the "A" and "B" calculators may be traced as follows: Line wire $L_1$ (Fig. 34e), conductor 832, movable contact 976 and fixed contact 977 of relay 975 $R_{S1}$, conductor 988, cable 989, and in the one case leading to the selection gate solenoids for the "A" calculator and in this case particularly to the winding of solenoid 526 shown in Figs. 8 and 40, in the solenoid selecting unit 400 for the "A" calculator, conductor 990, conductor 991 to line wire $L_2$. The circuit for the selection gate solenoids of the "B" calculator is by way of conductor 832 (Fig. 34e), movable contact 976 and fixed contact 977 of relay 975 $R_{S1}$, conductor 988, cable 992, winding of solenoid 526 shown in Figs. 8 and 39, conductor 993, conductor 991 to line wire $L_2$. When the solenoid 526 in the solenoid selection unit 400 of either the "A" or "B" calculator is energized to thrust its plunger 525 downward against the enlargement 524 on the lever 520, the gate bars 234, 235, 236 and 237 are brought back to normal position so that the gateways are clear through all the bars as shown in Figs. 8 and 9.

Relay 980 $R_{S2}$ operates through its innermost right-hand contacts 994 and 995 to close the circuit for the operation of the solenoids 996 $S_{NA}$ and 997 $S_{NB}$ for the "A" calculator and the "B" calculator, respectively, these "A" calculator and the "B" calculator, respectively, these solenoids being the normal clear solenoids for the "A" and "B" calculators and being connected in parallel in the following circuit: Line wire $L_1$ (Fig. 34e), conductor 182, conductor 730, movable contact 727 and fixed contact 728 of switch $P_T$, conductor 191, conductor 998, windings of solenoids 996 and 997 in parallel, conductor 999, fixed contact 994 and movable contact 995 of relay 980 $R_{S2}$, conductor 1000, conductor 784, fixed contact 785, and movable contact 786 of switch $P_C$, conductor 787 to line wire $L_2$. Relay 980 $R_{S2}$ through its outermost right-hand contacts 780 and 782, closes a circuit for the operation of solenoids 973 and 760 $S_{6A}$ and $S_{6B}$, respectively, which are the six place clear solenoids for the "A" and "B" calculators. The normal circuit for the operation of relay 980 $R_{S2}$ is line wire $L_1$, conductor 1006, fixed contact 979 and movable contact 978 of left-hand contacts of relay 975 $R_{S1}$, and conductor 1007, winding of relay 980 $R_{S2}$, conductor 1008, conductor 1009, fixed contact 983, movable contact 984 of switch 985 $T_C$, conductor 986, right-hand fixed contact 987 and movable contact 875 of switch 876 $T_T$, conductor 877, fixed contact 949 and movable contact 950 of switch $B_d$, point 1001, conductor 1002, fixed contact 1003, and movable contact 1004 of relay 903 $R_T$, conductor 1005, conductor 991 to line wire $L_2$.

Relay $R_T$ operates during the total and compute cycles. The unoperated contacts of $R_T$ provide a secondary circuit to relay $R_{S1}$ so that the selection clearing solenoids $S_{6A}$ and $S_{6B}$ can be operated after the carriage-operated switch $T_S$ has been transferred. This circuit must be removed during the total and compute cycles so as not to interfere with the automatic tabulation operation of the typewriter. The secondary circuit may be traced as follows: Line wire $L_1$ (Fig. 34e), conductor 981, winding of relay $R_{S1}$, conductor 982, contacts 983 and 984 of switch $T_C$, conductor 986, contacts 987 and 875 of switch $T_T$, contacts 949 and 950 of switch $B_D$, conductor 1002, contacts 1003 and 1004 of relay $R_T$, conductor 991 to line wire $L_2$. Relay $R_T$, also controls the operation of relay $R_A$ when the Non-Tax switch N is in its operated position. This circuit is traceable from line wire $L_1$ (Fig. 34e), conductor 894, contacts 902 and 903' of relay $R_T$, conductor 895, winding of relay $R_A$, conductor 896, contacts 893 and 892 of switch N and conductor 897 to line wire $L_2$.

The circuit for the energization of relay 903 $R_T$ may be traced as follows: Line wire $L_1$, conductor 182, conductor 730, movable contact 727 and right-hand fixed contact 729 of switch $P_T$, conductor 788, point 1072, conductor 1073, winding of relay 903 $R_T$, conductor 1070, point 1071, conductor 726 to line wire $L_2$.

Red Warning Lamp Switch $B_F$

By virtue of the number of readout selector switches provided in this apparatus, the number being 6 as shown in Fig. 6, the capacity of the present setup of the apparatus is limited to a total of accumulations in the readout selector switches of $9,999.99. To give some warning to an operator of the apparatus, that the apparatus is approaching its limit of accumulation, a red signal lamp 1019 is provided in the circuit, the lamp being located in the control box of the apparatus. As shown in Fig. 34e, the lamp 1019 is controlled by means of a switch $B_F$ 1010 which is normally held open, but spring-biased to close. When the movable contact 1011 is closed against the fixed contact 1012 of the switch 1010, the lamp 1019 will be illuminated to indicate that the amount accumulated in the calculator has reached the sum of $7,000.00. Operation of the lamp 1019 to illuminated condition simply warns the operator that the amount in the calculator is approaching the $9,999.99 limit of the set of readout selector switches. The circuit for the energization of the lamp may be traced as follows: Line wire $L_1$ (Fig. 34e), conductor 1013, fixed contact 1012 and movable contact 1011 of switch 1010, filament of lamp 1019, conductor 1014, conductor 991 to line wire $L_2$. To control the operation of the switch 1010 as shown in Fig. 6a, the switch is so located that its control button 1015 bears against the outer edge of a numeral wheel 1016 of the readout selector switch. A portion of the outer edge of the numeral wheel has been cut away as shown at 1017, the cutaway portion being the point of the #7 on the numeral wheel 1016, and extending progressively from the point at numeral "7" to and including the point of the numeral "9" immediately preceding the point of the cipher on the numeral wheel. As the numeral wheel 1016 progressively rotates in its journey from the position of the numeral "1" to the position of the #6, the switch is held open by virtue of the bearing of the full diameter of the numeral wheel 1016 on the control button 1015 of the switch 1010. When, however, the numeral wheel has progressed beyond the position of the numeral "6" the control button 1015 of the switch can move outwardly upon further rotation of the numeral wheel 1016 in the same direction, the switch 1010 $B_F$ then closes to cause the signal lamp 1019 to be energized.

Switch $T_B$, shown in Fig. 35, is actuated by the backspace mechanism of the typewriter. Operation of the backspace switch $T_B$ completes a circuit to the backspace solenoid 539 of the "A" or "B" calculator to operate the escape shaft 146 of the "A" or "B" calculator, whichever is involved, depending upon the position of the typewriter switches $T_S$ and $T_{AB}$. Operation of the backspace switch $T_B$ completes a circuit to the backspace solenoid 539 of the selected calculator and causes the escape shaft 146 to move in a direction opposite from the normal stepping rotation of the shaft. The backspace circuit is traceable from line wire $L_1$ (Fig. 34a) through conductor 182, conductor 730, contacts 727 and 728 of switch P_T, conductor 191, contacts 193 and 192 of relay R_Q, conductor 183, conductor 194 through contacts 20 and 21 of switch T_B, shown in Fig. 35, through cable 107, cable 93 and 915, through the windings of the escape shaft solenoids shown in Figs. 39a and 40a. The circuit from here on is commoned with the other escape shaft solenoids and is completed to line wire L_2 via conductors 942 or 916 through relay contacts and switches T_S and T_AB.

Switch T_SP

Switch T_SP is actuated by the spacing mechanism of the typewriter. This switch is in parallel with the typewriter zero selection switch. Operation of the space mechanism, in turn, operates switch T_SP which closes a circuit to the zero relay (Fig. 37). Its function and circuit from there on is the same as for the typewriter zero key switch.

Relay R_Z (suppression of zero)

All zeros which occur prior to a numeral ("1" thru "9") during the automatic readout operation of the calculators into the typewriter are suppressed. This is accomplished by a special relay (R_Z) which is mounted under the typewriter frame, and a switch (T_K) which is operated by the typewriter ribbon oscillating mechanism, and a spacing solenoid (S_ST) which operates the space bar in the typewriter. When a zero is received in the typewriter, prior to a numeral ("1" thru "9"), the spacing solenoid S_ST energizes causing the typewriter to space. It will be seen, by reference to Fig. 36, that the circuit to the zero solenoid (S_OT) is opened by the 1110 movable contact and the 1108 fixed contact of relay R_Z, and that the circuit to the spacing solenoid (S_ST) is completed through the movable contact 1110 and the fixed contact 1109 of relay R_Z, therefore, the typewriter spaces instead of printing upon reception of the zero impulse. When the first numeral ("1" thru "9") is received, the switch T_K is operated by the ribbon oscillation mechanism. Closure of movable contact 1114 against fixed contact 1113 of switch T_K completes a circuit to relay R_Z which is, in turn, operated and locked operated by its own contacts 1111 and 1107. The outer movable contact of relay R_Z closes against fixed contact 1108 thus completing a circuit to the zero solenoid S_OT through conductor 1105 and opening the circuit to the spacing solenoid normally via contact 1109 and conductor 1106. Relay R_Z remains operated until the total, or compute function is completed.

The various units of this apparatus, namely the typewriter, the calculators "A" and "B," are modifications of an electrically operated typewriter and an electrically operated calculator "A" and an electrically operated calculator "B," the modifications involving the electrical parts above-described. The control unit is a completely new piece of apparatus constructed for the purpose of controlling the operations of the calculators by means of the typewriter and the operations of the typewriter, in some instances, by operation and condition of the calculators "A" and "B." To provide means for electrically connecting the typewriter and the calculators, mutliple plugs and jacks are provided of a type indicated by the jack 1018 shown in Fig. 6.

Special multiplier

The calculators "A" and "B" have individual multiplier units 1021 comprising (Figs. 24 and 25), a pin carriage 1022 in which are selectively settable pins 1023 operable to be set in required positions to control the extent of rotational movement in one direction, of rotational and pivotally supported racks 1024 operable to control the magnitude of the multiplier used in multiplying amounts set up in the calculator. The racks 1024 are normally held against rotational movement by means of pawls 1025 which may be tripped to release the racks 1024. The pin carriage is slidably supported on a bar 1026 and is movable toward and away from a fixed support 1027 from which projects a bumper 1028. Extending from the support 1027 is a trip bar 1029 to trip some of the pawls 1025 with the pin carriage 1022 is moved to bring its side wall 1030 into engagement with the bumper 1028. The trip bar 1029 shown in Fig. 25 will pass by a shortened pawl 1031 and will trip the next two pawls 1025 encountered by the inclined plane end portion 1032 as the pin carriage 1022 is moved to engage the bumper 1028. The remaining pawls 1025 will not be tripped in this arrangement due to the stopping of the pin carriage 1021 by the bumper 1028. Assuming that the pins 1023 are maintained set for a multiplier value of 25% and the multiplier unit 1021 is operated in its clearing out operation to make the trip bar effective to trip the pawls 1025 in the same orders as the pins 1023 are set for the value required, the multiplier 1021 will be reset to the value required which in this particular instance is 25%.

Control of carriage clear

In the "A" and "B" calculators, as shown in Fig. 34, solenoids S_CA and S_CB are provided to control the operation of the latch arm 1035 shown in Fig. 21. The latch arm 1035 corresponds to the latch arm 184 shown and described in A. B. Machado's Patent No. 2,279,474 issued April 14, 1942 and to which reference may be had for a fuel explanation of the structure and function of the latch arm. The latch arms 1035 are operable during the carriage clear operations of the calculators and the solenoids 1033 and 1034 are operable through movement of their plungers 1036 to release the latch by pressing the latch arms downwardly against the action of the restoring spring 1037. The solenoids 1033 and 1034 for the respective calculators "A" and "B" have their plungers 1036 pressing down on a flange 1038 formed on the latch arm 1035, the provision of the flange 1038 being a modification of latch arm 1035 to enable control thereof by the solenoids.

In the typewriter 101 are provided solenoids S_AT 1042, and S_3S 1043 which are fixed relative to the movable carriage of the typewriter, and are energized during the computing cycle.

Solenoid 1042 S_AT, as shown in Fig. 42, is supported on a fixed bracket 1044 so that its plunger 1045, when extended, will be in the path of movement of a pivotally supported arm 1046 mounted on a bracket 1047 supported on a bar 1048 bolted to a plate 1049 on the carriage of the typewriter. Conventional with the bar 1048 on the typewriter is a tabulating stop plate 1050 having thereon, projections 1051, 1052, 1053 and 1054, the function of which is to serve as definite spaced stops during the passage of the carriage of the typewriter from one end of its run to the other. The arm 1046 pivotally supported at 1055 is normally held raised by means of a spring 1056, one end of which is attached to an apertured extension 1057 extending angularly from the arm 1046. The other end of the spring is attached to a hooked portion 1058 of the bracket 1047. The upper edge of the arm 1046 is provided with two inclined surfaces 1059, 1060 forming a cam to be engaged by the plunger 1045 of the solenoid 1042. Near the free end of the arm 1046 and extending downwardly therefrom, are two spaced finger portions 1061 and 1062 which are arranged to move into spaces on opposite sides of the projection 1052 when the arm 1046 is cammed downwardly by means of the plunger 1045 on the solenoid 1042. It will be seen therefore, that when the arm 1046 is in its lower position as shown in Fig. 43, there are two more stops provided for the carriage on the typewriter, since the fingers 1061 and 1062 lie against the stop plate 1050 and in parallel spaced relation with the projection 1052.

The solenoid 1043 S_3S, as shown in Fig. 28 is mounted on a fixed bracket 1063 so that its plunger 1064, when extended beyond the position shown in Fig. 28, will be in the path of movement of a lever 1165 forming part of the mechanism 1166 for rotating the platen of the typewriter, the mechanism 1166 comprising conventional members such as the spring-pressed pivotally supported limiting lever 1167, a vertically adjustable lever 1168, supporting a pawl 1169, the assembled levers 1167 and 1168 and pawl 1169 being under the control of a manually operable lever 1170 and being cooperable to rotate the platen of the typewriter in definite steps as required. The lever 1165 is attached at two points 1171 and 1172 to the lever 1170, and is provided with a return spring 1173 to hold the outer end of the lever 1165 normally elevated, the outer end of the lever 1165 being provided with a cam surface 1174. The lever 1170 is provided with a laterally projecting stop 1176 which, upon operation of the lever 1170 toward the left of the position shown in Fig. 28, will move from a recess 1177 formed in the lever 1167 and into the path of movement of a lower recess 1178 formed in the lever 1167, thus allowing the lever 1167 to rise under the action of the spring 1175. When pressure is applied to the outer end of the lever 1165 on the cam surface 1174, the lever 1167 and the vertical lever 1168 are allowed to move upwardly, the lever 1167 being moved under the action of a spring 1175 so that the lever 1168 and the pawl 1169 will be raised a sufficient distance that, upon operation in its downward path, the pawl 1169 will rotate the platen three spaces instead of one, therefore when the solenoid 1043 is energized and the plunger 1064 is extended and the cam surface 1174 of the lever system in the mechanism 1166 comes into contact with the plunger 1064 of the solenoid in a return movement of the carriage, the mechanism 1166 will be conditioned for a three step rotative movement of the platen of the typewriter.

The circuit for energization of the solenoids 1042 $S_{AT}$, and 1043 $S_{3S}$ is controlled by the cam 696 $P_T$ in the cam control unit 104, and may be traced as follows: Line wire $L_1$, conductor 182, conductor 730, movable contact 727, and right-hand fixed contact 729, of switch $P_T$, conductor 788, conductor 1069, and winding of solenoids 1042 and 1043 in parallel, conductor 1070, to point 1071, conductor 726 to line wire $L_2$.

The switches $T_S$, $T_{AB}$, $T_+$, $T_C$ and $T_H$ shown in Fig. 34 are operated as shown in Figs. 26 and 27, by a set of cams 1077 mounted on a bar 1048 of the typewriter 101. Cam 1078 is operable to operate the switches $T_+$, $T_H$, only when the carriage of the typewriter is moving to the right as shown in Fig. 26. The one way operation of the switches $T_+$, and $T_H$ is obtained by virtue of the provision in the switches $T_+$ and $T_H$ of knee-jointed operating legs 1079 and 1080, respectively, which will bend at the pivotal points 1081 and 1082 against the action of the restoring spring 1083 and 1084, respectively when the cam 1078 is passing from right to left. Switch $T_C$ is operated by a cam 1085 having therein a single depression 1086. Switch $T_{AB}$ is operated by a cam 1087 having a low spot 1088 and a high spot 1089, while $T_S$ is operated by a cam 1090, the five rollers for the switches above-mentioned being arranged as shown in Fig. 27.

DESCRIPTION OF OPERATION

Assuming that numeral "1" is typed on the typewriter in the first amount column, entry of this amount would be made in the calculator by operation of the escape shaft solenoid and the selection gate solenoids in the calculators over the following circuit: Line wire $L_1$ (Fig. 34a), conductor 182, conductor 730, movable contact 727 and left-hand fixed contact 728 of switch $P_T$, conductor 191, movable contact 193, and left-hand fixed contact 192, conductor 183, conductor 194, switch $T_1$ in the typewriter 101, cable 107, to the #1 relay in the numeral relays (Fig. 37), conductor 190, conductor 1094, to line wire $L_2$, and coming out of the numeral relays shown in Fig. 37, through the selection solenoid unit 400 to operate the escape shaft solenoid and the selection gate solenoids as follows, assuming that entry of the numeral "1" would be made in the "A" calculator: Cable 93, escape shaft solenoid 426, conductor 942 (Fig. 34a), left-hand fixed contact 1095, movable contact 971 of relay $R_Q$, conductor 972, left-hand fixed contact 1096 and movable contact 870 of switch $P_X$, left-hand fixed contact 879, and movable contact 880 of switch 881, conductor 882, left-hand fixed contact 883, and movable contact 884 of switch 885, conductor 886, right-hand fixed contact 887, and movable contact 888 of switch 889$T_{AB}$ point 770, conductor 771, point 772, right-hand fixed contact 752 and movable contact 753 of switch $T_S$ 754, conductor 755, to line wire $L_2$. After this operation the solenoids $S_{+A}$844, and $S_{+B}$845, are operated to operate the addition keys of the calculators, the solenoids $S_{+A}$ and $S_{+B}$ being energized over the following circuit: Line wire $L_1$, conductor 182, conductor 730, movable contact 727 and left-hand fixed contact 728 of switch $P_T$, conductor 191, movable contact 193 and left-hand fixed contact 192 of relay $R_Q$, conductor 183, conductor 194, fixed contact 865, and movable contact 864 of switch 866$T_+$, conductor 867, windings of solenoids $S_{+A}$844 and $S_{+B}$845, in parallel, conductor 868 to line wire $L_2$.

Assuming that the numerals were being entered through the typewriter and for entering in the "B" calculator, the circuit would be as follows: Line wire $L_1$, conductor 182, conductor 730, movable contact 727 and left-hand fixed contact 728 of switch $P_T$, conductor 191, movable contact 193, left-hand fixed contact 192 of relay $R_Q$, conductor 183, conductor 194, the required typewriter switch in Fig. 35, cable 107, the corresponding control unit relay in Fig. 37 of the set of relays 167, conductor 190, conductor 1094, to line wire $L_2$, and from the control unit relays 167 through the escape shaft solenoid and the selection gate solenoids of the "B" calculator as follows: For the escape shaft solenoid, cable 915, as follows: For the escape shaft solenoid required for the low or high order digit to be entered, conductor 916, conductor 945, left-hand fixed contact 946, movable contact 947, conductor 927, left-hand fixed contact 928 and movable contact 888 of switch 889$T_{AB}$, point 770, conductor 771, point 772, right-hand fixed contact 752 and movable contact 753 of switch 754$T_S$, conductor 755 to line wire $L_2$. For the selection gate solenoid of the "B" calculator as follows: Cable 992, the solenoid for the required digit, conductor 993, conductor 991 to line wire $L_2$.

To obtain a total of the amounts in the calculator, the total key $K_T$ switch 957 is manually operated to energize relay $R_Q$ over the following circuit, in Fig. 34A: Line wire $L_1$, conductor 182, conductor 718, conductor 846, movable contact 849 and fixed contact 850 of switch 848, conductor 851, conductor 910, winding of relay $R_Q$, conductor 960, movable contact 958 and right-hand fixed contact 959 of switch 957$K_T$, conductor 574, conductor 726 to line wire $L_2$. Thus conditioned solenoid 800$S_{TAB}$ will be energized as follows to operate the tab key over the following circuit: Line wire $L_1$, conductor 182, conductor 730, movable contact 727, and left-hand fixed contact 728 of switch $P_T$, conductor 191, movable contact 193, and fixed contact 962 of relay $R_Q$, conductor 788, conductor 801, winding of solenoid 800$S_{TAB}$, conductor 802, movable contact 805, and left-hand fixed contact 872 of switch $P_Y$, conductor 873, left-hand fixed contact 874 and movable contact 875 of switch $T_T$876, conductor 877, fixed contact 949, and movable contact 950 of switch $B_D$, conductor 951, left-hand fixed contact fixed contact 756 and movable contact 753 of switch 754$T_S$, conductor 755 to line wire $L_2$.

In the next operation the Div Tab keys of the "A" calculator and the "B" calculator are depressed by operation of the solenoids $S_{DA}$ and $S_{DB}$, respectively, over the following circuits (Fig. 34e): For the "A" calculator— Line wire $L_1$, conductor 182, conductor 730, movable contact 727, and left-hand fixed contact 728 of switch $P_T$, conductor 191, movable contact 193, and right-hand fixed contact of 962 of relay $R_Q$, conductor 788, conductor 813, winding of solenoid 543$S_{DA}$, conductor 814, conductor 922, right-hand fixed contact 970, and movable contact 971 of leftmost contacts of relay $R_Q$, conductor 972, left-hand fixed contact 1096 and movable contact 870 of switch 769$P_X$, conductor 878, left-hand fixed contact 879 and movable contact 880 of switch 881, conductor 882, left-hand fixed contact 883 and movable contact 834 of relay 929$R_C$, conductor 886, right-hand fixed contact 887 and movable contact 888 of switch 889$T_{AB}$, point 770, conductor 771, point 772, right-hand fixed contact 752 and movable contact 753 of switch $T_S$, conductor 755 to line wire $L_2$.

For the Div Tab of the "B" calculator the circuit would be as follows: Line wire $L_1$, conductor 182, conductor 730, movable contact 727 and left-hand fixed contact 728, of switch $P_T$, conductor 191, movable contact 193, and right-hand fixed contact 962 of relay $R_Q$, conductor 788, conductor 822, winding of solenoid 821$S_{DB}$, conductor 823, conductor 824, point 923, conductor 924, right-hand fixed contact 925 and movable contact 947 of relay $R_Q$, conductor 927, left-hand fixed contact 928 and movable contact 888 of switch 889$T_{AB}$, point 770, conductor 771, point 772, right-hand fixed contact 752 and movable contact 753 of switch $T_S$, conductor 755 to line wire $L_2$.

Computation and readout

When computation is required, the compute key $K_C$ is operated to bring its movable contact 716 against its fixed contact 717 to bring into operation the motor 680, as previously described, so that the program unit 104 will be operated to control the complete computation cycle, in accordance with the timing chart shown in Fig. 41.

When the computation has been started and the readout begins, the readout circuit for the "A" calculator may be traced as follows, in Fig. 34A: Line wire $L_1$, conductor 934, point 935, movable contact 936, right-hand fixed contact 1020 of switch 938, conductor 74, the selector switches 171 or 172 of the "A" calculator, conductor 1100, the control unit relays (the set of relays 167 in Fig. 37), conductor 190, conductor 1094 to line wire $L_2$, and through the contacts controlled by the relays 167 and thence through the typewriter solenoids shown in Fig. 36 by way of conductors in the cable 734 to the solenoids 181 in the typewriter, conductor 76, conductor 965, right-hand fixed contact 964, and movable contact 963 of relay $R_Q$, conductor 966, conductor 967, left-hand fixed contact 968 and movable contact 799 of switch 969 $P_{MB}$, conductor 750, conductor 751, point 772, right-hand fixed contact 752 and movable contact 753 of switch $T_S$, conductor 755, to line wire $L_2$.

For a readout from the "B" calculator the circuit would be as follows: Line wire $L_1$, conductor 182, conductor 718, conductor 846, point 847, and movable contact 849, fixed contact 850 of switch 848 $T_H$, conductor 851, movable contact 852 and left-hand fixed contact 854 of relay $R_B$, conductor 855, movable contact 856 and left-hand fixed contact 1074 of switch 858 $B_R$, conductor 1075, the readout switches in Fig. 38, conductor 1100, the control unit relays 167, shown in Fig. 37, conductor 190, conductor 1094, in Fig. 34A, to line wire $L_2$, and through the contacts controlled by the relays 167 and thence through the typewriter solenoids shown in Fig. 36 by way of conductors in the cable 734 to the solenoids 181 in the typewriter, conductor 76, conductor 965, right-hand fixed contact 964 and movable contact 963 of relay $R_Q$, conductor 966, conductor 967, left-hand fixed contact 968 and movable contact 799 of switch 969 $P_{MB}$, conductor 750, conductor 751, point 772, right-hand fixed contact 752 and movable contact 753 of switch $T_S$, conductor 755 to line wire $L_2$.

Switch operated by left shift

Switches $A_R$ and $B_R$ shown in Fig. 34, are mounted respectively in the two calculators as shown in Figs. 22 and 23, in which 1091 is such a switch. It is a single pole, double throw, switch and transfers from the contact condition shown in Fig. 34 to the opposite contact condition whenever the calculator left shift rod 1192 is moved to the right in Fig. 23, which it does whenever the calculator carriage is in the process of shifting to the left.

Single cycle add and subtract mechanism

In calculating machines of the kind employed in this invention it is conventional to provide a lever system of the general type shown in Fig. 30, but arranged to selectively limit the machine to single cycles of operation. In the add release and pitman assembly provided in the toll billing machine described, the lever system is arranged for single cycle operation instead of selective. Operation of the lever 1122 by the pin 1123 on the counter actuating cam 1124 will operate the pitman 1125 to cause a bellcrank lever 1126 to move to control a clutch to a power source, not shown, of the calculating machine.

GENERAL DECRIPTION OF OPERATION AND CIRCUITRY OF THE TOLL BILLER

NOTE: Reference to Figs. 34, 41, 44 and 45 will aid in understanding the following description.

1. Listing of charges (a) SELECTION CLEARING

When preparing a customer bill for telephone services, the operator first typewrites the date and the telephone number in the upper left-hand portion of the bill. The typewriter carriage is then returned and the date of the first "place called" item is entered in the left column of the bill. The typewriter carriage is then tabulated to the "place called" space and the first "place called" item is entered. The carriage is again tabulated to the "A" (15%) or the "B" (25%) column of the bill, whichever is applicable. Tabulation of the carriage from the "place called" space to the "A" amount column transfers the carriage operated switch $T_C$ and switch $T_T$ which is operated by the tabulating mechanism of the typewriter. Transfer of these switches completes a circuit to control relay $R_{S1}$. As can be seen by the circuit diagram, the circuit from the $L_2$ side of the power input to relay $R_{S1}$ is via switches $T_S$, $B_D$, $T_T$, and $T_C$, however, circuit from $L_2$ is completed through the unopened contacts of relay $R_T$ to switch $B_D$. The purpose of the secondary circuit is to provide an $L_2$ source to relay $R_{S1}$ in the event that the "place called" item is extra long and the typewriter is not tabulated until the carriage has reached the "A" amount column. Switch $T_S$ is transferred at this time and the original circuit to $R_{S1}$ would be open. Operation of relay $R_{S1}$ completes a circuit to the #5 solenoid of both the "A" and "B" calculator selection units. Operation of the #5 selection solenoid in turn clears the selection gates and prepares the respective "A" and "B" calculator selection units for further selection clearing. Closure of $R_{S1}$ contacts also completes a circuit to control relay $R_{S2}$ which, in turn, operates and completes a circuit to the "A" and "B" calculator selection clearing solenoids $S_{NA}$ and $S_{NB}$. Operation of the selection clearing solenoids restores the selection slides and resets the escape shaft, of the respective selection units, to the second order which is the starting point during normal selection. In effect, the operation described herein, clears any amount which may have previously entered the selection, and prepared the selection units of the "A" and "B" calculators for further selection.

(b) ENTERING OF SELECTION INTO "A" AND "B" CALCULATORS (1) "A" Calculator:

If the charge of a particular item listed on the bill is taxable by 15%, the charge is typed in the "A" amount column. Movement of the typewriter carriage into "A" amount column transfers the carriage operated switch $T_S$ which completes an $L_2$ circuit to the "A" calculator escape shaft solenoids. Typing of the amount in "A"

column establishes individual circuits to the $L_1$ side of the escape shaft and selection solenoids via the numeral selection relays and the amount typed is entered into the "A" calculator selection unit. This is accomplished by the numeral switches ($T_0$ thru $T_9$) on the typewriter. Each numeral key on the typewriter has an associated numeral switch which is operated when that particular key is typed. Operation of any numeral switch completes a circuit to a related numeral selection relay ($R_0$ thru $R_1$) in the control unit. Operation of a numeral selection relay, in turn, completes circuits to the $L_1$ side of the associated escape shaft and selection solenoid in the calculator selection unit. Since the $L_2$ common side of the escape shaft solenoids has been completed by $T_S$, and the common side of the selection solenoids have a permanent connection to $L_2$, these solenoids energize and selection is made in the "A" calculator.

(2) "B" Calculator:

If the charge of a particular item listed on the bill is taxable by 25%, the carriage is tabbed through "A" column to the "B" amount column. Upon entry into "B" column, the carriage operated switch $T_{AB}$ is restored to its normal position, as shown in the circuit schematic ($T_{AB}$ originally operates shortly after the carriage leaves the left margin of the bill). Transfer of switch $T_{AB}$ opens the circuit to the "A" calculator escape shaft solenoids and establishes a circuit to the common $L_2$ side of the "B" calculator escape shaft solenoids. The charge is typed in the "B" amount column and selection is made in the "B" calculator selection unit. The numeral switches and selection relays operate and the selection procedure is the same as that described for "A" calculator except that the circuit to the "A" escape shaft solenoids has been opened and the circuit to the "B" escape shaft solenoids has been completed causing the selection to be made in the "B" instead of the "A" calculator.

(c) BACKSPACING

If the amount to be typed in "A" or "B" column of the bill, as described above, consists of more than two figures, the backspace key on the typewriter must be depressed prior to making the amount entry. Operation of the backspace key causes the typewriter carriage to backspace and the typewriter backspace mechanism operates the backspace switch $T_B$, as shown in Fig. 35. Transfer of the backspace switch $T_B$, in turn, completes a circuit to the backspace solenoid of "A" or "B" calculator, whichever is involved. The backspace solenoid is contained in the escape shaft space portion of calculator selection unit and its operation causes the escape shaft to turn in a direction opposite the normal stepping direction of rotation. The escape shaft rotates in a reverse direction one space each time the backspace key of the typewriter is operated. If the charge to be typed consists of three figures the operator must backspace once. If the charge consists of four figures, the operator must backspace twice, etc. This sets the escape shaft to the required selection order in accordance with the number of figures contained in a particular charge. The escape shafts of the "A" and "B" calculators originally were positioned to the second order during selection clearing described previously.

(d) SELECTION OF ZERO DURING SPACING

A switch is provided on the spacing mechanism of the typewriter which operates during spacing in "A" or "B" amount column. The spacing switch $T_{SP}$ is in direct connection with the zero selection relay $R_0$, and its operation, while the typewriter is in the "A" or "B" amount column, causes a zero to be selected in the "A" or "B" calculator selection unit, whichever is involved. The zero selection solenoid is also mounted on the escape shaft portion of the calculator selection unit and its operation causes the escape shaft to step, in the normal direction of rotation, one place each time the space bar is operated. It can be seen that the zero solenoid performs exactly the opposite function of the backspace solenoid and if, during the backspace operation described previously, the operator should backspace too many times, the space bar may be operated which will position the escape shaft to the desired selection order.

(e) ADDITION ON CARRIAGE RETURN

After a "place called" item and charge has been entered on the bill, as described previously, the typewriter carriage is returned. Returning of the typewriter carriage operates switch $T_+$ which, in turn, completes a circuit to the calculator add solenoids $S_{+A}$ and $S_{+B}$. This initiates an addition or plus operation in the "A" and "B" calculators and causes the amount in the selection unit of the "A" or "B" calculator to be added to the amount in the respective "A" or "B" set of accumulator dials. It can be seen that the amount in the accumulator after the first entry on a bill would be the original typed amount since the accumulator dials are returned to zero prior to the beginning of each bill. The amount in the accumulator dials after the second entry in the same column would be the first amount plus the second amount, etc. In effect, a running total of the "A" and "B" amount columns is stored in the accumulator dials of the respective "A" and "B" calcultaors.

(f) CORRECTION

Occasionally in the preparation of bills, the operator may make an error in the amount entered in "A" or "B" column and consequently the calculator. The incorrect amount may be corrected by operation of the correct key $K_{...}$. Operation of the correct key completes a circuit to, and operates the calculator subtract solenoids $S_{-A}$ and $S_{-B}$ which in turn initiates the subtract operation in the "A" and "B" calculators and the incorrect amount is subtracted from the amount in the accumulator dials. Since the incorrect amount was added to the accumulator dials by the carriage return operation, as described previously, the remaining amount in the accumulator dials is the same as the amount prior to the incorrect entry. It can be seen that correction must be made after the carriage has been returned on the typewriter and prior to entry of the following "place called" item and tabulation. The incorrect amount is marked out on the bill and the operator may continue with the listing of items.

2. *Compute cycle*

After all of the items and charges have been entered on a bill, as described previously, the compute key is depressed. Operation of the compute key ($K_C$) starts the program motor of the control unit which, in turn, operates program switches which control functional elements to automatically compute and typewrite on the bill the total amounts of "A" and "B" column, the tax amounts of "A" and "B" columns, and the final total. This is accomplished as follows: Initial operation of switch $K_C$ completes a circuit to the program motor which is immediately operated. Program switch $P_T$ then operates and establishes a secondary program motor circuit so that the motor will remain operated until the end of the compute cycle. Transfer of switch $P_T$ also completes a common $L_1$ circuit to the special functional solenoids and control relays to be used during the compute cycle. Program switch $P_P$ operates shortly after the beginning of the cycle and establishes an $L_2$ circuit to the common side of the typewriter printing solenoids. Since solenoids $S_{AT}$, $S_{3S}$, $S_{TAB}$ and control relay $R_T$ have $L_2$ connections at the time $P_T$ is transferred, they are immediately energized. Operation of solenoid $S_{AT}$ conditions the auxiliary tab stop mechanism so that tab stops are provided at the six place point in the "A" and "B" amount columns of the bill. Operation of solenoid $S_{3S}$ conditions the triple line feed mechanism on the typewriter so that triple line feeds are obtained during the compute cycle. Energization of solenoid $S_{TAB}$ actuates the tabulation key on the typewriter and the typewriter immediately tabulates. Operation of relay $R_T$ opens the auxiliary circuit to switch $B_D$ so that it does not interfere with the tabulation during the compute cycle. The typewriter tabulates through to the "A" amount space at which point the tabulation circuit is broken by the transfer of switch $T_S$. During tabulation the "A" and "B" calculator selection units are cleared, as described under selection clearing, except that the six place selection clearers $S_{6A}$ and $S_{6B}$ are operated instead of the normal two place clearers $S_{NA}$ and $S_{NB}$. This sets the "A" and "B" selection unit escape shafts at the sixth selection order. Switch $P_{MA}$ then operates and energizes the "A" calculator multiplication solenoid $S_{MA}$ and the "A" calculator begins its multiplication operation. As the "A" calculator carriage starts its right shift, the "A" column total, which has previously been stored in the accumulator dials by selection, is read out and the amount is printed on the bill. This is accomplished through the accumulator dial readout switches which have previously been positioned by the accumulator dials. As the carriage shifts, $L_1$ is supplied via switch $A_R$, through the carriage readout contact and to the selected accumulator dial readout switches which, in turn, are in direct connection with the numeral selection relays. The selection relays complete circuits to the typewriter numeral key solenoids which, in turn, operate the numeral keys and the amount is printed on the bill. The amount in the "A" accumulator dials is also read and entered into its own selection unit. Toward the end of the right shift of the calculator carriage, the carriage clearer which has previously been conditioned by the operation of the carriage clearer solenoid $S_{CA}$ through the operation of program switch $P_C$, clears the amount in the accumulator dials and all of the dials are restored to zero. The calculator carriage then returns to the left and calculator functions take place which multiply the amount in the selection unit ("A" column total) by 15% and the resultant amount is registered in the accumulator dials. Immediately after the total has been printed in the "A" total space of the bill, $T_S$ transfers and again completes the tabulation circuit to the typewriter and the carriage is tabbed to the "B" total amount space at which point the tabulation circuit is again opened by the re-operation of switch $T_S$. Program switch $P_{MB}$ then operates and energizes the "B" calculator multiplication solenoid and the "B" multiplication operation is initiated. The "B" multiplication operation is the same as the "A" multiplication except that the "B" column amount is printed in the "B" total space of the bill and the "B" amount is multiplied by 25% rather than 15%. It can be seen at this point, that the amount now in the "A" calculator selection unit is the "A" column total, the amount in the "A" accumulator is the "A" column tax, the amount in the "B" selection unit is the "B" column total and the amount in the "B" accumulator dials is the "B" column tax. After the total amounts have been printed on the bill the typewriter carriage automatically returns. No addition takes place on carriage return operations during compute as the circuit through $T_+$ to the plus solenoids has been opened by the operation of switch $P_T$. Return of the carriage again transfers switch $T_S$ to its normal position and the circuit to the typewriter tabulation solenoid is re-established. The typewriter then tabulates to the "A" tax space of the bill. No selection clearing takes place during this tabulation of the typewriter since the circuit to the selection clearing solenoids has been opened by the transfer of program switch $P_C$. Program switch $P_{DA}$ is then operated which completes a circuit to the "A" calculator Div Tab solenoid and the "A" Div Tab operation is started. As the "A" calculator Div Tabs its carriage is moved to the left and the amount in the accumulator dials ("A" tax) is read out and printed in the tax space of the bill. No carriage clear takes place during this movement of the calculator carriage as program switch $P_C$ has returned to its normal position, therefore, the amount in the accumulator dials remains. At the end of the "A" Div Tab operation, a plus operation, which is an automatic part of the Div Tab function, takes place adding the amount in the selection unit to the amount in the accumulator dials. Since the selection units were not cleared prior to the Div Tab operation, the amounts previously stored remain. After the "A" tax has been printed on the bill the typewriter is tabbed to the "B" tax space as described previously. Program switch $P_{DB}$ then operates and establishes a circuit to the "B" calculator Div Tab solenoid $S_{DB}$ and the "B" calculator Div Tab operation is initiated. This operation is exactly the same as the "A" Div Tab operation except that the tax amount is printed in the "B" tax space. It can be seen that, at the completion of the "B" Div Tab operation, the amount stored in the "A" accumulator dials is the "A" column total plus the "A" column tax, the amount stored in the "A" selection unit is the "A" total, the amount stored in the "B" accumulator dials is the "B" total plus the "B" column tax and the amount in the "B" selection unit is the "B" column total. After the tax amounts have been printed the typewriter carriage again returns and the typewriter is tabulated as described previously. During tabulation the "A" calculator selection unit is cleared due to the transfer of switch $P_C$ to its normal position. No selection clearing takes place in the "B" calculator as the individual circuit to the "B" selection clearing solenoid $S_{6B}$ has been opened by the previous transferal of program switch $P_6$. It will probably be noted, on the program timing chart, that the tabulation just described, does not take place immediately after the carriage has been returned. The reason for this is that the tabulation circuit has been opened by calculator switch $B_D$ which is operated by the Div Tab key of "B" calculator. After the typewriter has been tabulated to the "A" amount field, the program switch $P_{DB}$ is operated for a second time and the second Div Tab operation is initiated. The amount in the "B" calculator is read into the "A" calculator selection which has previously been cleared, as described. The amount is not typed on the bill during this Div Tab operation since the common side of the typewriter numeral key solenoids has been opened by the previous transfer of switch $P_P$ to its normal position. Switch $P_C$ operates during the "B" Div Tab operation and the amount in the accumulator dials is cleared after the readout operation, however, since an automatic plus operation takes place during Div Tab, the amount in the "B" selection unit is transferred to the accumulator dials. Shortly after the "B" readout, program switch $P_+$ is operated which, in turn, energizes the plus solenoids $S_{+A}$ and $S_{+B}$ of the calculators. This particular plus operation does not take place in the "B" calculator as the plus key is locked mechanically by the "B" Div Tab key which is still operated. The "A" plus solenoid operates, however, and the amount which has just been read into the "A" selection unit from "B" calculator is added to the accumulator dials. The final total amount space of the bill is located beneath the "B" column of the bill, therefore, the typewriter must be tabbed through the "A" amount field since there is no printing in this space. This is accomplished by the operation of switch $P_X$ which establishes an auxiliary circuit to the tabulation solenoid $S_{TAB}$ of the typewriter. After the typewriter has been tabbed to the final total space, program switch $P_{DA}$ is again operated and a second "A" calculator Div Tab operation is initiated. The amount in the "A" accumulator dials is read out and printed in the final total space of the bill. Switch $P_P$ has again operated, at this time, completing a circuit to the typewriter numeral key solenoids. Switch $P_C$ is in its operated position during this Div Tab operation and the amount in the "A" calculator accumulator dials is cleared. At the end of the Div Tab, the amount in the "A" selection is added to the accumulator dials. It can be seen that after the final Div Tab operation, the amount in the "A" calculator accumulator dials is the "B" column total plus the "B" column tax, the amount in the "A" calculator selection unit is the "B" column total plus the "B" column tax, the amount in the "A" calculator accumulator dials is the "B" column total and the amount in the "B" calculator selection unit is the "B" column total. After the final total has been printed on the bill, the typewriter carriage returns, however, no further tabulation takes place as the tabulation circuit is opened by the transfer of switch $P_Y$. The program switch $P_-$ is then operated. Operation of switch $P_-$ completes a circuit to the "A" and "B" calculator subtract solenoids $S_{-A}$ and $S_{-B}$. The subtract operation takes place in both calculators and the amount in their respective selection units is subtracted from the amounts in their respective accumulator dials. Since the amounts in the selection unit and accumulator dials of each calculator is equal, the resultant amount left in the accumulator dials is "0." Switch $P_T$ is then restored to its normal position. Transfer of switch $P_T$ to its normal position opens the motor circuit and restores all circuits to their normal condition. This completes the compute cycle. The total time required for the sequence of operations just described is 15 seconds.

3. Total cycle (a) SUB-TOTAL (WITHOUT CALCULATOR CLEARING)

At any time, during the listing of items and charges on a bill, a total of the charges to that point, can be obtained. To accomplish this, the total key $K_T$ is depressed. Operation of the total key completes a circuit to relay $R_Q$. Relay $R_Q$, in turn, operates and establishes an $L_1$ common line to the functional solenoids and relays to be used during the total cycle. Relay $R_Q$ is locked closed by way of its own contacts and the unoperated contacts of carriage return switch $T_H$. The common $L_1$ line to the functional solenoids also supplies the auxiliary circuit to the program motor described in the compute cycle. Since the operation of the program motor is not required during the total cycle, its $L_2$ circuit is opened by the operated contacts of relay $R_Q$. Typewriter solenoids $S_{AT}$, $S_{3S}$, and $S_{TAB}$, and relay $R_T$ are immediately operated upon closure of the contacts of $R_Q$ and conditions are established similar to those at the beginning of the compute cycle. The typewriter is tabulated to the "A" amount column of the bill. During tabulation the selection unit of both calculators is cleared as described under selection clearing. Tabulation of the typewriter to the "A" amount column operates switch $T_S$ which opens the tabbing circuit. Due to circuit conditions established by the energization of relay $R_Q$, the circuit to the Div Tab solenoid $S_{DA}$ is also computed by the transfer of switch $T_S$. The "A" calculator Div Tab operation is initiated and the amount in the accumulator dials is read into the typewriter where it is printed in the "A" amount column. An auxiliary circuit to the common side of the typewriter numeral solenoids is also established by the relay $R_Q$ contacts. Since no circuit to the calculator carriage clearing solenoids has been established, the calculators do not clear during Div Tab and the amounts remain in the accumulator dials. Although the selection of both calculators has been cleared, the $L_2$ side of the escape shaft solenoids has been opened preventing any selection from taking place during readout. After the "A" column total has been printed, switch $T_S$ operates momentarily and supplies an inter-column tabulation pulse tabbing the typewriter to the "B" column. Transfer of switch $T_{AB}$ then establishes a circuit to the "B" calculator Div Tab solenoid $S_{DB}$. This circuit is also a result of previous circuit conditioning by the operation of relay $R_Q$. The "B" Div Tab operation is initiated and the "B" column total is printed. This Div Tab operation is exactly the same as that previously described for "A" calculator. After the "B" total has been read and printed in "B" column, the carriage is returned which operates switch $T_H$ which, in turn, opens the circuit to relay $R_Q$. Release of relay $R_Q$ restores the special circuit conditions which were required for the total cycle, to normal. This completes the sub-total cycle. Although a plus operation takes place during the Div Tab operation of "A" and "B" calculator, the selection units were cleared previously, therefore the amount in the accumulator dials remains the same. After the total cycle, the operator may then continue with the additional item and charges of the bill.

(b) FINAL TOTAL (WITH CALCULATOR CLEARANCE)

If at any time, during the preparation of bills, a final total is required without the normal compute operation, this can be obtained by first operating the Non-Tax switch N and then restoring the switch to its normal position. Operation of the Non-Tax switch energizes relay $R_A$ which, in turn, operates relay $R_D$. Restoring of the Non-Tax switch to normal provides a circuit through the contacts of relay $R_D$ to the carriage clearing solenoids $S_{CA}$ and $S_{CB}$. The total key is then depressed. This initiates the total cycle which is the same as the sub-total cycle, described previously, except that a circuit has been established to the carriage clearing solenoids so that the carriages are cleared during the Div Tab operations of the respective calculators. It will be noted that relay $R_A$ opens upon operation of relays $R_Q$ and $R_T$ at the beginning of the final total, however, relay $R_D$ is locked closed by its own contacts. The "A" and "B" column totals are printed and the typewriter carriage is returned which opens the special circuits which have been established. The operator may then begin a new bill, or listing of items.

4. Mixed bill (a) SPECIAL NON-TAX COMPUTE CYCLE

Occasionally, when preparing bills, a particular bill for services will consist of both taxable and non-taxable items. Such a bill is classified as a mixed bill. When typing and computing a mixed bill, the operator must list all of the taxable items and charges at the beginning of the bill. After these items have been listed, the typewriter platen is then turned down so that the typing guide is in line with the "A" and "B" column total spaces. The Non-Tax switch N is then operated. Operation of the Non-Tax switch completes a circuit to relay $R_A$, which in turn, energizes relay $R_D$ and completes a circuit to the yellow lamp on the typewriter. The purpose of the yellow lamp is to indicate that a Non-Tax condition exists. The compute key $K_C$ is then operated. This initiates a special compute cycle which automatically computes and prints on the bill, the total of "A" column, the tax amounts of both "A" and "B" columns, and establishes the circuits necessary for obtaining the "B" column total and the final total to be described later. The special compute cycle is much the same as the normal compute cycle in that the program switches are operated in the same sequence, however, due to the prior operation of the Non-Tax switch, circuits are established which change the function and operation of certain elements to obtain the desired results. The operation of the compute key $K_C$ starts the program motor, which, in turn, through the cam, operates switch $P_T$ and sets up the same conditions that exist at the beginning of a normal compute except that the Non-Tax switch is now operated and relay $R_D$ is energized. It will be noted that relay $R_A$ releases by the opening of the $R_T$ contacts at the beginning of the special compute, however, relay $R_D$ remains operated by its own contacts. The typewriter tabulates, at the beginning of the compute cycle and the selection units of both calculators are cleared. Program switches $P_{MA}$ and $P_{MB}$ are then operated initiating the multiplication operation of the respective calculators "A" and "B." The "A" calculator reads the "A" column total which is entered into its own selection unit and the typewriter where it is printed in the "A" total space of the bill. The "A" calculator carriage is cleared and the total, now in the selection unit, is multiplied by 15% and the resultant amount is entered into the accumulator dials. Calculator "B" reads the "B" column total into its own selection however, during the special compute cycle, the "B" column total is not printed on the bill. The $L_2$ circuit to the typewriter numeral solenoids is opened by the operated position of the Non-Tax switch, and the operation of program switch $P_{MB}$. The "B" calculator carriage is cleared during the multiplication operation and the "B" column total, which is in the selection, is multiplied by 25% and the resultant amount is entered into the accumulator dials. Since the "B" column total is not printed, extra tabulation operations are required to tabulate the typewriter carriage through the "B" total space. The extra tabulation circuit is established by the operated contacts of the Non-Tax switch N and the operation of switch $P_Y$ which is operated at this point in the programming. The carriage is returned after tabulation through "B" column and the initial tabulation circuit reestablished. The typewriter then tabulates to the "A" column tax space. No selection clearing takes place during the tabulation due to the operated position of switch $P_C$. The Div Tab operation of the "A" and "B" calculators is then initiated by the closing of their respective program switches $P_{DA}$ and $P_{DB}$. The "A" and "B" tax amounts are read and printed in the "A" and "B" tax spaces as during normal compute. The carriages are not cleared during the Div Tab operations of the respective calculators since switch $P_C$ has returned to its normal position. The totals, which have been entered into the selection units during the multiplication operation, are added to the tax amounts by the Div Tab operations. After the tax amounts have been printed, the typewriter carriage is returned. There is a short delay in tabulation due to switch $B_D$ which does not close until after the "B" Div Tab operation has been completed. After switch $B_D$ closes, the typewriter is again tabulated to the "A" amount field. Due to the return of program switch $P_C$ to its normal position, the "A" calculator selection unit is cleared during tabulation, however, the "B" calculator selection is not cleared due to the previous operation of switch $P_6$ which transfers shortly after the programming has begun. Transferal of switch $P_6$ opens the individual circuit to the "B" selection clearing solenoid $S_{6B}$. After tabulation, the "B" Div Tab operation is again initiated by the second operation of switch $P_{DB}$. The "B" total and tax amount, now in the "B" accumulator, is read into the "A" calculator selection unit but is not printed on the bill, as program switch $P_P$ has opened the common $L_2$ circuit to the typewriter numeral solenoids. The "B" calculator carriage is cleared after the readout due to the reoperation of switch $P_C$ which reestablishes the circuit to the selection clearing solenoids $S_{CA}$ and $S_{CB}$. Program switch $P_+$ then operates and closes a circuit to the "A" calculator plus solenoid which initiates the plus operation and adds the amount just read into the "A" selection, to the amount in the accumulator dials. The amount in the "A" calculator accumulator is now the total of the "A" and "B" columns and the tax of "A" and "B" columns. $P_+$ also energizes the "B" plus solenoid $S_{+B}$, however, the "B" calculator plus key is locked mechanically by the "B" Div Tab operation which is not complete at that point. At the end of the "B" Div Tab operation the amount in the "B" selection is automatically added to the accumulator dials. Since the accumulator dials were previously cleared, the "B" column total is in both the selection and the accumulator of "B" calculator after Div Tab. Calculator "A" does not Div Tab a second time during the special compute. The circuit to the "A" Div Tab solenoid is opened by the operated contacts of the Non-Tax switch N. The first "A" calculator Div Tab operation of the special compute is initiated by a circuit to the Div Tab solenoid via switch $P_C$ which is in its unoperated position at that time, however, switch $P_C$ is operated during this portion of programming. Since calculator "A" does not Div Tab a second time, and no final total is printed, the additional tabulation circuit through switch $P_Y$ is again established by the reoperation of switch $P_Y$ and the operated position of the Non-Tax switch N. The typewriter is tabbed through the final total space and the carriage is returned. The additional tabulation circuit, just described, stems from the operated contacts of switch $T_S$, therefore, it is not effective after the carriage has returned since $T_S$ returns to its normal position during the carriage return operation. The normal tabulation circuit, via the normally closed contacts of switch $T_S$, in opened by switch $P_Y$ which remains operated until the end of the compute cycle, therefore, no further typewriter tabulation takes place. The program switch $P_-$ is operated toward the end of the compute, however, the circuit to the subtract solenoids of the calculators $S_{-A}$ and $S_{-B}$ has been opened by the operation of the Non-Tax N switch and a new circuit established to relay $R_C$ which then operates and is locked operated by its own contacts. Switch $P_T$ is then transferred to its normal position opening the circuit to the motor and completing the special compute cycle. Since there is no second Div Tab operation during special compute, and since no subtraction takes place at the end of the compute cycle, it can be seen that the amount in the "A" calculator after the special compute cycle, is the "A" and "B" column totals plus the "A" and "B" column tax and the amount in the "B" calculator is the "B" column total only. It will be noted that relays $R_C$ and $R_D$ remain operated after the special compute cycle and the relay $R_A$ is again operated by the release of relay $R_T$ and the operated contacts of the Non-Tax switch.

(b) LISTING OF NON-TAX CHARGES

Upon completion of the special compute cycle, the typewriter platen is manually turned back to the portion of the bill just below the taxable items and the Non-Tax switch N is left in its operated position. The Non-Tax items and charges are then listed in accordance with normal procedure except that the charges for all Non-Tax items are listed in the "B" column of the bill. Due to the previous operation of relay $R_C$ a special circuit is established to the escape shaft solenoids of the "A" calculator selection unit so that all charges listed in "B" column enter the selection unit of the "A" calculator as well as the "B" calculator. The special circuit to the "A" calculator escape shaft solenoids is via the operated right-hand contacts 752 and 753 of switch $T_S$, the unoperated left-hand contacts 888 and 928 of switch $T_{AB}$, the unoperated left-hand contacts 947 and 946 of relay $R_Q$, the operated contacts 940 and 941 of relay $R_C$ and to the common side of the escape shaft solenoids.

(c) "B" COLUMN TOTAL

After all of the Non-Tax items have been entered, as described above, the typewriter platen is turned so that the typewriter printing guide is in line with the "A" and "B" column total spaces. The total key $K_T$ is then depressed. Operation of the total key energizes relay $R_Q$ which, in turn, establishes the standard circuit conditions required for the total cycle (operation of solenoids $S_{AT}$, $S_{3S}$, $S_{TAB}$ and relay $R_T$). The typewriter automatically tabulates, as during the normal total cycle, except that due to the special circuit conditions which have been established, the typewriter tabulates on through the "A" column total space (the "A" column total was printed during the special compute cycle). The selection units of both calculators are cleared during tabulation as during the normal total cycle. The special circuit for tabulation through the "A" amount field is via the operated right-hand contacts 752 and 753 of switch $T_S$, the operated right-hand contacts 887 and 888 of switch $T_{AB}$, the operated right-hand contacts 948 and 884 of relay $R_C$, through switch $B_D$, $T_T$, $P_Y$ and by way of conductor 802 to the typewriter tabulation solenoid $S_{TAB}$. Upon arrival of the typewriter carriage to the "B" total space, the "B" Div Tab operation is initiated and the "B" column total is read into the typewriter and printed in the "B" total space. (It will be noted that the circuit to the "A" calculator Div Tab solenoid used during normal total, has been opened by the operated contacts of relay $R_C$.) After the "B" column total has been printed, the carriage is returned operating switch $T_H$ which, in turn, releases relay $R_Q$ and relay $R_D$. Return of $R_Q$ to its unoperated position opens the common $L_1$ circuit to the functional solenoids and relay $R_T$. Releasing of relay $R_T$ again establishes the circuit to relay $R_A$ (this circuit was opened at the beginning of the total cycle by operation of relay $R_T$). Relay $R_A$ operates and reestablishes a circuit to relay $R_D$ which is again energized and locked operated by its own contacts. This completes the "B" column total operation.

(d) FINAL MIXED BILL TOTAL

Upon completion of the sub-total operation, the typewriter platen is manually turned so that the typing guide is in line with the final total space. The Non-Tax switch N is then returned to its normal position. Restoral of the N switch to normal releases relay $R_A$ and completes a circuit to relay $R_B$. The circuit to $R_B$ was partially completed by the operation of relay $R_C$ and relay $R_B$ is operated when the Non-Tax switch is returned to normal. The left-hand closed contacts 918 and 892 of the N switch also completes a circuit to the carriage clearing solenoids $S_{CA}$ and $S_{CB}$ through the right-hand closed contacts 1092 and 1093 of relay $R_D$. The carriage clearing solenoids operate and condition the carriages of "A" and "B" calculators so that they are cleared during the Div Tab operation. The total switch $K_T$ is then depressed. Operation of the total key energizes relay $R_Q$ which, in turn, operates and establishes those conditions necessary for total operations, as described previously. The typewriter carriage is automatically tabulated through the "A" amount field to the final total space of the bill. The special circuit for tabulation through the "A" amount field is the same as described in the "B" column total operation. The Div Tab operation is then initiated in both calculators simultaneously. The circuit for the simultaneous operation of the Div Tab solenoids is via the operated right-hand contacts 752 and 753 of switch $T_S$, the unoperated left-hand contacts 928 and 888 of switch $T_{AB}$, the operated right-hand contacts 925 and 947 of relay $R_Q$ and to the operated contacts 572 and 573 of relay $R_B$ where the $L_2$ lines to the respective "A" and "B" Div Tab solenoids $S_{DA}$ and $S_{DB}$ are paralleled. Although the Div Tab operation takes place in both calculators simultaneously, only the "A" calculator reads out into the typewriter as the common line to the "B" calculator read out contacts is opened by the operation of relay $R_B$. The locking circuit to relay $R_C$ is via the unoperated left-hand contacts 937 and 936 of switch $A_R$ which operates during the "A" calculator readout, therefore, relay $R_C$ is released at the beginning of the "A" calculator readout. The accumulator dials of both calculators are cleared and restored to zero during the simultaneous Div Tab operations due to the previous energizing of their respective carriage clearing solenoids. It will be noted that the only reason for the Div Tab operation of the "B" calculator at this time is to clear the accumulator dials. This was not accomplished during the previous "B" column total operation due to the operated position of the Non-Tax switch N. As pointed out previously, the circuit to the carriage clearing solenoids stems from the unoperated left-hand contacts 892 and 918 of the Non-Tax switch N. After the final total has been read from the "A" calculator and printed in the final total space of the bill, the carriage of the typewriter is returned and operates switch $T_H$ to open its contacts. Operation of switch $T_H$ releases relays $R_Q$, $R_B$ and $R_D$. Relay $R_Q$, in turn, releases relay $R_T$, solenoids $S_{AT}$, $S_{3S}$, $S_{TAB}$ and restores all circuits to their normal condition. This completes the operations necessary for preparing and computing a mixed bill. Since the carriages of the calculators are clear (accumulator dials restored to zero) they are prepared to receive and compute the next bill.

5. *Non-Tax bill*

(a) LISTING OF CHARGES

In certain cases, during the preparation of bills for services, all of the items contained in the bill will be non-taxable. When this occurs, the Non-Tax switch N is operated prior to the listing of the items and charges. Operation of the Non-Tax switch completes a circuit to relay $R_A$. Relay $R_A$ then energizes and completes a circuit to the Non-Tax indicating lamp 906 and to relay $R_D$. The indicating lamp lights and $R_D$ operates and is locked in an operated position by its own contacts. Operation of relay $R_A$ also opens the circuit to the "A" calculator escape shaft solenoids and completes a secondary circuit to the "B" calculator escape shaft solenoids so that entries made in the "A" amount column will enter calculator "B" instead of calculator "A." The items and charges are then listed on the bill in accordance with normal procedure, however, all charges listed in both "A" and "B" amount columns enter the "B" calculator selection only. The secondary circuit to the "B" calculator escape shaft solenoids is via the operated right-hand contacts 752 and 753 of switch $T_S$, the operated right-hand contacts 887 and 888 of switch $T_{AB}$, the unoperated left-hand contacts 883 and 884 of relay $R_C$ the operated right-hand contacts 914 and 880 of relay $R_A$, and to the escape shaft solenoids of the "B" calculator by way of conductor 916.

(b) NON-TAX TOTAL

After all of the Non-Tax items have been listed, as described above, the typewriter platen is turned so that the printing guide is in line with the final total space of the bill. The Non-Tax switch N is then returned to its unoperated position. Restoral of the Non-Tax switch to its normal position completes a circuit through the right-hand contacts of relay $R_D$ to the carriage clearing solenoids $S_{CA}$ and $S_{CB}$. Relay $R_A$ is released, however, relay $R_D$ remains operated via its own contacts. The total key $K_T$ is then operated. Operation of the total key initiates a total cycle which is exactly the same as the final total cycle described previously. Since none of the charge amounts have entered the "A" calculator, the typewriter platen is spaced through the "A" amount field during the "A" calculator Div Tab operation. The final total is then printed in the final total space by the "B" calculator Div Tab and readout operation. The carriage is returned, operating switch $T_H$ and restoring all circuits to their normal condition as described previously. This completes the operations necessary for computing a Non-Tax bill. Since the accumulator dials in both calculators are clear, the machine is prepared to receive the next bill.

6. *International telegrams*

Occasionally, when preparing bills for services, items and charges for international telegrams must be listed. Since the occurrence of such items is very infrequent, no provision was made in this invention for computing the tax of such items and charges. These items are handled in the same manner as the Non-Tax items of a mixed bill and are listed along with the Non-Tax items. The tax for these items, which is 10%, must then be computed by some external means and the resultant amount listed below the "B" column tax of the bill. This must be done after the "B" column total operation and prior to the final total operation of the mixed bill. The total and tax for these items will then be automatically added to the final mixed bill total.

I claim:

1. A typewriting and calculating apparatus comprising an electrically operated typewriter, numeral keys in said typewriter, a first electrically operated calculating machine, a multiplier unit in said first calculating machine set for a predetermined multiplier value, a second electrically operated calculating machine, a multiplier unit in said second calculating machine set for a different value than is the multiplier unit in said first calculating machine, a multiplier unit in said second calculating machine set for another predetermined multiplier value, readout selector switches in said calculating machines, a control system electrically connected to said typewriting and calculating machines, said control system being operable to control said calculating machines selectively in accordance with the operations of said typewriter, said control system being also operable under control of said calculating machines to control said typewriter in accordance with amounts accumulated in said calculating machines, selecting slides in said calculating machines, a selecting slide control unit in each calculating machine and electrically controlled through said control system in one case by said typewriter and in another case by said selector switches, said selecting slides being operable to control the entering of values in said calculating machines and serving as amount storage means for said calculating machines, and a program unit having switches in electrical connection with said control system, said program unit being operable to make said control system first control said calculating machines in accordance with the operations of said typewriter and subsequently make said calculating machines, in effect, read back into said typewriter, amounts accumulated in said calculating machines, and operate said typewriter in accordance with the amounts accumulated in said calculating machines.

2. A selecting device operable to selectively control the movement of spaced selecting slides comprising, means to move the selecting slides, latch lever members pivotally supported on the selecting slides, a toothed holding bar extending transversely of said latch lever members and operable for engagement by said latch lever members to control the extent of movement of the selecting slides, a set of closely spaced, relatively movable gate bars cooperable to provide gateways for the passage of said latch lever members and to selectively direct said latch lever members toward engagement with said toothed holding bar, means to selectively move said gate bars, means to selectively trip said latch lever members from engagement with said toothed holding bar for selective operation and control by said gate bars and counterweight means on said latch lever members operable to urge said latch lever members into engagement with said toothed holding bar.

3. A calculating machine comprising a set of movable selecting slides controlling the movement of digit accumulators, means to move the accumulators, means to move said selecting slides, latch means on each of said selecting slides, a toothed holding bar extending across said selecting slides and in the path of movement of said latch means to normally hold said selecting slides against movement, a set of relatively movable gate bars arranged in close parallel relation and operable to cooperatively form gateways for parts of said latch means supported on said movable selecting slides and operating to selectively control the movement of said movable selecting slides, means to selectively move said gate bars, and rotatable and longitudinally movable cam shaft means to selectively operate said latch means to selectively release said latch means for corresponding movement of said selecting slides, said latch means upon release operating to travel across said toothed holding bar and into engagement with the toothed surface of said toothed holding bar.

4. A billing apparatus operable to prepare bills involving a plurality of types of charges, each type being taxable at a different percentage comprising a typewriter, a plurality of calculating machines each being set to calculate a predetermined percentage of charges entered therein, an electrical system electrically connecting said typewriter to said calculating machines and interconnecting said calculating machines, switch means in said electrical system to selectively bring said calculating machines under control of said typewriter, numeral keys and corresponding numeral switches in said typewriter, said numeral switches being in said electrical system, numeral controlling selecting slides in said calculating machines, a selecting device in each calculating machine involving a plurality of gate bars and electromagnetic means to selectively operate the gate bars, triggers supported on said selecting slides, a fixed member engageable by said triggers and cooperating therewith to hold said selecting slides against movement in one direction, means urging said selecting slides to move, a rotatable and longitudinally movable cam shaft operable to sequentially trip said triggers, electromagnetic means to operate said cam shaft, functional keys in said calculating machines operable to control said calculating machines in addition, subtraction and multiplication operations, electromagnetic means to operate said functional keys and a program control unit connected in said electrical system, comprising motor driven cams and switch members operable by the cams and operable to control said calculating machines and said typewriter in a cycle of calculating and printing operations.

5. A billing apparatus operable to prepare bills involving a plurality of types of charges, each type being chargeable in a separate column on the bill and the charges in each column being subject to an additional charge of a predetermined percentage comprising a typewriter operable to type the required charges in the required columns on the bill, a moving carriage in the typewriter, a plurality of calculating machines, each being set to calculate a predetermined percentage of charges entered therein, an electrical system electrically connecting said typewriter to said calculating machines and interconnecting said calculating machines, switch means in said electrical system controlled by carriage positions of said typewriter and operable to select the required calculating machine for entering of a charge when said typewriter is operated to type a charge in a charge column of the bill, total obtaining means in each calculating machine for determining the total of the charges in each column, multiplication means in each calculating machine for calculating a predetermined percentage of the total of the charges in a required column, readout means in each calculating machine, said readout means being connected into said electrical system and being operable through said electrical system to electrically read out the calculated values from a calculating machine and control said typewriter to type the values in the required column on the bill, and a program control unit connected into said electrical system and operable to control the operations of said calculating machines and said typewriter in accordance with a predetermined program and required operating cycle.

6. A billing apparatus operable to prepare bills involving a plurality of types of charges, each type being chargeable in a separte column on the bill and the charges in each column being subject to an extra charge of a predetermined percentage comprising a typewriter operable to type the charges in the required columns on the bill, a moving carriage in the typewriter, a plurality of calculating machines, a multiplication mechanism in each calculating machine, each multiplication mechanism being set for a separate predetermined multiplier to condition each calculating machine to take care of the charges in an individual column of the bill, an electrical system electrically connecting said typewriter to said calculating machines and interconnecting said calculating machines, switch means in said electrical system controlled by carriage positions of said typewriter and operable to select the required calculating machine for entering of a charge when said typewriter is operated to type a charge in a charge column of the bill, holding means on said typewriter carriage to hold the bill form in required position, total obtaining means in each calculating machine for determining the total of the charges in each column, functional control means in said calculating machines operable to control said calculating machines in addition, multiplication and subtraction operations, means to operate said functional control means, readout switch means in said calculating machines, said readout switch means being in said electrical system and being operable through said electrical system to electrically control said typewriter to type the values obtained in said calculating machines in required columns in the bill, and a control unit connected in said electrical system and operable to control the operations of said typewriter and calculating machines in accordance with a predetermined cycle of operations.

7. A selecting apparatus comprising a plurality of selecting slides supported in spaced relation, means to move said selecting slides, latch members supported on said selecting slides and operable to releasably hold said selecting slides from movement, a plurality of selectively movable gate bars extending across the path of movement of said latch members and operable to selectively control the movement of said selecting slides, electromagnetic means to selectively operate said gate bars, a rotatable and longitudinally movable shaft carrying spaced cams to sequentially trip said latch members, means to rotate said shaft, and electromagnetic means to move said shaft longitudinally.

8. A selecting apparatus comprising a plurality of selecting slides supported in parallel spaced relation, means to move said selecting slides, latch members supported on said selecting slides, a fixed bar extending transversely of said latch members and cooperable with said latch members to releasably hold said selecting slides against movement in one direction, a plurality of selectively movable gate bars extending across the path of movement of said latch members and operable to selectively control the movement of said selecting slides, electromagnetic means to selectively operate said gate bars, a rotatable and longitudinally movable shaft carrying cams helically arranged on said shaft and operable to trip said latch members and electromagnetic means to move said shaft longitudinally.

References Cited in the file of this patent

UNITED STATES PATENTS

| | | |
|---|---|---|
| 1,813,830 | Weiner | July 7, 1931 |
| 1,849,494 | Last | Mar. 15, 1932 |
| 1,932,220 | Kottmann | Oct. 24, 1933 |
| 1,942,106 | Kottmann | Jan. 2, 1934 |
| 2,084,445 | Kottmann | June 22, 1937 |
| 2,185,260 | Lasker | Jan. 2, 1940 |
| 2,258,695 | Anderson | Oct. 14, 1941 |
| 2,323,824 | Haschmeyer | July 6, 1943 |
| 2,365,527 | Dennis | Dec. 19, 1944 |
| 2,451,722 | Dodge | Oct. 19, 1948 |
| 2,493,709 | Wittenmyer | Jan. 3, 1950 |
| 2,523,904 | Hansen | Sept. 26, 1950 |
| 2,625,324 | Sundstrand | Jan. 13, 1953 |
| 2,666,517 | Christian et al. | Jan. 19, 1954 |
| 2,717,733 | Luhn et al. | Sept. 13, 1955 |
| 2,761,620 | Lindesmith et al. | Sept. 4, 1956 |

FOREIGN PATENTS

| | | |
|---|---|---|
| 833,950 | France | Nov. 4, 1938 |
| 690,171 | Great Britain | Apr. 15, 1953 |

UNITED STATES PATENT OFFICE

Certificate of Correction

Patent No. 2,842,310                                                        July 8, 1958

Morton P. Matthew

It is hereby certified that error appears in the printed specification of the above numbered patent requiring correction and that the said Letters Patent should read as corrected below.

Column 6, line 37, for "A" read *As*; column 7, line 22, for "th" read *the*; line 60, for "attaced" read *attached*; column 9, line 58, after "282," insert *286,*; column 10, line 31, after "445 and" insert *the*; column 11, line 44, for "slide" read *slides*; column 12, line 53, for "512" read *521*; column 13, line 71, for "shafts" read *shaft*; column 17, line 34, before "operated" insert *is*; line 53, for "3a" read *34a*; column 25, line 42, after "clearing" insert *solenoids*; line 47, for "S$_{s2}$" read *R$_s$2*; column 34, line 27, for "fuel" read *full*; column 36, line 73, strike out "of", first occurrence; column 37, line 31, for "Fig. 41," read *Fig. 41.*; column 38, line 63, for "prepared" read *prepares*; column 43, line 54, for "computed" read *completed*; column 46, line 12, for "in" read *is*; column 48, line 33, after "R$_C$" insert a comma; column 49, lines 10 and 11, strike out "a multiplier unit in said second calculating machine set for another predetermined multiplier value,"; column 50, line 65, for "separte" read *separate*.

Signed and sealed this 3rd day of March 1959.

[SEAL]

Attest:
KARL H. AXLINE,
*Attesting Officer.*

ROBERT C. WATSON,
*Commissioner of Patents.*